United States Patent
Gardiner

(10) Patent No.: US 12,551,849 B2
(45) Date of Patent: Feb. 17, 2026

(54) SYSTEM AND METHOD FOR REDUCING THE DISSOLVED SOLIDS OF A NON-POTABLE AQUEOUS FLOW

(71) Applicant: Jack C. Gardiner, Houston, TX (US)

(72) Inventor: Jack C. Gardiner, Houston, TX (US)

(*) Notice: Subject to any disclaimer, the term of this patent is extended or adjusted under 35 U.S.C. 154(b) by 582 days.

(21) Appl. No.: 18/106,409

(22) Filed: Feb. 6, 2023

(65) Prior Publication Data

US 2023/0249134 A1    Aug. 10, 2023

Related U.S. Application Data

(60) Provisional application No. 63/307,627, filed on Feb. 7, 2022.

(51) Int. Cl.
   *B01D 61/42*    (2006.01)
   *B01D 61/14*    (2006.01)
   (Continued)

(52) U.S. Cl.
   CPC ......... *B01D 61/428* (2022.08); *B01D 61/145* (2013.01); *B01D 63/06* (2013.01);
   (Continued)

(58) Field of Classification Search
   CPC .... B01D 61/428; B01D 61/145; B01D 63/06; B01D 71/14; B01D 71/36;
   (Continued)

(56) References Cited

U.S. PATENT DOCUMENTS 5,425,858 A    6/1995  Farmer
8,562,803 B2   10/2013 Nyberg et al.
(Continued)

FOREIGN PATENT DOCUMENTS

CN  110372067 A  * 10/2019 ............. C02F 1/469
KR  10-2015-0002364    1/2015
(Continued)

OTHER PUBLICATIONS

ISA/KR—PCT/US2018/012248—PCT International Search Report, Written Opinion and transmittal notification dated Apr. 26, 2018 (related to Gardiner U.S. Appl. No. 10/556,812), eleven pages.
(Continued)

*Primary Examiner* — Bryan D. Ripa
(74) *Attorney, Agent, or Firm* — Gordon G. Waggett, P.C.

(57) ABSTRACT

The present disclosure describes a flow-electrode capacitive deionization (FCDI) desalination system and method of use. An FCDI desalination system is described employing one or more FCDI cells equipped with two coaxially oriented membranes mounted within a column housing capped with two end caps, each end cap comprising two carbon slurry ports and one water port. The column is lined with a chargeable sleeve capable of receiving a positive or negative charge. The annular space between the chargeable sleeve and the outside surface of the outer concentric membrane creates a flow path for a first carbon slurry to pass therethrough. The space between the inside surface of the outer concentric membrane and the outer surface of the inner concentric membrane creates a flow path for the saline water to be treated. The space within the inner annular portion of the inner concentric membrane creates a flow path for a second carbon slurry and contains a chargeable rod or wire capable of receiving an opposite charge. The first and second opposed end caps on the column are outfitted to continue these independent flow paths. As the saline water travels through its flow path, its salt ions are removed through the coaxial membranes via the two carbon slurries.

10 Claims, 52 Drawing Sheets

(51) Int. Cl.
| | |
|---|---|
| B01D 63/06 | (2006.01) |
| B01D 71/14 | (2006.01) |
| B01D 71/36 | (2006.01) |
| C02F 1/469 | (2023.01) |
| C02F 103/08 | (2006.01) |

(52) U.S. Cl.
CPC ............. *B01D 71/14* (2013.01); *B01D 71/36* (2013.01); *C02F 1/4691* (2013.01); *B01D 2313/201* (2022.08); *B01D 2313/21* (2013.01); *B01D 2313/23* (2013.01); *B01D 2313/345* (2013.01); *B01D 2313/40* (2013.01); *C02F 2103/08* (2013.01); *C02F 2201/003* (2013.01)

(58) Field of Classification Search
CPC .......... B01D 2313/201; B01D 2313/21; B01D 2313/23; B01D 2313/345; B01D 2313/40; B01D 61/46; C02F 1/4691; C02F 2103/08; C02F 2201/003; C02F 1/46114; C02F 2001/46133; C02F 2201/46115
See application file for complete search history.

(56) References Cited

U.S. PATENT DOCUMENTS

| | | | |
|---|---|---|---|
| 9,061,251 B2 * | 6/2015 | Hobbs ................... | B01D 71/34 |
| 9,463,988 B2 | 10/2016 | Liang et al. | |
| 10,202,294 B2 | 2/2019 | Curran | |
| 10,556,812 B2 | 2/2020 | Gardiner | |
| 10,689,272 B2 | 6/2020 | Ikeda | |
| 10,787,378 B2 | 9/2020 | Austin et al. | |
| 2008/0198531 A1 | 8/2008 | Shiue et al. | |
| 2011/0281169 A1 | 11/2011 | Zheng et al. | |
| 2012/0247959 A1 | 10/2012 | Seed et al. | |
| 2012/0273359 A1 | 11/2012 | Suss et al. | |
| 2014/0027288 A1 | 1/2014 | Nyberg et al. | |
| 2016/0185628 A1 | 6/2016 | Servida | |
| 2016/0289097 A1 | 10/2016 | Jeong et al. | |
| 2016/0326025 A1 * | 11/2016 | Choi ...................... | B01D 61/44 |
| 2018/0186666 A1 * | 7/2018 | Gardiner ............. | B01D 61/428 |
| 2019/0144310 A1 * | 5/2019 | Campbell ............. | C02F 1/4691 |
| | | | 204/263 |

FOREIGN PATENT DOCUMENTS

| | | | | |
|---|---|---|---|---|
| KR | 10-2016-0136266 | | 11/2016 | |
| WO | WO-2018048180 A1 * | | 3/2018 | ............. H01M 4/94 |

OTHER PUBLICATIONS

Anderson, M.A.; Cudero, A.L.; and Palma, J., "Capacitive deionization as an electrochemical means of saving energy and delivering clean water. Comparison to present desalination practices: Will it compete?", Electrochimica Acta, (Feb. 12, 2010), 55(12), pp. 3845-3856 (Abstract Only).

Biesheuvel, P.M., "Thermodynamic cycle analysis for capacitive deionization", Journal of Colloid and Interface Science, (Jan. 22, 2009), 332(1), pp. 258-264 (Abstract Only).

Biesheuvel, P.M .; Zhao, R.; Porada, S., Van Der Wal, A.; "Theory of membrane capacitive deionization Including the effect of the electrode pore space", J. Colloid and Interface Sci., (Apr. 24, 2011), 360(1), pp. 239-248 (Abstract Only).

Campos, J.W.; Beidaghi, M.; Hatzell, K.B.; Dennison, C.R.; Musci, B.; Presser, V.; Kumbur, E.C. and Gogotsi, Y., "Investigation of carbon Materials for use as a flow able electrode in electrochemical flow capacitors", Electrochimica Acta, (Mar. 15, 2012), 98, pp. 123-130 (Abstract Only).

Dennison, C.R.; Beidaghi, M.; Hatzell, K.B.; Campos, J.W.; Gogotsi, Y.; Kumbur, E.C., "Effects of Flow Cell Design on Charge percolation and storage in the carbon slurry electrodes of electrochemical flow capacitors", J. Power Sources, (Sep. 3, 2013), 247, pp. 489-496 (Abstract Only).

Hatzell, K.B.; Beidaghi, M.; Campos, J.W.; Dennison, C.R.; Kumbur, E.C.; and Gogotsi, Y., "A High Performance Pseudo capacitive capacitor: a new concept for rapid energy storage and recovery." Electrochimica Acta, (Aug. 30, 2013), 111, pp. 888-897.

Jeon, Sung-Il; Park, Hong-Ran; Yeo, Jeong-Gu; Yang, Seungcheol; Cho, Churl Hee; Han, Moon Hee; and Kim, Dong Kook, "Desalination via a new membrane capacitive deionization process utilizing flow-electrodes", Energy Environ. Sci., (Mar. 4, 2013), 6, pp. 1471-1475.

Kim, S.J.; Ko, S.H.; Kang, K.H., and Han, J., "Direct seawater desalination by ion concentration polarization", Nature Nanotechnology, (Mar. 21, 2010), 5, pp. 297-302 (Abstract Only).

Kim, Y.J.; and Choi, J.H.; "Improvement of desalination efficiency in capacitive deionization using a carbon electrode coated with an ion-exchange polymer", Water Research, (Jan. 2010), 44(3), pp. 990-996 (Abstract Only).

Kondrat, S.; Perez, C.R.; Presser, V.; Gogotsi, Y.; Kornyshev, A.A., "Effect of pore size and its dispersity on the energy storage in nanoporous supercapacitors", Energy and Environ. Sci., (Mar. 2012), 5(4), pp. 6474-6479 (Abstract Only).

Leonard K.C.; Genthe J.R.; Sanfilippo, J.L.; Zeltner, W.A.; and Anderson, M.A.; "Synthesis and Characterization of Asymmetric Electrochemical Capacitive Deionization Materials Using Nanoporous Silicon Dioxide and Magnesium Doped Aluminum Oxide", Electrochimica Acta, (Aug. 2009), 54(22), pp. 5286-5291 (Abstract Only).

Lee, J.H.; Bae, W.S.; and Choi, J.H .; "Electrode reactions and adsorption/desorption performance related to the applied potential in a capacitive deionization process", Desalination, (Apr. 10, 2010), 258, pp. 159-163.

Lee, J.B.; Park, K.K.; Eum, H.M.; Lee, C.W.; "Desalination of a thermal power plant wastewater by membrane capacitive deionization", Desalination, (Aug. 28, 2006), 196, pp. 125-134 (Abstract Only).

Li, H.; Gao, Y.; Pan, L., Zhang, Y., Chen, Y.; and Sun, Z., "Electrosorptive desalination by carbon nanotubes and nanofibres electrodes and ion-exchange membranes", Water Research, (Oct. 2, 2008), 42, pp. 4923-4928 (Abstract Only).

Li, H.; Zou, L.D .; Pan, L.K.; and Sun, Z.; "Novel graphene-like electrodes for capacitive deionization", Environ. Sci. Technol., (Oct. 21, 2010), 44(22), pp. 8692-8697 (Abstract Only).

Li, H.; and Zou, L.; "Ion-exchange membrane capacitive deionization: A new strategy for brackish water desalination", Desalination, (May 14, 2011), 275(1-3), pp. 62-66 (Abstract Only).

Pasta, M.; Wessells, C.D. ; Cui, Y.; La Mantia, F.; "A Desalination Battery", Nano Letters, (Jan. 23, 2012), 12, pp. 839-843.

Porada, S.; Borchardt, L.; Oschatz, M.; Bryjak, M.; Atchison, J.S.; Keesman, K.J.; Kaskel, S.; Biesheuvel, P.M.; and Presser, V.; "Direct prediction of the desalination performance of porous carbon electrodes for capacitive deionization", Energy Environ. Sci., (Aug. 14, 2013), 6, pp. 3700-3712.

Porada, S.; Zhao, R.; Van Der Wal, A.; Presser, V., and BIESHEUVEL, P.M.; "Review on the science and technology of water desalination by capacitive deionization", Progress in Materials Science, (Apr. 4, 2013), 58, pp. 1388-1442.

Presser, V.; Dennison, C.R.; Campos, J.; Knehr, K.W.; Kumbur, E.C.; and Gogotsi, Y., "The Electrochemical Flow Capacitor: A new Concept for rapid energy storage and recovery", Advanced Energy Materials (May 23, 2012), 2(7), pp. 895-902 (Abstract Only).

Rommerrskirchen, A.; Gendel, Y.; and Wessling, M., "Single Module Flow-Electrode Capacitive deionization for Continuous Water desalination", Electrochem. Comm., (Jul. 29, 2015), 60, pp. 34-37 (Abstract Only).

Simon, P. and Gogotsi, Y., "Materials for electrochemical capacitors", Nature Materials, (Dec. 2008), 7(11), pp. 845-854.

Suss, M.E.; Porada, S.; Sun, X.; Biesheuvel, P.M.; Yoon, J.; Presser, V.; "Water desalination via capacitive deionization: what is it and what can we expect from it?", Energy and Environ. Sci., (May 5, 2015), 8, pp. 2296-2319.

(56) References Cited

OTHER PUBLICATIONS

Unda, J.E.Z. and Roduner, E., "Reversible transient hydrogen storage in a fuel cell-supercapacitor hybrid device", Phys. Chem. Chem. Phys. (Feb. 2012), 14(11), pp. 3816-3824 (Abstract Only).
Weinstein, L. and Dash, R., "Capacitive Deionization: Challenges and Opportunities", Desalination & Water Reuse, (Nov.-Dec. 2013), pp. 34-37.
Yang, Seungcheol; Choi, Jiyeon; Yeo, Jeong-Gu; Jeon, Sung-Il; Park, Hong-Ran; and Kim, Dong Kook, "Flow-electrode Capacitive Deionization Using an Aqueous Electrolyte with a High Salt Concentration." Environ. Sci. Technol., May 10, 2016, 50(11), pp. 5892-5899 (Abstract Only).
Yang, Seungcheol; Jeon, Sung-Il; Kim, Hanki; Choi, Jiyeon; Yeo, Jeong-Gu; Park, Hong-Ran; and Kim, Dong Kook, "Stack design and operation for scaling up the capacity of flow-electrode capacitive deionization technology", ACS Sustainable Chem. Eng., (Jun. 20, 2016), 4(8), pp. 4174-4180 (Abstract Only).
Yuan, L.; Yang, X.; Liang, P.; Wang, L.; Huang, Z.H.; Wei, J.; and Huang, X., "Capacitive deionization coupled with microbial fuel cells to desalinate low concentration salt water", Bioresource Technology, (Feb. 2, 2012), 110, pp. 735-738.
Zhao, R.; Biesheuvel, P.M.; Miedema, H.; Brunning, H.; Van Der Wal, A.; "Charge efficiency: A functional tool to probe the double-layer structure inside of porous electrodes and application in the modeling of capacitive deionization", The Journal of Physical Chemistry Letters, (Nov. 16, 2009), 1, 205-210 (Abstract Only).
Zou, L.; Li, L.; Song, H.; and Morris, G., "Using mesoporous carbon electrodes for brackish water desalination", Water Res., (Jan. 4, 2008), 42(8-9), pp. 2340-2348 (Abstract Only).
Hatzell, K.B.; Hatzell, M.C.; Cook, K.M.; Boota, M.; House, G.M.; Mcbride, A.; Kumbur, E.C.; and Gogotsi, Y., "Effect of Oxidation of Carbon Material on Suspension Electrodes for Flow Electrode Capacitive Deionization", Environ. Sci. Technol., (Jan. 29, 2015), 49(5), pp. 3040-3047.
Lawrence Livermore National Laboratory, "Flow-Through Electrode Capacitive Desalinization", ipo.llnl.gov/technologies/fte_cd, Oct. 2014 https://ipo.llnl.gov/technologies/energy., 2 pages.
Wikipedia, "Capacitive Deionization", en./wikipedia.org/wiki/Capacitive_deionization, page last modified Nov. 27, 2016, 9 pages.
CDI & Electrosorption, "CDI & Electrosorption", www.cdi-electrosorption.org/ (last accessed Dec. 1, 2016), 3 pages.
spectrumlabs.com, "Biotech Cellulose Ester (CE) Membrane", website screenshots last accessed Dec. 1, 2016, 2 pages.
ISA/KR—PCT/US2023012440—counterpart PCT International Search Report, Written Opinion and transmittal notification dated Jun. 28, 2023, nine pages.

\* cited by examiner

©2016 Jack C. Gardiner

©2016 Jack C. Gardiner

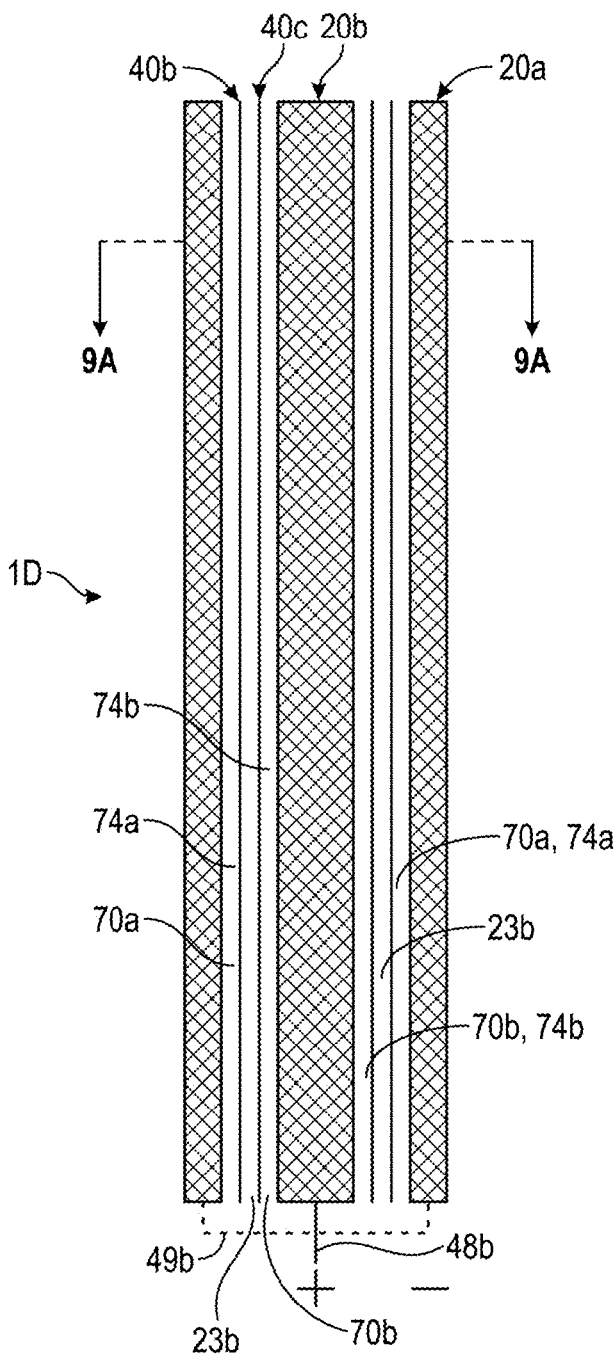
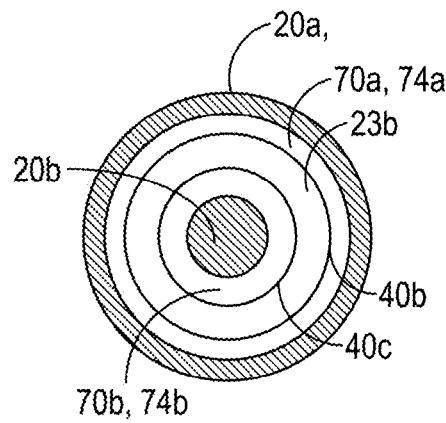
©2016 Jack C. Gardiner
FIG. 9A
©2016 Jack C. Gardiner
FIG. 9

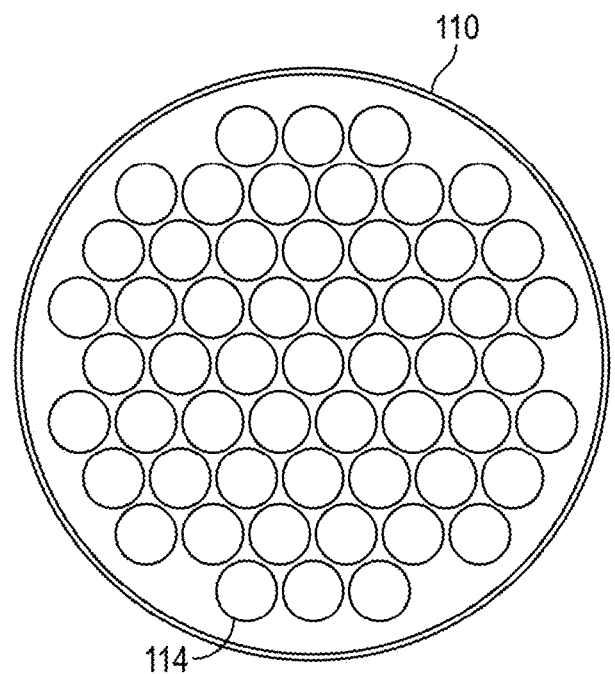
FIG. 13A
(Prior Art)
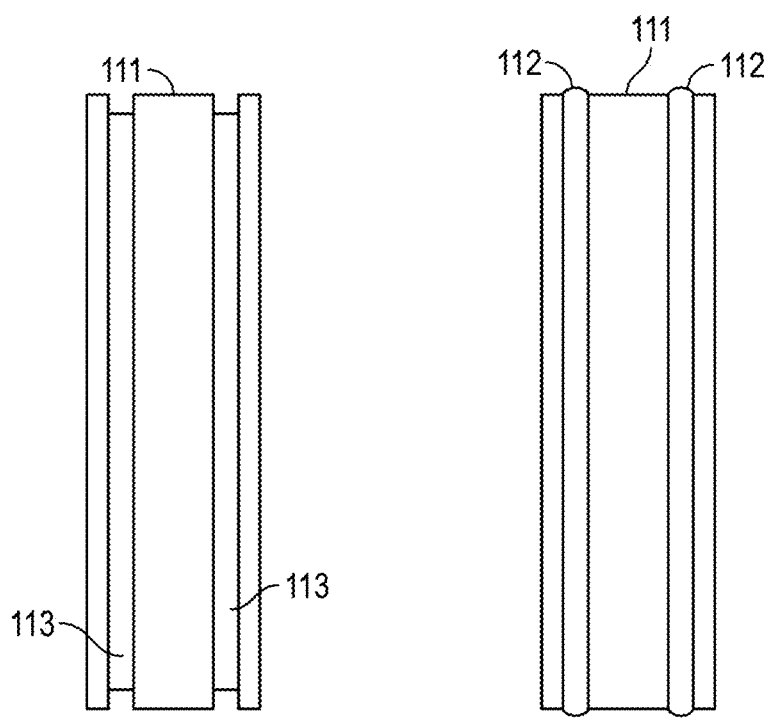
FIG. 13B
(Prior Art)
FIG. 13C
(Prior Art)

©2022 Jack C. Gardiner

©2022 Jack C. Gardiner

©2022 Jack C. Gardiner

©2022 Jack C. Gardiner

©2022 Jack C. Gardiner

©2022 Jack C. Gardiner

©2022 Jack C. Gardiner

SYSTEM AND METHOD FOR REDUCING THE DISSOLVED SOLIDS OF A NON-POTABLE AQUEOUS FLOW

CROSS-REFERENCE TO RELATED APPLICATIONS

This application claims the benefit of the filing date of and priority to: U.S. Provisional Application Ser. No. 63/307,627 entitled "System and Method for Reducing the Dissolved Solids of a Non-Potable Aqueous Flow" and filed Feb. 7, 2022, Confirmation No. 4421; said provisional application being incorporated by reference herein in its entirety for all purposes.

COPYRIGHT AUTHORIZATION UNDER 37 CFR 1.71

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

BACKGROUND

Field of the Invention

The present disclosure relates generally to the field of water desalination, and more particularly to the use of flow-electrode capacitive deionization (FCDI) technology in the desalination of water. The present disclosure relates more specifically to a system, and method for reducing the dissolved solids of a non-potable aqueous flow. Furthermore, the present disclosure relates to a new FCDI cell for use in reducing the dissolved solids in a non-potable aqueous flow.

Desalination refers to any of several processes that remove the excess salt and other minerals from water in order to obtain fresh water suitable for animal consumption or irrigation, and if almost all of the salt is removed, for human consumption, sometimes producing table salt as a by-product.

The traditional process used in these operations is distillation—essentially the boiling of water at less than atmospheric pressure, and thus a much lower temperature than normal. Due to the reduced temperature, energy is saved.

In the last decade, membrane processes have grown very fast, and Reverse Osmosis (RO) has taken nearly half the world's installed capacity.

Membrane processes use semi-permeable membranes to filter out dissolved material or fine solids.

The systems are usually driven by high-pressure pumps, but the growth of more efficient energy-recovery devices has reduced the power consumption of these plants and made them much more viable; however, they remain energy intensive and, as energy costs rise, so will the cost of RO water.

Increasing global water demand for fresh water because of rising population, increasing standard of living, and expanding agriculture and industrialization is driving the development of new and energy efficient water desalination technologies. Such technologies include: capacitive deionization (CDI) (see, e.g., L. Zou et al., "Using mesoporous carbon electrodes for brackish water desalination", *Water Research* 2008, 42, 2340; K. C. Leonard et al., "Synthesis and characterization of asymmetric electrochemical capacitive deionization materials using nanoporous silicon dioxide and magnesium doped aluminum oxide", *Electrochimica Acta* 2009, 54, 5286; P. M. Biesheuvel, "Thermodynamic cycle analysis for capacitive deionization", *Journal of Colloid and Interface Science,* 2009, 332, 258; R. Zhao et al., "Charge efficiency: A functional tool to probe the double-layer structure inside of porous electrodes and application in the modeling of capacitive deionization", *The Journal of Physical Chemistry Letters* 2010, 1, 205; H. Li et al., "Novel graphene-like electrodes for capacitive deionization", *Environmental Science and Technology* 2010, 44, 8692; and M. A. Anderson et al., "Capacitive deionization as an electrochemical means of saving energy and delivering clean water. Comparing to present desalination practices: Will it compete?", *Electrochimica Acta* 2010, 55, 3845); membrane capacitive deionization (MCDI) (see, e.g., J. H. Lee et al., "Electrode reactions and adsorption/desorption performance related to the applied potential in a capacitive deionization process", *Desalination* 2010, 258, 159; J. B. Lee et al., "Desalination of a thermal power plant wastewater by membrane capacitive deionization", *Desalination* 2006, 196 125; H. Li et al., "Electrosorptive desalination by carbon nanotubes and nanofibres electrodes and ion-exchange membranes", *Water Research* 2008, 42 4923, P. M. Biesheuvel et al, "Membrane capacitive deionization", *Journal of Membrane Science* 2009, 346 256; Y. J. Kim et al., "Improvement of desalination efficiency in capacitive deionization using a carbon electrode coated with an ion-exchange polymer", *Water Research* 2010, 44, 990); and desalination using micro channels (see, P. M. Biesheuvel et al, "Theory of membrane capacitive deionization including the effect of the electrode pore space", *Journal of Colloid and Interface Science* 2011, 361, 239, batteries (see, e.g., H. Li et al, "Ion-exchange membrane capacitive deionization: a new strategy for brackish water desalination", *Desalination* 2011, 275, 6224) and microbial desalination cells (see, e.g., S. J. Kim et al, "Direct seawater desalination by ion concentration polarization", *Nature Nanotechnology* 2010, 5, 297). Several of these techniques are related to ongoing work on supercapacitor batteries (see, e.g., H. Li et al, "Ion-exchange membrane capacitive deionization: a new strategy for brackish water desalination", *Desalination* 2011, 275, 6224, and M. Pasta et al., "A desalination battery", *Nano Letters* 2012, 12, 839).

Background

In the last decade the art of CDI (capacitive deionization) has seen extensive attention. As suggested, seawater is passed between the plates of high surface area material such as carbon. Upon applying a "cell" voltage difference between the two plates, the one of negative polarity acts as a cathode and absorbs cations (such as Na+), with the other serving as the anode, absorbing anions (like Cl−) from the seawater. FIG. 1 provides a schematic illustration of the known desalination via the CDI process described by Porada, Zhao, et al., "Review on the science and technology of water desalination by capacitive deionization [OPEN ACCESS]". *Progress in Materials Science,* 2013, 58: 1388-1442. According to Porada, Zhao et al., FIG. 1 illustrates that that with CDI, "upon applying a voltage difference between two porous carbon electrodes, ions are attracted into the electrode, cations into the negative electrode (cathode, on top), anions into the positive electrode (anode, bottom). As a result, desalinated water is produced." This immobilization of ions decreases the salt concentration in the low channel, and results in the production of freshwater. Porada, Borchardt, et al., "Direct prediction of the desalination performance of porous carbon electrodes for capacitive deionization", Energy Environ. Sci., 2013, 6, 3700.

This is a capacitive process and ions are temporarily stored in the electrical double layers (EDLs) formed within the micro pores inside the carbon particles that constitute the electrodes. Ions do not absorb (electro) chemically and do not react in any way. Faraday chemical reactions as essential in batteries or pseudo-capacitance effects, are not the driving force for ion absorption in this capacitance process. The result is an elegant desalination methodology. See, U.S. Pat. No. 5,425,858 (Farmer) entitled "Method and apparatus for capacitive deionization, electrochemical purification, and regeneration of electrodes" which is incorporated herein by reference for all purposes. Enhancements to this configuration include the use of both anionic and cationic membranes across which the respective ions pass. FIG. 2 schematically illustrates a prior art membrane capacitive deionization (MCDI) process described by Porada, Zhao, et al. who indicate that with MCDI, a cation-exchange membraned is placed in front of the cathode, while an anion-exchange membrane is placed in front of the anode. The reason that membranes might be advantageous is that without them during the desalination step in which ions of one charge sign are attracted into an electrode (the counter ions), that in this period, ions of the opposite charge sign (co-ions having the same charge in the carbon matrix) are released from the electrode, therefore degrading the desalination efficiency. The use of a membrane selective only to counter ions effectively blocks the co-ions from escaping from the electrode, which increases desalination efficiency. See. L. Weinstein et al, "Capacitive deionization: challenges and opportunities". *Desalination & Water Reuse*, November-December 2013.

With the onset of renewable energy sources, an emerging technology termed electrochemical flow capacitors has been established for Grid energy storage. Operation is based upon a flowable carbon-electrolyte that is pumped from a storage reservoir between two polarized plates (Charging Process). Once fully charged, the slurry is pumped out of the cell and stored in external reservoirs until the process is reversed and the slurry is discharged. The charged slurry stores charge electrostatically at the carbon-electrolyte interface which allows for rapid charging and discharging leading to higher power density. Faradaic charging processes have losses that cause degradation of the device over time compared to electrostatic charging, which is near 100% efficient and millions of charge discharge cycles.

Capacitive deionization (CDI) is a technology used primarily in the desalination of brackish water (low or moderate salt concentration (below 10 g/L)) by applying an electrical potential difference over two porous carbon electrodes. Anions, ions with a negative charge, are removed from the water and are stored in the positively polarized electrode. Likewise, cations (positive charge) are stored in the cathode, which is the negatively polarized electrode. Other technologies for the deionization of water are, amongst others, distillation, reverse osmosis and electrodialysis. Compared to reverse osmosis and distillation, CDI is considered to be an energy-efficient technology for brackish water desalination. This is mainly because CDI removes the salt ions from the water, while the other technologies extract the water from the salt solution. See, M. E. Suss, et al., (2015). "Water desalination via capacitive deionization: what is it and what can we expect from it? [OPEN ACCESS]". *Energy Environ. Sci.* Weinstein, Lawrence; Dash, R. (2013). "Capacitive deionization: challenges and opportunities". *Desalination & Water Reuse*. Porada, Zhao, et al. (2013). "Review on the science and technology of water desalination by capacitive deionization [OPEN ACCESS]". *Progress in Materials Science*. 58: 1388-1442. M. A. Anderson, et al., (2010). "Capacitive deionization as an electrochemical means of saving energy and delivering clean water. Comparing to present desalination practices: Will it compete?" *Electrochimica Acta*. 55 (12): 3845-3856. "CDI & electrosorption". http://www.cdi-electrosorption-.org. CDI is also referred to as electrochemical demineralization, "electrosorb process for desalination of water", electrosorption of salt ions, capacitive desalination, and "CapDI".

For CDI as applied to desalination, the above flowable carbon-electrolyte principles are directly applicable in what is termed flow-electrode capacitive deionization (FCDI or Flow CDI). As depicted in FIG. 3, a schematic illustration of an existing FCDI process is described by Jeon, et al., "Desalination via a new membrane capacitive deionization process utilizing flow-electrodes", *Energy Environ. Sci.*, 2013, 6, 1471-1475. In Jeon, et al., a capacitive deionization process utilizing flow-electrodes (FCDI) was designed and evaluated for use in seawater desalination. The FCDI cell exhibited excellent removal efficiency (95%) with respect to an aqueous NaCl solution (salt concentration: 32.1 g $L^{-1}$), demonstrating that the FCDI process could effectively overcome the limitations of typical CDI processes. The characteristics of CDI applied to the flow electrode are maintained continuously by providing fresh flow electrodes with infinite ion capacitance. See, e.g., Zou et al., "Using mesoporous carbon electrodes for brackish water desalination", *Water Research* 2008, 42, 2340-8. Rommerskirchen, et al. "Single module flow-electrode capacitive deionization for continuous water desalination" *Electrochemistry Communications*. 60 (2015) 34-37, aptly describes the advances to FCDI from CDI. According to Rommerskirchen, et al., classical CDI is a discontinuous or semi-continuous process due to the need for regeneration of the electrodes within the same module, but flow-electrodes offer new design opportunities which enable fully continuous desalination processes as well as easily scalable systems.

FCDI is a CDI technology exhibiting continuous and scalable deionization and a high desalting efficiency, but it has been reported that the electrochemical and flow properties of the flow electrode need to be improved to minimize energy consumption. Hatzell, et al. "Effect of oxidation of carbon material on suspension electrodes for flow electrode capacitive deionization." *Environ. Sci. Technol.*, 2015, 49 (5), pp 3040-3047; Yang, et al. "Flow-electrode capacitive deionization using an aqueous electrolyte with a high salt concentration." *Environ Sci Technol*. 2016 Jun. 7; 50(11): 5892-9.

Humanity continues to face an ever-growing demand for renewable energy and affordable drinking water as a result of population growth and increased industrial and agricultural activity. In recent years, carbon-based materials have emerged as key components for many energy and water related technologies because of the high availability and abundance, vast structural and chemical variability, and moderate to low costs. In particular, high surface area porous carbons used for ion electro sorption have become a versatile and uncomplicated technology platform with applications ranging from highly efficient capacitive energy storage (electrical double-layer capacitors, EDLCs, also known as supercapacitors) and water treatment via capacitive deionization (CDI). Currently, all capacitive technologies employ intermittent cycling: ion electro sorption is followed by a regeneration step, and subsequent repeating of this discontinuous procedure. This operational mode has been employed in electrochemical capacitors, capacitive actuators, and CDI.

CDI until now, exclusively involve solid film electrodes integrated in an electrochemical cell that enables and facilitates electrolyte in- and out-flow. Yet, two major drawbacks are the discontinuous output, in the form of desalinated water and the extra energy expenditure since ions have to travel twice across the ion exchange membrane interface, first in order to be adsorbed, and later to be released again to the spacer channel.

In contrast, in a system based on flow electrodes, FCDI, which operates in steady-state, the separated-out flow streams have constant composition (unvarying in time), while ions only transfer across the membrane once. Instead of the discharge step taking place in the same cell, the carbon flow electrode suspensions can easily be regenerated outside the cell by directly mixing the two carbon particles streams together, which results in spontaneous discharge and salt release. The discharged particles must be separated from the resulting brine (in case of desalination) and (together with a portion of the feed water) re-injected in the electrode channels. This operation can be achieved by simple particle filtration. Thus, a continuous water deionization process would have the potential to achieve higher energy efficiency, more stable system performance, and ultimately enable a simpler system design than classical designs based on film electrodes.

Flow electrodes as the key element to enable continuous operation are based on capacitive carbon slurries. A carbon slurry is a suspension of charged carbon particles in an electrolyte and was first investigated in the 1960's as a facile and robust technology to transport charge and electro-sorbed ions held in the electrical double-layer, EDL, within the carbon particle. Unique features of carbon suspensions are that flowing suspensions are still electrically conductive and that the EDL persists when the carrier particles are moved mechanically, or in our case, transported within a suspension. In fact, from a fundamental point of view, the equilibrium electro-sorption capacity of carbon materials should be identical for a flow or non-flow configuration. Having undergone a renaissance in recent years, flow electrodes have been proposed as breakthrough technologies to enable large scale energy storage and management and continuous CDI operation.

The potential of the carbon flow electrodes has recently been demonstrated for CDI where flow electrodes have been introduced in two channels, both separated from the feed water spacer channel by electrically insulating membrane material or ion exchange membranes that prevent mixing of the three streams at any time.

As the carbon flow electrode can be circulated and regenerated continuously, intrinsic ion uptake capacity per carbon mass is no longer limiting system operation because the electrode flow channel size (when setting up the system) and flow rate (during operation) can be adjusted to meet the necessary requirements set by the application.

In the current state of the art, FCDI has once again plateaued and stalled as with the classic CDI, in the elusive realization of a scaled-up practical and viable user-friendly product. Most FCDI patents that are emerging use the basic building blocks with innovative variations. The core FCDI building blocks consist of grooved stationary electrodes over which the carbon slurry is intimately contacted to transfer the charge. Juxtaposed between these electrodes are anionic and cationic membranes which when spaced form the saline water channel. Scale up has been suggested by Yang et al., "Stack design and operation for scaling up the capacity of flow-electrode capacitive deionization technology." *ACS Sustainable Chemistry and Engineering*, 2016, 4 (8), pp 4174-4180. However, the complexity remains with multiples of the core building blocks and expensive vulnerable ionic sheet membranes. This stack design, with its inevitable linear geometries presents complexities, and ionic membranes inevitably deteriorate from the flow of the abrasive slurries, combining to limit the performance of the scale up.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

To address the shortcomings of the prior art, Applicant designed a system and method for reducing the dissolved solids of a non-potable aqueous flow as set out in Applicant's U.S. Pat. No. 10,556,812, which is incorporated herein in its entirety for all purposes and directed to, e.g., a scalable FCDI System for desalination of, e.g., ocean and brackish water.

In one embodiment of Applicant's U.S. Pat. No. 10,556,812, there is described a flow-electrode capacitive deionization (FCDI) desalination cell comprising: (a) a tubular housing having an upper end and a lower end, a first interior annular fluid flow space extending between the upper and lower ends, a feed solution inlet port proximate the lower end in fluid communication with the first interior annular space, and a treated solution outlet port proximate the upper end in fluid communication with the first interior annular space; (b) an tubular upper end cap attached to the tubular housing upper end and comprising an internal annular upper end cap space, an upper seal member sealing the upper end of the tubular housing, and an outlet port in fluid communication with the internal annular upper end cap space, the upper seal isolating the internal annular upper end cap space from the tubular housing first interior annular space; (c) an tubular lower end cap attached to the tubular housing lower end and comprising an internal annular lower end cap space, a lower seal member sealing the lower end of the tubular housing, and an inlet port in fluid communication with the internal annular lower end cap space, the lower seal isolating the internal annular lower end cap space from the tubular housing first interior annular space; (d) a plurality of tubular membranes oriented in parallel relationship to each other, each membrane having a lower end, an upper end, an outer surface and an inner tubular space therebetween, each tubular member being mounted within the cell so that its lower end is in fluid communication with the internal annular lower end cap space, so that it passes in sealed fashion through the lower seal member, so that it extends through the first annular fluid flow space, so that it passes in sealed fashion through the upper seal member, and so that its upper end is in fluid communication with the internal annular upper end cap space, each tubular member connecting the lower end cap space and the upper end cap space in fluid communication; and (e) a plurality of electrodes extended through each respective membrane inner tubular space, respectively, wherein approximately one half of the plurality of electrodes each has a positive polarity, wherein the remainder of the plurality of electrodes each has a negative polarity, and wherein the negative and positive polarity electrodes are evenly distributed through the plurality of electrodes to create a plurality of pairs of tubular membranes having opposite polarity. The annular lower end cap space is capable of receiving a carbon slurry through the lower end cap inlet. The carbon slurry is capable of moving through the inner tubular spaces of the plurality of tubular members into the annular upper end cap space and then out the upper end cap outlet. In various embodiments, the plurality of electrodes may comprise titanium wire, graphite rod wire, electrode coils, or electrode mesh. The plurality of tubular membranes may be selected from the group consisting of ultra-fine (UF) filter tubes, cellulose ester membranes, tubular ionic membranes, porous, compressible PTFE and/or fluorocopolymers.

In another embodiment Applicant's U.S. Pat. No. 10,556,812, there is described a flow-electrode capacitive deionization (FCDI) desalination system comprising: (1) an FCDI desalination cell as described herein; (2) a first motive force for introducing a feed solution, to be desalinated, through the feed solution inlet port and into the cell, at a first pressure $P_1$, and for urging the feed solution to move through the first interior annular fluid flow space while contacting the outer surfaces of the plurality of tubular membranes before exiting the cell through the treated solution outlet port; (3) a source of carbon slurry; and (4) a motive force for introducing the carbon slurry into the cell annular lower end cap, at a second pressure $P_2$, through the lower end cap inlet, urging the carbon slurry to pass through the inner tubular spaces of the plurality of tubular members, into the annular upper end cap space and then out of the upper end cap outlet. The first and second motive forces may be positive forces created by a pump to push the feed solution through the cell. The first and second motive forces may also comprise a vacuum force to pull the feed solution through the cell. The FCDI desalination system may further comprise a reservoir for holding the carbon slurry, the reservoir being in fluid communication with the lower end cap inlet, the reservoir capable of separating excess saline solution from the carbon slurry.

There is also described in Applicant's U.S. Pat. No. 10,556,812 a method of flow-electrode capacitive deionization (FCDI) desalination of brine or brackish feed water solution comprising the steps of: (a) introducing the brine or brackish feed water solution into an FCDI desalination cell as described herein; (b) pressurizing the feed water solution to a first pressure $P_1$; (c) applying a positive polarity to the approximately one half of the plurality of electrodes designated to have a positive polarity; (d) applying a negative polarity to the remaining approximately one half of the plurality of electrodes designated to have a negative polarity; (e) introducing the carbon slurry into the cell annular lower end cap, at a second pressure $P_2$, through the lower end cap inlet, urging the carbon slurry to pass through the inner tubular spaces of the plurality of tubular members, into the annular upper end cap space and then out of the upper end cap outlet; and (f) directing the treated solution out the outlet port to a desired location. In one embodiment, this method may further comprise the steps of adjusting the first and second pressure so that $P_1 > P_2$. In another embodiment, this method may further comprise the steps of directing the carbon slurry from upper end cap outlet to a carbon slurry reservoir, and separating and removing any brine solution that may have accumulated in the carbon slurry prior to redirecting the carbon slurry back through the lower end cap inlet.

The present disclosure therefore improves upon the teachings of Applicant's U.S. Pat. No. 10,556,812 via the use of a novel FCDI desalination cell employing two coaxially oriented membranes mounted within a column housing capped with two end caps, each end cap comprising two slurry ports and one water port. The column is lined with a chargeable sleeve capable of receiving a positive or negative charge. The annular space between the chargeable sleeve and the outside surface of the outer concentric membrane creates a flow path for a first carbon slurry to pass therethrough. The space between the inside surface of the outer concentric membrane and the outer surface of the inner concentric membrane creates a flow path for the saline water to be treated. The space within the inner annular portion of the inner concentric membrane creates a flow path for a second carbon slurry. The first and second opposed end caps on the column are outfitted to continue these independent flow paths. As the first carbon slurry enters a right side port of the lower end cap, it proceeds through its annular path and exits a right side port of the upper end cap. As the first carbon slurry proceeds through its flow path, it receives a charge (e.g., a negative charge) from the chargeable sleeve. As the second carbon slurry enters a central port of the lower end cap, it proceeds through its annular path and exits an opposed central port of the upper end cap. As the second carbon slurry proceeds through its flow path, it receives an opposite charge (e.g., a positive charge) from a chargeable rod/wire extending through this flow path. As the saline water enters a left side port of the lower end cap, it proceeds through its annular path (between the two coaxial membranes) and exits a left side port of the upper end cap. As the saline water proceeds through its flow path, its salt ions are removed across the coaxial membranes by the adjacent first and second carbon slurry flows.

The present disclosure discloses an exemplary flow-electrode capacitive deionization (FCDI) desalination cell comprising a tubular housing oriented about a central axis and having an upper end, a lower end, an inner surface, an outer surface, an interior space and an inside diameter. The cell has an outer tubular membrane extending about the central axis between the tubular housing upper end and the tubular housing lower end, the outer tubular membrane having an upper end, a lower end, an outer surface, an inner surface and an inside diameter, and an outside diameter smaller than the tubular housing inside diameter. The cell also has an inner tubular membrane extending about the central axis between the tubular housing upper end and the tubular housing lower end, the inner tubular membrane having an upper end, a lower end, an outer surface, an inner surface, an inside diameter, and an outside diameter smaller than the outer tubular membrane inside diameter, the inner tubular membrane being coaxially aligned along the central axis within the outer tubular membrane.

A chargeable sleeve lines the inner surface of the tubular housing, the chargeable sleeve having upper and lower ends, an inner surface, and is capable of receiving a positive or negative polarity. A chargeable wire extends down the central axis through the tubular housing member, the chargeable wire having an upper end and a lower end, and is capable of receiving a positive or negative polarity opposite to the polarity of the chargeable sleeve.

The cell further comprises a a first annular space between the outer tubular member outer surface and the chargeable sleeve inner surface for receiving a first carbon slurry; a second annular space between the outer tubular membrane inner surface and the inner tubular membrane outer surface for receiving a feed solution to be treated; and a third annular space between the inside diameter of the inner tubular membrane for receiving a second carbon slurry.

A tubular lower end cap is attached to the tubular housing lower end and comprises a cylindrical side wall having a left side and a right side; an end face; a right side inlet port extending outwardly from the right side wall of the lower end cap for receiving a first carbon slurry flow, the right side inlet port creating a separate first carbon slurry flow channel within the tubular lower end cap; a left side inlet port extending outwardly from the left side wall of the lower end cap for receiving the feed solution to be treated, the left side inlet port creating a separate feed solution flow channel within the tubular lower end cap; a lower inlet port extending outwardly from the lower end cap end face about the central axis for receiving a second carbon slurry flow, the lower inlet port creating a separate second carbon slurry flow channel within the tubular lower end cap; a chargeable wire lower electrode connected to the chargeable wire lower end and extending along the central axis through the lower second carbon slurry inlet port in sealed fashion; an inner tubular barbed fitting extending inwardly along the central axis from the lower second carbon slurry inlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the lower end of the inner tubular membrane about the central axis; an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane; and a lower chargeable sleeve interface port for receiving a lower chargeable sleeve electrode therethrough in sealed fashion, the lower chargeable sleeve electrode being attachable to the lower end of the chargeable sleeve.

Similarly, the cell comprises a tubular upper end cap attached to the tubular housing upper end. The upper end cap is structurally identical with the lower end cap but is mounted on the housing rotated 180 degrees about the central axis relative to the lower end cap. The upper end cap comprises a cylindrical side wall having a left side and a right side; an end face; a right side outlet port extending outwardly from the right side wall of the lower end cap for discharging the first carbon slurry flow, the right side outlet port creating a separate first carbon slurry flow channel within the tubular upper end cap; a left side outlet port extending outwardly from the left side wall of the upper end cap for discharging a treated solution, the left side outlet port creating a separate treated solution flow channel within the tubular upper end cap; an upper outlet port extending outwardly from the upper end cap end face about the central axis for discharging the second carbon slurry flow, the upper outlet port creating a separate second carbon slurry flow channel within the tubular upper end cap; a chargeable wire upper electrode connected to the chargeable wire upper end and extending along the central axis through the upper second carbon slurry outlet port in sealed fashion; an inner tubular barbed fitting extending inwardly along the central axis from the upper second carbon slurry outlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the upper end of the inner tubular membrane about the central axis; an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane; and an upper chargeable sleeve interface port for receiving an upper chargeable sleeve electrode therethrough in sealed fashion, the upper chargeable sleeve electrode being attachable to the upper end of the chargeable sleeve.

The cell further comprises a first carbon slurry flow path comprising the lower right side inlet port, the separate first carbon slurry flow channel within the lower end cap, the first annular space, the separate first carbon slurry flow channel within the upper end cap, and the upper right side outlet port; a feed solution flow path comprising the lower left side inlet port, the separate feed solution flow channel within the lower end cap, the second annular space, the separate treated solution channel within the upper end cap, and the upper left side outlet port; and a second carbon slurry flow path comprising the lower inlet port on the lower end cap, the separate annular second carbon slurry flow channel within the lower end cap, the third annular space, the separate annular second carbon slurry flow channel within the upper end cap, and the upper inlet port on the upper end cap.

In one embodiment, the chargeable sleeve, the upper and lower chargeable sleeve electrodes, the chargeable wire and the upper and lower chargeable wire electrodes comprise titanium or a coated titanium. The tubular membranes are selected from the group consisting of ultra-fine (UF) filter tubes, cellulose ester membranes, tubular ionic membranes, porous and compressible PTFE and/or fluorocopolymers.

Also disclosed is a flow-electrode capacitive deionization (FCDI) desalination system comprising an FCDI desalination cell of the coaxial tubular membrane variety as described herein; a first motive force for introducing the feed solution, to be desalinated, through the feed solution inlet port and into the cell, at a first pressure P1, and for urging the feed solution to move through the feed solution flow path while contacting the outer surface of the inner tubular membrane and the inner surface of the outer tubular membrane before exiting the cell through the treated solution outlet port; a source of the first carbon slurry; a second motive force for introducing the first carbon slurry into the first carbon slurry flow path, at a second pressure P2; a third motive force for introducing the second carbon slurry into the second carbon slurry flow path, at a third pressure P3.

Also described is a method of flow-electrode capacitive deionization (FCDI) desalination of brine or brackish feed water solution comprising the steps of: introducing the brine or brackish feed water solution into an FCDI desalination cell of the coaxial tubular membrane variety as described herein; pressurizing the feed water solution to a first pressure P1 and introducing it to the feed solution flow path; applying a positive polarity to the upper and lower chargeable wire electrodes; applying a negative polarity to upper and lower chargeable sleeve electrodes; introducing the first carbon slurry into the first carbon slurry flow path at a second pressure P2; introducing the second carbon slurry into the second carbon slurry flow path at a third pressure P3; and directing the treated solution out the treated solution outlet port to a desired location. This method may further comprise adjusting the first, second and third pressures for example so that P1>P2 and P3.

These and other embodiments are disclosed or are obvious from and encompassed by, the following Detailed Description.

BRIEF SUMMARY OF DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 9 depicts a schematic longitudinal sectional view of a FCDI desalination system cell according to yet another embodiment of the present disclosure.

FIG. 9A is a cross-sectional view taken along the lines 9A-9A in FIG. 9.

FIGS. 13A-13C Front view of tube sheet showing bores (FIG. 13A), and side profile views of the tube sheet showing channels for O-rings (FIG. 13B), and location of sealing O-rings in said channels (FIG. 13C) as depicted in Hobbs et al.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising." Moreover, inventive aspects lie in less than all features of a single disclosed embodiment. Thus, the claims following the Detailed Description are hereby expressly incorporated into this Detailed Description, with each claim standing on its own as a separate embodiment. Reference is now made to the drawings which depict preferred embodiments, but are not drawn to scale.

Example 1

As set out in Applicant's U.S. Pat. No. 10,556,812, to overcome the complexities of the stack design with their inevitable linear geometries; and further remove the dependencies on ionic membranes that will inevitably deteriorate from the abrasive slurries, a simple concept employing multiple ultrafine filter tubes 40 is described. A novel flow channel design is therefore disclosed deploying hollow cylindrical ion exchange membranes 40 that break with the paradigm of sandwich cell designs and unlock the full potential of capacitive carbon flow electrodes for environmental technologies. Referring to FIGS. 4, 5, 6A, and 6B, to overcome the complexities of the stack design with their inevitable linear geometries, a schematic FCDI desalination system cell concept 1A employing a multiple ultra-fine (UF) filter tubes 40 is described. In one embodiment, the tubes 40 are of the variety offered by Spectrum Laboratories, Inc., (Rancho Dominguez, C A) and described as biotech Cellulose Ester Membranes used for isolating ionic species; ionically conducting but electrically insulating. Clusters 40a of these tubes 40, nominally ¼ inch in diameter (in this embodiment) are housed inside a cylindrical housing 20 (which preferably is constructed of plastic), and sealed according to the principles described in U.S. Pat. No. 9,061,251 ("Hobbs et al.") entitled "Self-Sealing Membrane Contactor with PTFE Tubular Membranes", which is incorporated herein by reference for all purposes. The Hobbs et al. device will be generally described below in connection with prior art FIGS. 11, 12, 13A and 13B.

Figure 1:
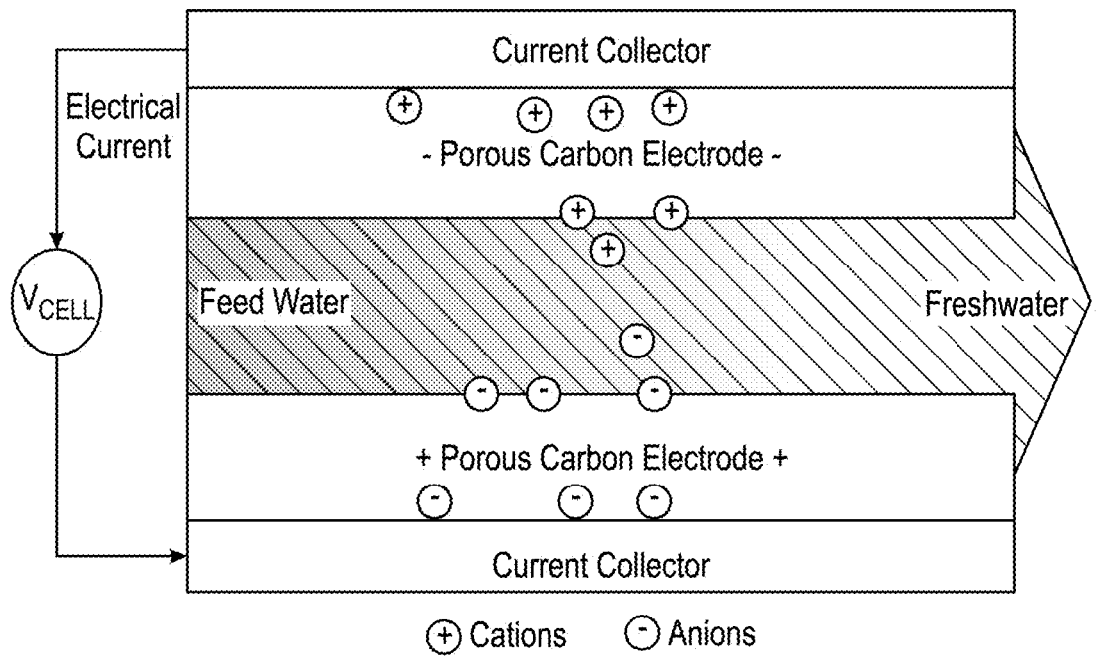
FIG. 1 depicts a schematic view of the prior art CDI desalination process described by Porada, Zhao, et al.
Figure 2:
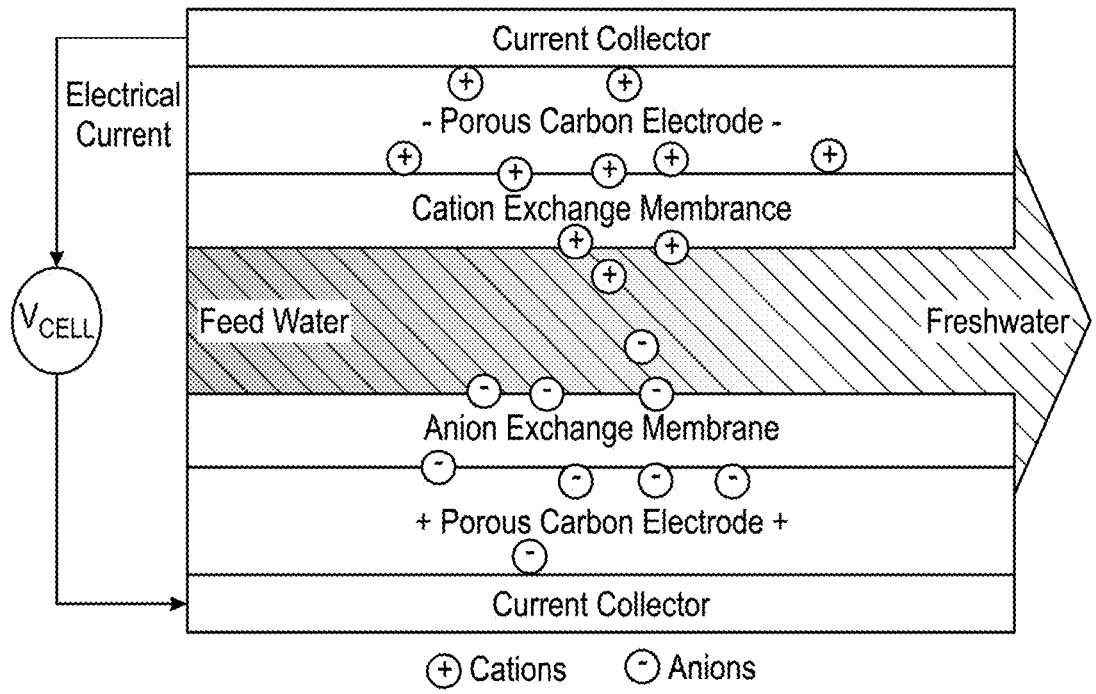
FIG. 2 depicts a schematic view of the prior art MCDI desalination process described by Porada, Zhao, et al.
Figure 3:
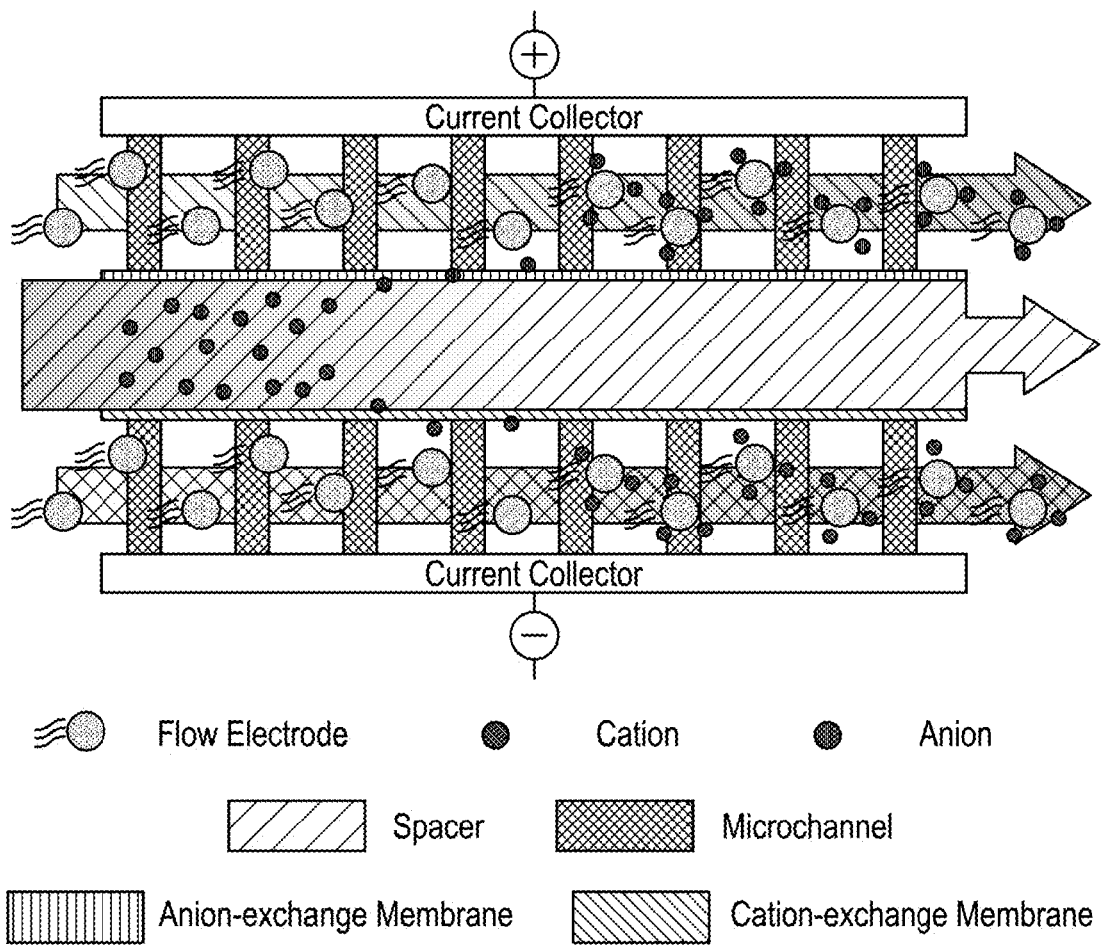
FIG. 3 depicts a schematic view of the prior art FCDI desalination process described by Jeon, et al.
Figure 4:
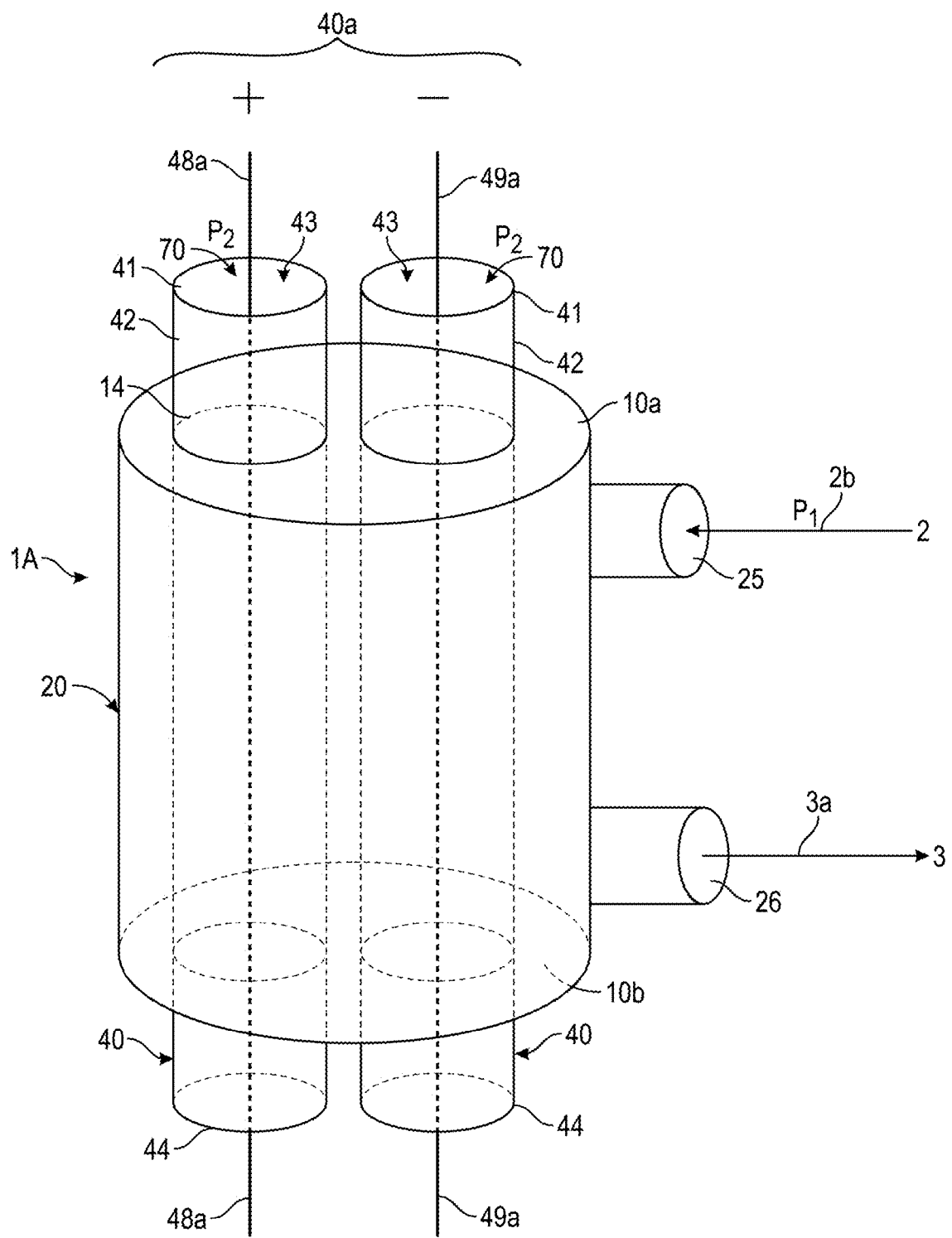
FIG. 4 depicts a schematic view of a FCDI desalination system according to one embodiment of the present disclosure.

A saline solution 2 (e.g., seawater) to undergo desalination is passed around the outside of the individual tubes 40 within the cluster 40a via side inlet ports 25 to the cylindrical housing 20, and ultimately the treated, desalinated water 3 exits out of the outlet port 26 into conduit 3a. Each tubular membrane 40 comprises an upper end 41, a lower end 44, and a tubular membrane wall member 42 defining an internal bore space 43. During operation, a carbon slurry 70 is permitted to transit the inside bore space 43 of the tubes 40 between upper and lower tubular membrane ends 41 and 44. The carbon slurry 70 circulates through the tubular membrane interior spaces 43 via a flow circuit not shown. Axially interspersed inside each of the individual tube internal bores 43 are wires 48a, 49a (fixed electrodes), constructed preferably of titanium and being preferably cylindrical in shape, extending through the full length of the individual tubes 40. Half of the wires 48a are connected to one polarity and the remaining half 49a to the opposite polarity according to the principles of FCDI. FIG. 4 illustrates an embodiment where the housing 20 contains two tubes 40. One tube 40 has a positive (+) polarity titanium wire electrode 48a running axially therethrough while the other tube 40 has a negative polarity (−) titanium wire electrode 49a running axially therethrough. Each tube 40 is capable of receiving a carbon slurry 70 within its interior tubular space 43. Other configurations are possible, for example, employing more tubes 40 in the housing 20.

The liquid to undergo desalination 2, e.g., seawater, enters the housing 20 through a feed solution inlet 25 (via pump 2a), and then circulates back out of the housing 20 through the treated solution outlet 26. Preferably, the electrodes 48a, 49a are oriented such that adjacent tubes 40 contain opposed polarity electrodes.

The system therefore provides a large surface area for the ingress saline solution 2. The system 1A also provides unique parallel wire geometry (48a, 49a) to create parallel flows of charged carbon slurry 70. In one embodiment, the carbon slurry 70 was prepared by mixing 85% wt % of porous carbon material (YP50-F, Kuraray Chemical, Osaka, Japan) with a saline solution. The improvement of performance and efficiency of this geometry is due to the cylindrical shape of the electrode(s) 48a, 49a. This provides an enhancement over the one sided linear plates employed in the traditional classic CDI geometries. A characteristic that makes this efficient is that two parallel current carrying wires (48a, 49a) exhibit a unique electric field. Clusters of geometrically interspersed polarities (40a) combine to focus the electric field intensities in a preferred electric field configuration that combine to enhance the overall field intensity.

Scale up of this system is twofold. For example, an increase in the desalination capacity can be achieved by: (a) increasing the dimensions of a single cell (FCDI desalination system 1A), and/or (b) incorporating multiples of the cell 1A.

Figure 5:
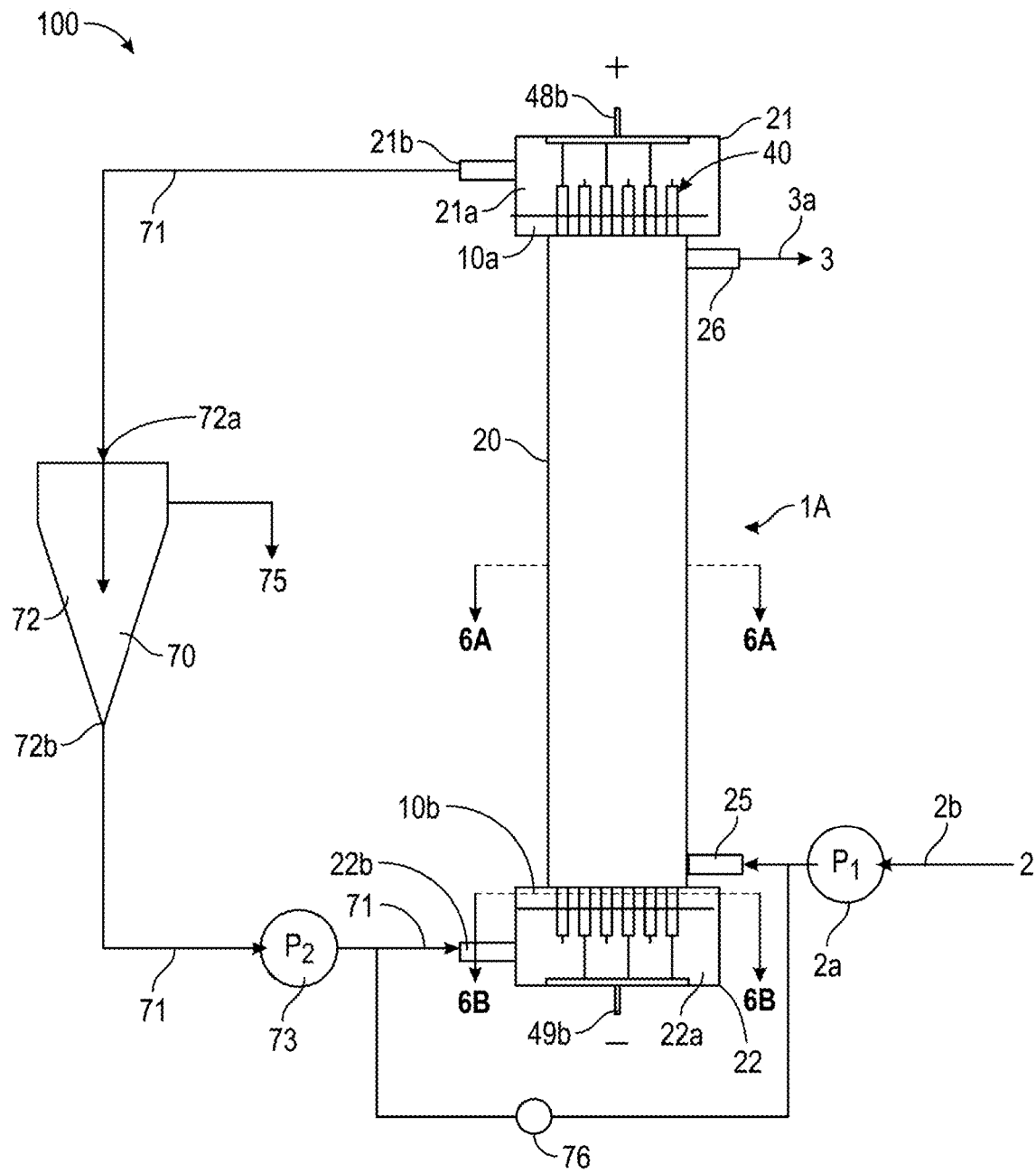
FIG. 5 depicts a schematic view of a FCDI desalination system according to one embodiment of the present disclosure.
Figure 6A:
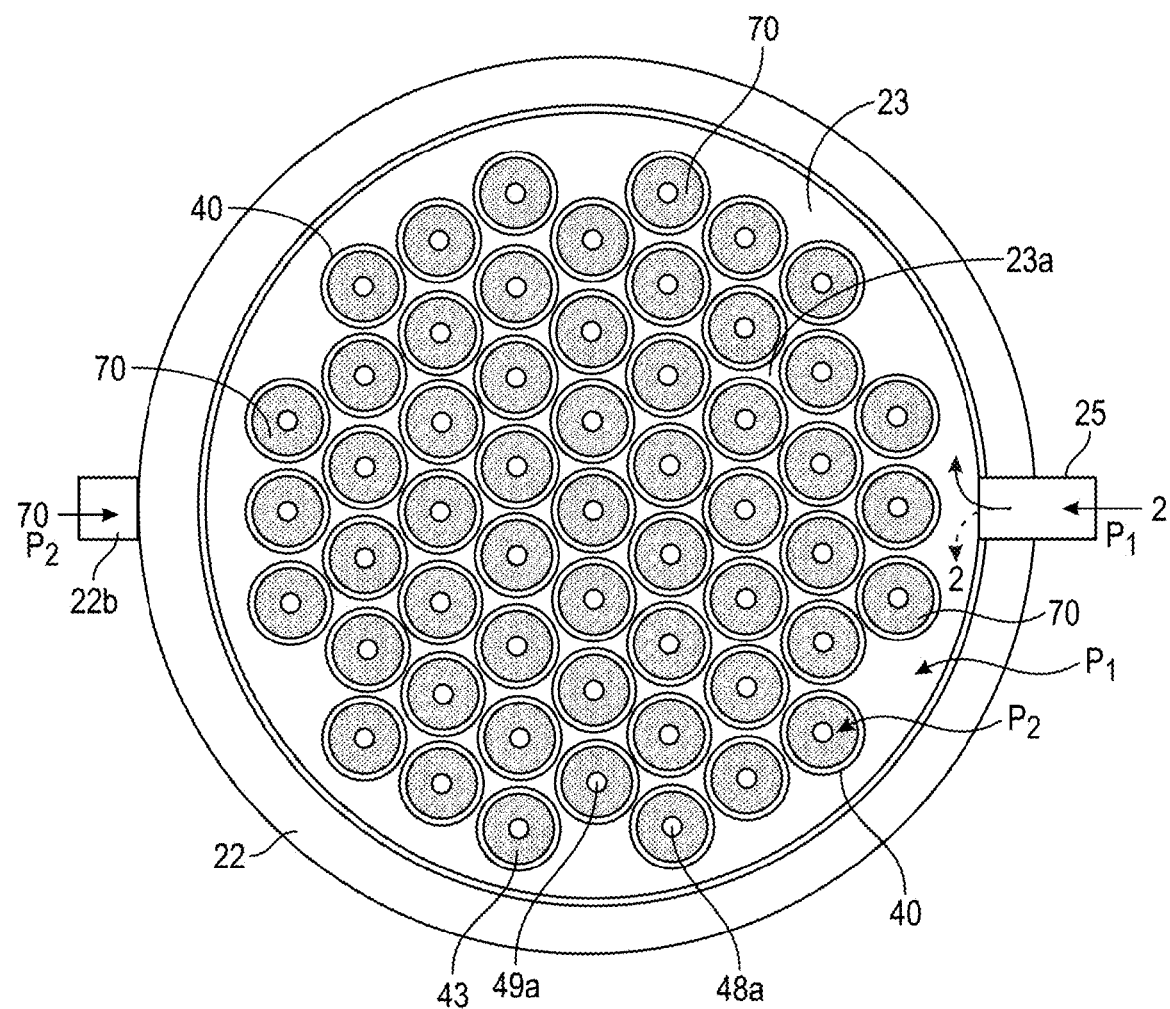
FIG. 6A depicts a cross-sectional view of the FCDI desalination system cell taken along lines 6A-6A of FIG. 5.
Figure 6B:
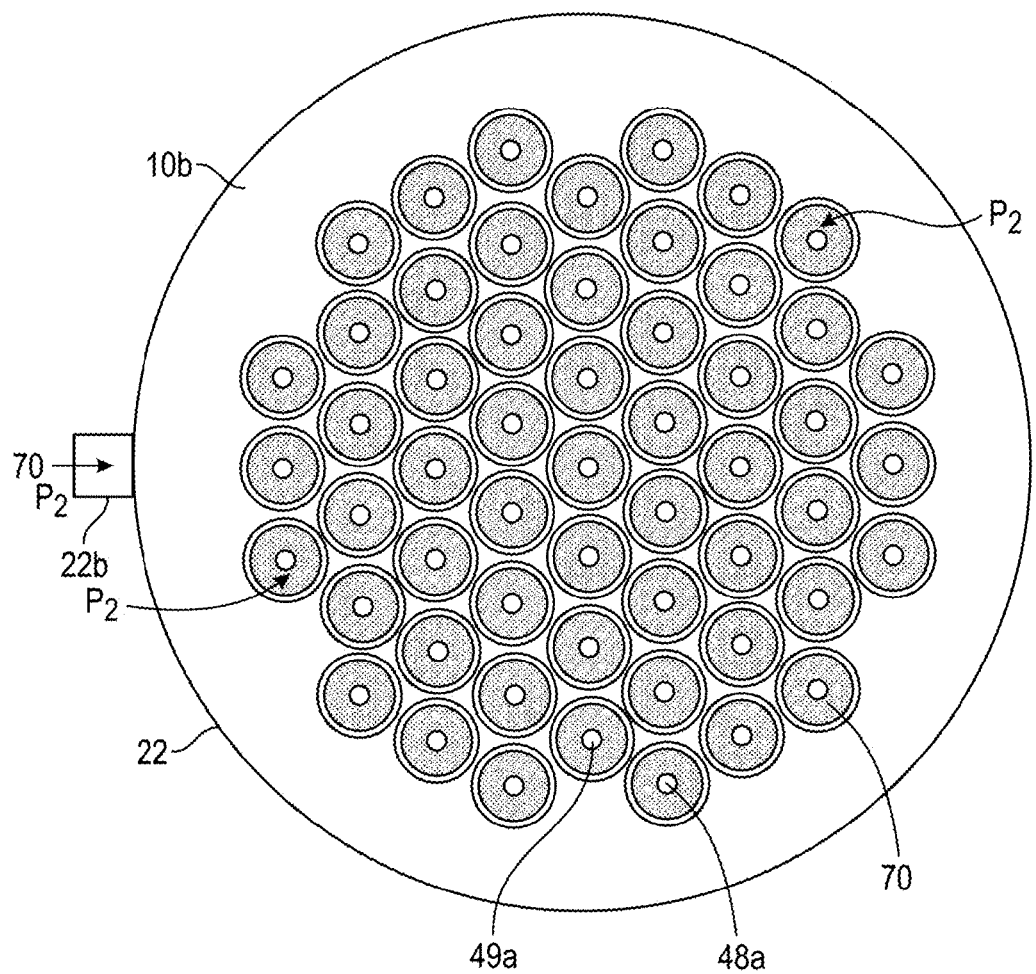
FIG. 6B depicts a cross-sectional view of the FCDI desalination system cell taken along lines 6B-6B of FIG. 5.

Referring now to FIGS. 5, 6A and 6B, there is illustrated a schematic diagram of an exemplary FCDI desalination system 100. The system 100 contains one or more FCDI desalination system cells 1A capable of receiving a saline feed water solution 2 through inlet 25. In one embodiment, each cell 1A generally comprises a cylindrical tubular member or housing 20 having an interior chamber 23 sealed via top and bottom end caps 21, 22. The housing upper end cap 21 comprises a sealing member 10a that seals the top end of the cell housing interior space 23, an upper end cap interior space 21a, and an upper end cap port 21b in fluid communication with the interior space 21a. Similarly, the housing lower end cap 22 comprises a sealing member 10b that seals the lower end of the cell housing interior space 23, a lower end cap interior space 22a, and a lower end cap port 22b in fluid communication with the interior space 22a.

Extending through the entire length of the cell interior space 23, and through the respective upper and lower seals 10a, 10b, are one or more, preferably a plurality, of membrane tubes 40. Each membrane tube 40 has an upper end 41, a lower end 44 and an inner tubular membrane space 43. The tubular member upper end 41 opens into fluid communication with the upper end cap interior space 21a and the tubular member lower end 44 opens into fluid communication with the lower end cap interior space 22a. The upper and lower seals 10a, 10b form a watertight seal around the outside of each tubular member 40. Therefore, the upper end cap interior space 21a and lower end cap interior space 22a are in fluid communication via the inner tubular membrane space 43 of each tubular membrane 40, but are otherwise isolated from the cell interior space 23.

Inserted from each end (41, 44) but singularly arranged in each tube are individual electrode wires (48a, 49a), such as cylindrical titanium electrode wires. Approximately one half of the electrodes 48a are configured to carry a positive charge while the other approximately one half of the electrodes 49a are configured to carry a negative charge. Preferably, the electrodes 48a, 49a are arranged such that for the most part each adjacent membrane tube 40 carries a positive wire 48a and a negative wire 49a, respectively. In one embodiment, the clusters of positive electrodes 48a are welded to a common positive electrode 48b located proximate, e.g., the upper end 41 of the membrane tubes 40, and the clusters of negative electrodes 49a are welded to a common negative electrode 49b located proximate, e.g., the lower end 44 of the membrane tubes 40.

A carbon slurry (electrolyte slurry) 70 is pumped (via slurry pump 73 at a desired pump pressure $P_2$) through conduit 71 into the lower end cap internal space 22a (through inlet port 22b). The carbon slurry 70 then proceeds through the inner tubular membrane space 43 of each tubular membrane 40 and into the upper end cap internal space 21a, and then out of the discharge port 21b. The carbon slurry 70 can then be recirculated back to pump 73 for reuse. In one embodiment, the carbon slurry 70 exiting the cell 1A is directed via conduit 71 into an electrolyte (carbon slurry) reservoir 72 through reservoir inlet 72a. If necessary, excess (overflow) saline solution can be separated out of the slurry and discharged through brine overflow conduit 75. The carbon slurry 70 can then exit the reservoir 72 through discharge port 72b and again be directed back into the cell 1A via conduit 71 and pump 73.

As the saline feed solution 2 is pumped (via pump 2a at desired feed pump pressure $P_1$) through conduit 2b into the interior space 23 of the cell 1A, it flows around the outsides of a cluster of spaced-apart membrane tubes 40 located therein, including through the channels 23a created between the tubes 40. The cluster of membrane tubes 40 are preferably closely packed together. The feed solution 2 undergoes desalination and then exits the cell as desalinated fluid 3 through discharge port 26.

In one mode of operation, the fluid pressure $P_1$ of the saline feed solution 2 within the cell internal space 23 is greater than the fluid pressure $P_2$ of the carbon electrolyte slurry 70 within the tubular membrane internal space 43 causing a positive pressure differential (as measured by sensor 76) from the outside of the tubular membrane to the interior space 43 of the tubular membrane.

FIG. 6A shows a cross-sectional view of the FCDI desalination system cell 1A taken across a midsection of the housing to illustrate one exemplary arrangement of the cluster of membrane tubes 40 spanning the length of the cell interior space 23. FIG. 6B depicts a cross-sectional view of the FCDI desalination system cell 1A taken across the lower seal 10b in the lower end cap 22 (the seal arrangement in the upper seal 10a being the same).

In one embodiment of the operation of the FCDI desalination system 100, the cell 1A comprises a housing 20 with quantity 60+ ultra filtration (UF) tubes 40 vertically arranged as described above. The filter properties are such that the tube material rejects carbon particles but allows cationic and anionic particles to pass, i.e., Na+ and Cl−. A 1.5 VDC power supply is attached. A carbon slurry 70 is pumped down the tubes 40. Each adjacent tube ideally carries positively 48a and negatively 49a charged carbon, respectively. Seawater (or other water to be desalinated) 2 enters the bottom of the cell 1A through inlet 25 and "floods" around the tubes 40 in a separate liquid circuit within the cell interior space 23. The respective ions are attracted from the seawater 2 into the carbon slurry 70. A characteristic that makes this efficient is that two parallel current carrying wires (48a, 49a) exhibit a unique electric field. Furthermore there is an exceptionally high density of tubes 40. Furthermore, a high viscosity carbon slurry 70 can be pumped (via pump 73) through the tubes 40. Also, by maintaining a small pressure differential of seawater over the carbon (where $P_1 > P_2$), a small percentage of water from feed solution 2 egresses from the cell interior space 23 into the carbon slurry circuit (tube interior spaces 43) which serves to create a means to remove the charge concentrate (brine) as shown via the brine overflow 75. Scale up is much simplified by using a larger diameter cell housing. The components of this system 100 are robust and low cost.

The carbon slurry reservoir (electrolyte reservoir) 72 provides storage and brine separation in one unit 72. Excess water is imparted to the carbon circuit (43, 71) by over pressuring by a small amount ($P_1$) the seawater circuit (2b-25-23-26-3a) over the pressure ($P_2$) of the carbon slurry circuit (22b-22a-43-21a-21b-71). This is monitored by a differential pressure sensor 76. This excess water dilutes and removes the accumulated recombined ionic species Na+ and Cl− through a simple filter overflow 75.

The carbon slurry 70 is pumped up through the tubes 40 or could be drawn up through the tubes by vacuum pump (not shown). Each adjacent tube preferably carries positively and negatively charged carbon respectively. Seawater 2 enters the bottom of the cell 1A inner chamber 23 and "floods" around the tubes in a separate liquid circuit. The respective ions are attracted from the seawater 2 into the carbon slurry 70. A characteristic that makes this more efficient than linear flat electrodes is that two parallel current carrying wires (or opposite charge) exhibit a unique electric field. Furthermore, there is an exceptional high density of tubes afforded with this configuration of parallel tubes).

Viscosity of the carbon slurry 70 may be increased tenfold. Desalination efficiency is directly proportional to the viscosity, i.e., surface area of carbon 70. Increasing the viscosity is the demise of all linear plate FCDI models, but is possible with the system of the present disclosure.

Notwithstanding the above, in the embodiment shown in FIGS. 4, 5, 6A, and 6B, the efficiency of this embodiment can become degraded due to co-ions escaping from the flow electrodes 40 back through the UF material and into the solution 2 residing in the cell interior space 23.

Example 2

Figure 7:
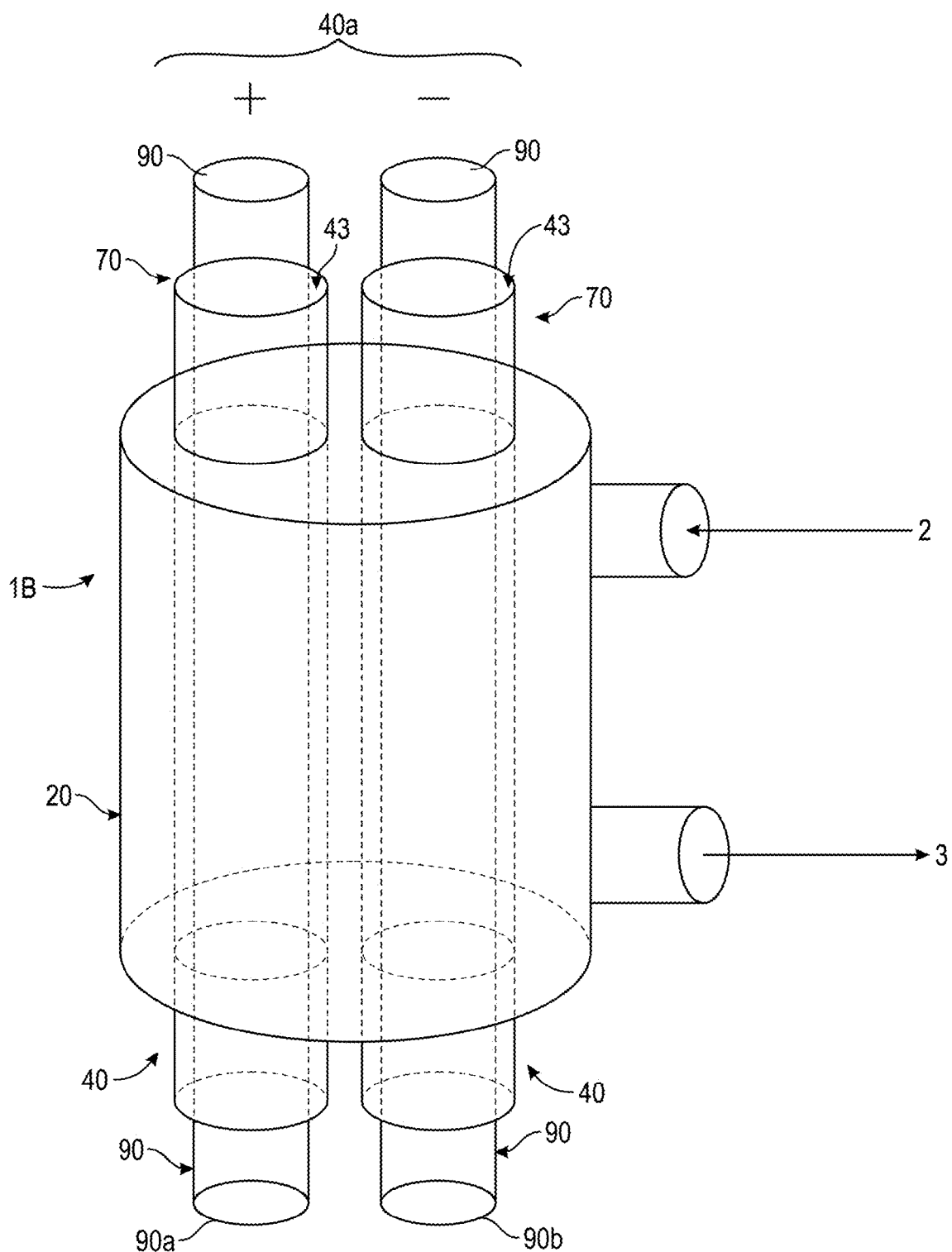
FIG. 7 depicts a schematic view of a FCDI desalination system cell according to another embodiment of the present disclosure.

Referring now also to FIG. 7 in connection with the prior Figures described above, another embodiment of the above configuration advantageously employs the use of tubular ionic membranes 40, such as those available via Membranes International Inc., NJ, USA. In this embodiment, a further enhancement is provided to the FCDI desalination system cell 1B by elimination of the low surface area titanium wire electrodes 48a, 49a (used in FCDI desalination system cell 1A described above) in favor of the use of graphite electrodes (rods) 90 that mostly fill the cross-sectional area of each membrane tube inner space 43. For example, as shown, rod 90a is a positively charged graphite electrode rod which creates a cationic membrane tube and rod 90b is a negatively charged graphite electrode rod which creates an anionic membrane tube. The carbon slurry 70 is pumped or drawn by vacuum between the inner membrane surface (inner membrane space 43) of the tube and the outer surface of the graphite rods 90. A further efficiency improvement is achieved by machining parallel grooves or spiral threaded surfaces (not shown) over the length of the graphite rods 90 to increase the (wetted) surface area of the rod with the carbon slurry 70. See A. Rommerrskirchen et al., "Single Module Flow-Electrode Capacitive de ionization for Continuous Water desalination", *Electrochemistry Communications* (2015). Grooves, spiral threads and other machined surfaces on the rods 90 may be employed. FIG. 7 illustrates an embodiment where the housing 20 contains two tubes 40. Other configurations are possible, for example, employing more tubes 40 in the housing 20.

Example 3

Figure 8:
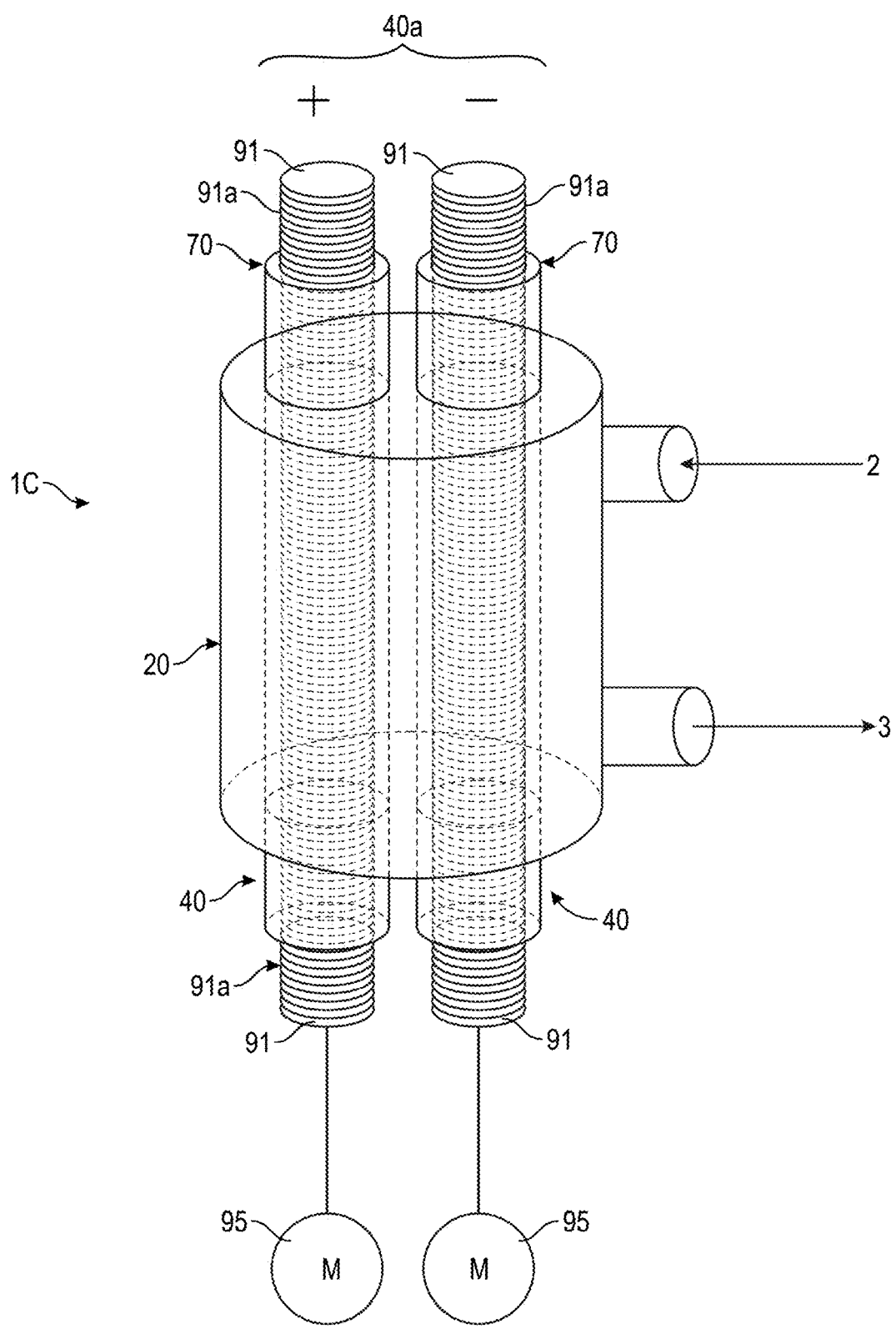
FIG. 8 depicts a schematic view of a FCDI desalination system cell according to yet another embodiment of the present disclosure.

Referring also to FIG. 8, there is shown an FCDI desalination system cell 1C wherein the above two configurations in examples 1 and 2 require slurry pumps to move the carbonaceous material. These typically are peristaltic or diaphragm pumps which disadvantageously contribute to the overall energy consumption of the system.

Energy consumption is reduced and efficiency increased if the carbon slurry 70 viscosity can be increased to that of a paste consistency such as tooth paste. This eliminates the pumps as described above but evokes the use of a screw pump or progressive cavity pump. However, in this embodiment 1C the screw portion is fabricated from the graphite rods 91, such as illustrated in FIG. 8 where the threaded or grooved portions 91a urge the carbon slurry through the inner space 43 of the tube 40 by action of the motors 95. Here, the threaded or grooved rod 91 also serves as the respective electrode anionic or cationic electrode. With this enhancement, high viscosity carbon slurries may be transported through the tubular membranes 40 resulting in an enhancement of the efficiencies achieved in the FCDI art. The graphite rods are rotated by small gear motors 95.

Example 4

Referring now to FIGS. 9 and 9A, common to the embodiments shown above in Examples 1 through 3 is the necessity to maintain a strong electric field between the respective electrodes or to realize a configuration that exhibits a maximum of capacitance resulting in highest efficiency of the invention. Capacitance (C) is inversely proportional to the separation of two electrically charged bodies. The closer the electrodes are to each other, the greater the capacitance. It will be understood that capacitance (C) is defined as $C=q/V$, where q is the charge (read as ions) attracted to the conductor; and V being the voltage across the conductors.

In another preferred embodiment of the FCDI desalination system cell 1D, the cell 1D comprises two axially concentric tubular membranes 40b, 40c positioned around a center solid core graphite rod 20b, and "packaged" within a cylindrical graphite tube 20a such as depicted in FIGS. 9 and 9A.

The spacing between these elements shall be minimized to maximize the capacitance, which in turn enhances the ion removal from the saline solution. Typical spacing is ¼ inch but a preferred spacing is ⅛".

With reference to FIGS. 9 and 9A, the two carbon slurry solutions, termed anolyte (negatively charged carbon slurry) 70a and catholyte (positively charged carbon slurry) 70b, flow on each side of the water gap 23b that is formed between the two concentric tubular membranes 40b, 40c coaxially aligned with each other.

Also to be noted is the ratio of slurry flow rate and feed water flow rate. A nominal ratio is anywhere between about 50:1 and about as low as 5:1 depending upon the viscosity of the slurry. A preferred rate of 20:1 using a carbon recipe slurry of 30 centistokes.

This embodiment provides for an outside graphite cylinder housing 20a of inside dimensions 3.88" as available from the Graphite Store, USA. Internal to this cylinder 20 are two tubular ionic membranes of diameters nominally 3.50" (outer membrane 40b) and 2.90" (inner membrane 40c) respectively. These membrane tubes are available from, e.g., Membranes International Inc. NJ. USA. Coaxial to this concentric array is a solid core graphite rod 20b of outside dimensions 2.50" such as available the Graphite Store, USA.

The slurry 70 enters the cell 1D and its flow path then feeds into the gaps 74a, 74b. In this particular embodiment, as shown in FIGS. 9 and 9A, slurry flow gap 74a is defined as the annular space between the outside surface of outer concentric tubular membrane 40b and the inside surface of tubular housing (e.g., graphite housing) 20a, which as shown here, is negatively charged via electrode 49b. As slurry 70 enters gap 74a it becomes negatively charged and continues to flow through annular gap 74a as an anolyte (negatively charged) carbon slurry 70a. Similarly, slurry flow gap 74b is defined as the annular space between the inside surface of inner concentric tubular membrane 40c and the outside surface of the center (graphite) core 20b, which as shown here, is positively charged via electrode 48b. As slurry 70 enters gap 74b it becomes positively charged and continues to flow through annular gap 74b as a catholyte (positively charged) carbon slurry 70b. The role of the wire electrodes, coil electrodes and mesh electrodes described herein it to charge the slurry 70. The graphite is connected to a positive or negative power supply as described, and the slurry is therefore in electrical contact with the graphite. The carbon slurry scavenges the ionic content, (Na+, Cl−, etc.) by electrostatic attraction through the ionic membranes. When the two slurries (70a, 70b) emerge from the cell, they are combined, and the carbon slurry is discharged. The ionic content is then filtered off as brine. The combined carbon slurries are recirculated back to the cell.

Figure 10:
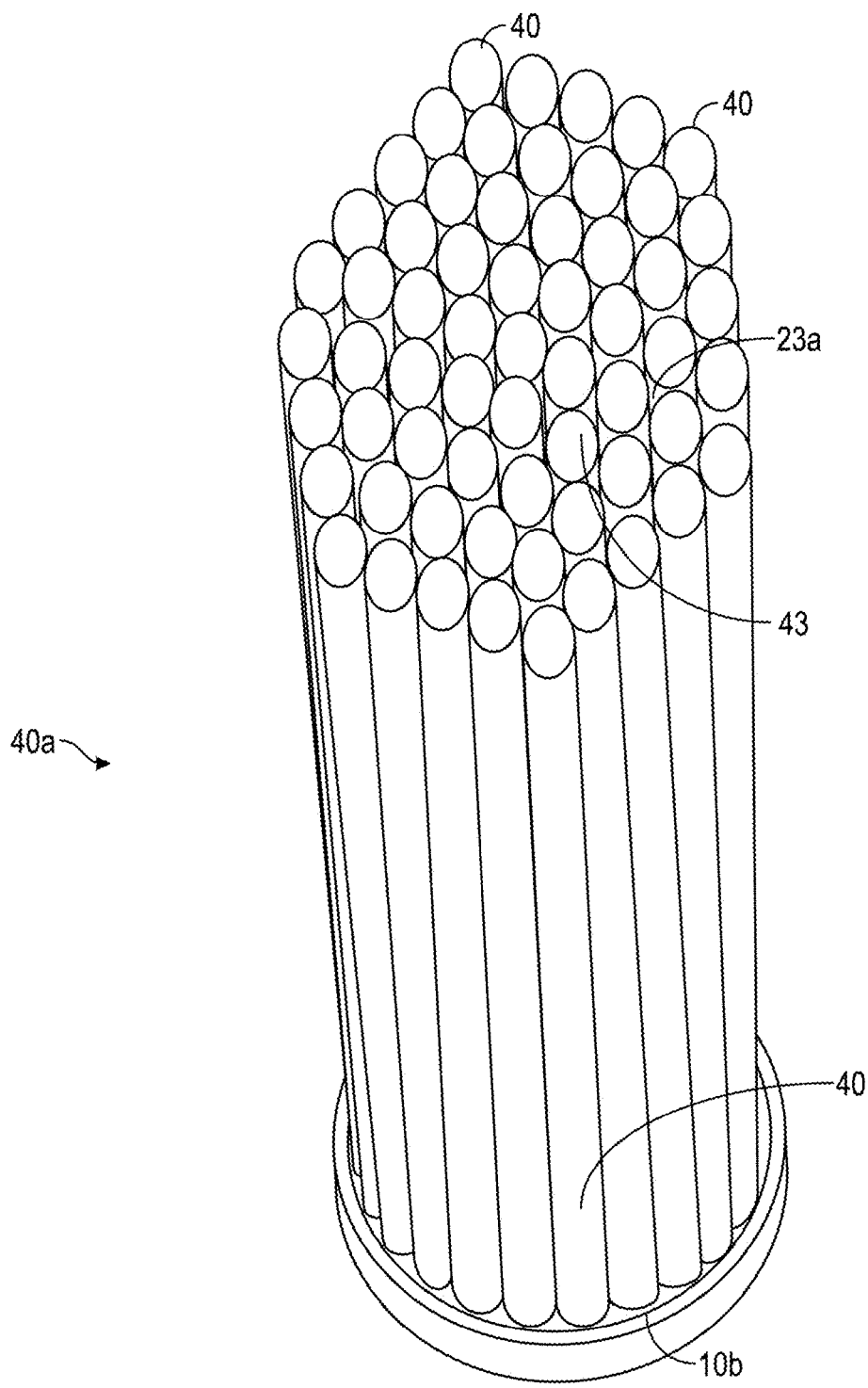
FIG. 10 depicts a close-up view of a plurality of tubular membranes emerging from a cylindrical housing as a cluster.

Referring now to FIG. 10, there is generally depicted a perspective view of a cluster 40a of tubular membranes 40 emerging through a seal, such as lower end cap seal 10b.

It will be appreciated by those having the benefit of the present disclosure that the desalination system of the present disclosure may be used to desalinate dirty water. For example, unlike with reverse osmosis desalination, the present system need not require the brine feed solution to first be pretreated since the system is only concerned with removing Cl− and Na+ ions. However, if the brine feed solution contains oil contamination, pretreatment to remove the oil is recommended. Additionally, as will also be appreciated by those having the benefit of the present disclosure, the concentration of the carbon slurry can be changed as may be desired.

As noted above, U.S. Pat. No. 9,061,251 to Hobbs, et al. is instructive on the general construction of a cell housing a cluster of tubular membranes. Referring now to FIGS. 11, 12, 13A, 13B and 13C (corresponding to Hobbs FIGS. 1, 2, 3A, 3B, 3C, with the numbering reflected make each a 100s series number by adding a "1" in front of the original Hobbs numbering). Hobbs discloses a tubular membrane module and its method of manufacture wherein tubular membranes form an interference self-sealing fit with hard tube sheets with the aid of a hard hollow mandrel inserted at the end of the tubular membranes. The tubular membranes are comprised of porous, compressible PTFE and/or fluorocopolymers. The self-sealing method described herein requires no heat treatment, allows for ease of manufacture without destruction of the tubular membranes and without the processing complexity of utilizing any additional potting agent, extrusion, or chemical cross-linking of any polymeric adhesives. The self-sealing PTFE tubular membranes have superb chemical resistance and temperature resistance, and through the benefits of this invention, offer higher pullout resistance than typically observed with potting materials such as polyurethane and epoxy. In addition, the self-sealing method is reversible and non-destructive (whereas chemical potting and sealing methods using heat are not), as one can easily remove one or more damaged tubes and replace them.

The tube sheets used in Hobbs are produced from any suitable polymer or other material that is harder than the tubular membrane and preferably softer than the insertable hollow mandrel. The insertable hollow mandrel is produced from any suitable polymer, polymer composite, or metal that is harder than the tubular membrane and generally harder than the tube sheet material. Generally speaking, one would not want the insertable hollow mandrel to deform, but rather the tubular membrane to compress between the two harder surfaces of the tube sheet and the insertable hollow mandrel. While the tube sheet may be harder than the insertable hollow mandrel, this combination runs the risk of possibly damaging the tubular membrane on assembly or deformation of the insertable hollow mandrel on assembly or over time.

Figure 11:
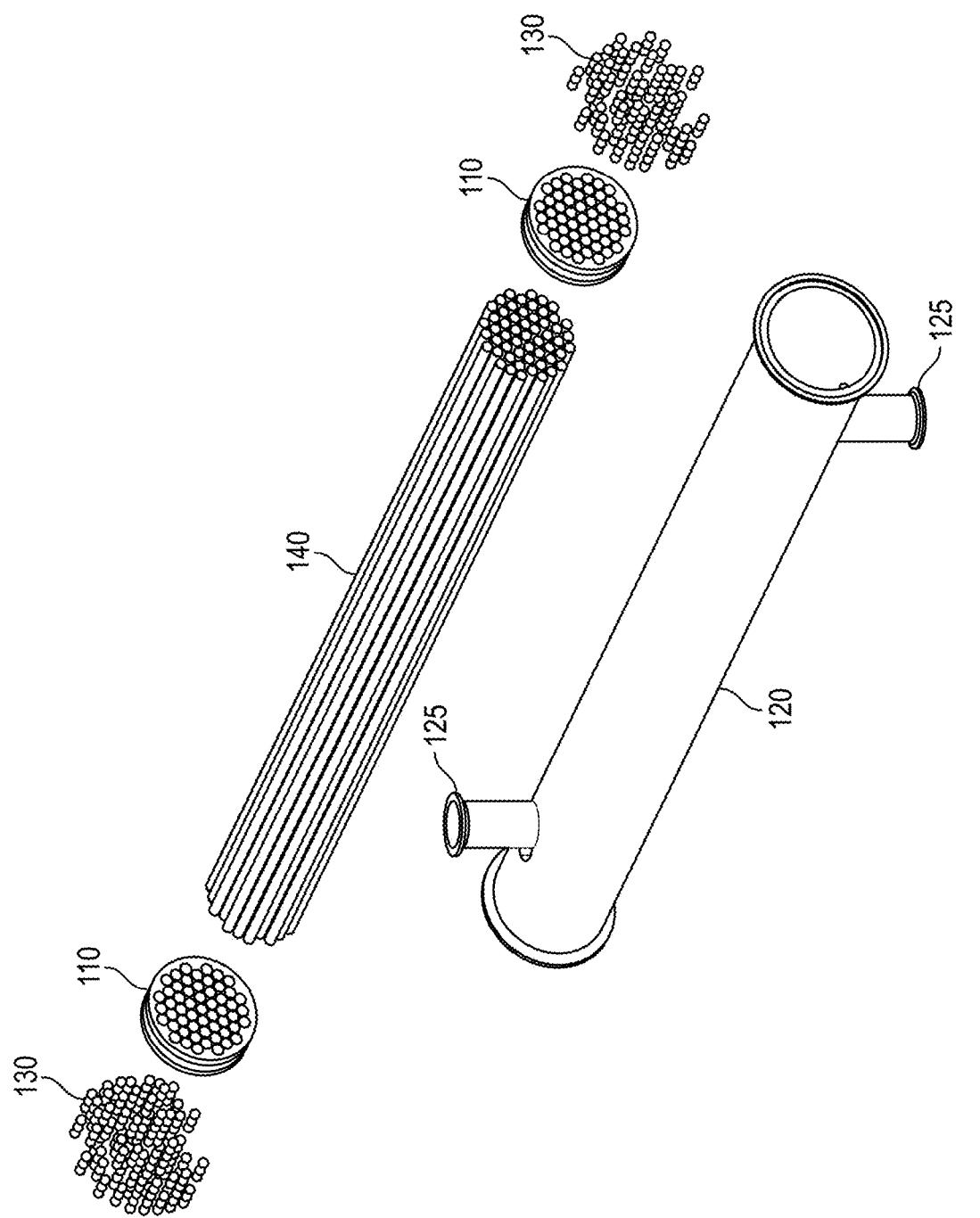
FIG. 11 depicts an exploded view of a prior art housing, tubular membranes, tube sheets, and insertable hollow mandrels as taught in U.S. Pat. No. 9,061,251 ("Hobbs et al."), which is incorporated herein by reference for all purposes.

According to Hobbs, the key elements used to assemble a contactor or filter module employing the self-sealing tube design are shown in an exploded view in FIG. 11. The elements consist of one or more tubular membranes 140, one or more tube sheets 110, a suitable housing 120 designed to accommodate a tube sheet 110 in either end, and an insertable hollow mandrel 130 for each end of the tubular membranes 140 that penetrate the holes 114 in the tube sheet 110. The housing is fitted with one or more ports 125 through the wall of the housing 120 to allow discharge of flow that has passed from the inside channel of the tubular membranes and through the membrane wall. Conversely the flow may enter one or more of the ports 125 in the wall of the housing 120 and penetrate the walls of the tubular membrane 140 and discharge through the central channel of each of the tubular membranes 140.

Figure 12:
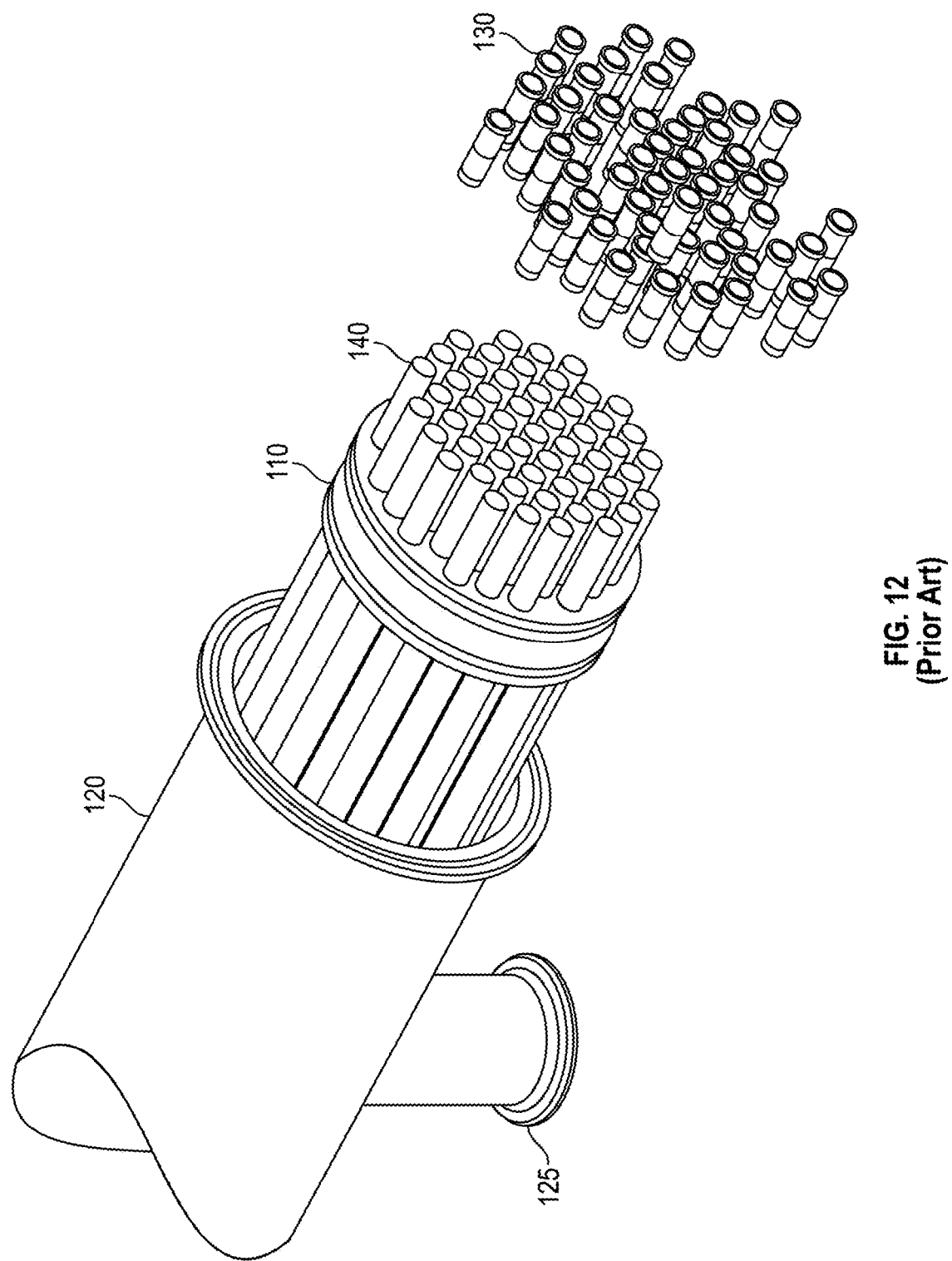
FIG. 12 depicts a close up of one end of the Hobbs et al. prior art housing of FIG. 11 showing exploded view of tube sheet, tubular membranes, and insertable hollow mandrels.

FIG. 12 is an enlargement of one of the tube sheet ends showing the relationship between the housing 120, the insertable hollow mandrels 130, the tubular membranes 140, and the tube sheet 110.

According to Hobbs, to produce a contactor or filter module using the self-sealing tube design, one starts with a tube sheet 110 shown in cross section and profile in FIG. 13A that has been machined to fit snugly within the contactor or filter module housing 120. The tube sheet 110 must be able to be attached to, and sealed into the housing 120 after the tubular membrane mounting steps are complete. This sealing may be accomplished by application of a suitable adhesive around the perimeter 111 surface of the tube sheet 110 FIG. 13B or through the use of an O-ring seal or seals 112 FIG. 13C mounted in channels 113 on the tube sheet 110. The adhesive would act as both a seal and a means of attaching the tube sheet 110 to the housing 120 while the use of O-rings would require an additional means of fixing the tube sheet to the housing. Such fixing means, to attach the tube sheet to the housing can include, but are not limited to, the use of a spanner ring on the outside of the tube sheet, retaining pins inside the housing, or a series of screws through the housing wall into the tube sheet. In addition, there are other fixing or sealing means that have various limitations that are known to those practiced in the art.

The tube sheets 110 for the Hobbs contactor or filter module design are drilled with a series of holes 114 to receive the tubular membranes. These openings in the tube sheet 110 may be counter bored to provide a flush surface on the tube sheet 110 once fit with the insertable hollow mandrel 130. The holes 114 for the tubular membranes are arrayed in a pattern dictated by the design of the contactor or filter module but are generally arrayed in a uniform pattern across the face of the tube sheet face 110. The spacing between the holes 114 is dictated by the size of the outer lip or flange on the insertable hollow mandrel, the diameter of the countersink if any, and the nature of the application. The number of holes determines the packing density of the tubular membranes. The packing density is defined as the sum of the individual cross sectional areas of the tubular membranes 140 divided by the available cross sectional area of the opening of the housing 120 expressed as a percent. The holes 114 may be cylindrical in shape, but may also have tapered walls, or be cut from other geometries to better fit the insertable hollow mandrel. Tapered walls facilitate a tight fit for the insertable hollow mandrel 130.

The thickness of the tube sheet 110 may vary, and is generally dependent on the diameter of the housing 120 and the length of the insertable hollow mandrel 130. The tube sheet 110 should be thick enough to allow for secure fastening to the housing 120 without displacing unnecessary volume inside the housing 120. It is desirable that the thickness of the tube sheet 110 be about 10% to 25% of the thickness of the inner diameter of the housing 120, although for smaller housings, thicker tube sheets may be employed to be certain that the insertable mandrel 130 is fully embedded in the tube sheet 110. Less than about 10% of the thickness of the inner diameter of the housing may not allow sufficient thickness to provide insertable mandrel stability and a seal around the insertable mandrel, and greater than about 25% would lead to unnecessary wasted space and material.

The diameter of the holes 114 in the tube sheet 110 is determined by the outer diameter of the tubular membrane 140. The diameter of the hole 114 is generally equal to the outer diameter of the tubular membrane 40 but may also be slightly smaller or slightly larger than the outer diameter of the tubular membrane 140 depending on the softness of the tubular membrane 140, the packing density, and the desired profile of the tubular membrane as it enters the tube sheet 110. If the holes 114 in the tube sheet 110 are much smaller than the diameter of the tubular membrane 140, then the wall of the membrane will have a propensity to fold in on itself, creating a potential leak and prohibiting the insertable mandrel 130 from seating properly. If the hole 114 is slightly larger than the diameter of the tubular membrane 140, then the tubular membrane must be able to stretch to accommodate the larger insertable mandrel 130. This runs the risk of tearing or damaging the membrane or creating a pocket where debris may accumulate. When fully inserted, the tubular membrane is locked in place and a fluid tight interference fit seal is established between the lumen end of the tubular membrane and the inner chamber of the housing.

One of the many advantages of the Hobbs method is that the mounting and sealing the porous tubular membranes in the tube sheets is reversible. During the course of use of a membrane contactor or filter, membrane tubes will occasionally be damaged, become plugged, tear, or otherwise fail, rendering the unit useless. A failed tube will cause the entire module to become inoperable. With other methods of mounting tubular membranes into end plates or tube sheets, the tubular membrane is permanently affixed to the tube sheet. With this invention, this shortcoming is eliminated, allowing the end user to remove and replace a singular or multiple tubular membrane(s) without destroying the housing, the tube sheet, or the remaining tubular membranes. It is conceivable that all the tubes could be removed and replaced, saving the housing and tube sheet assembly.

Figure 14:
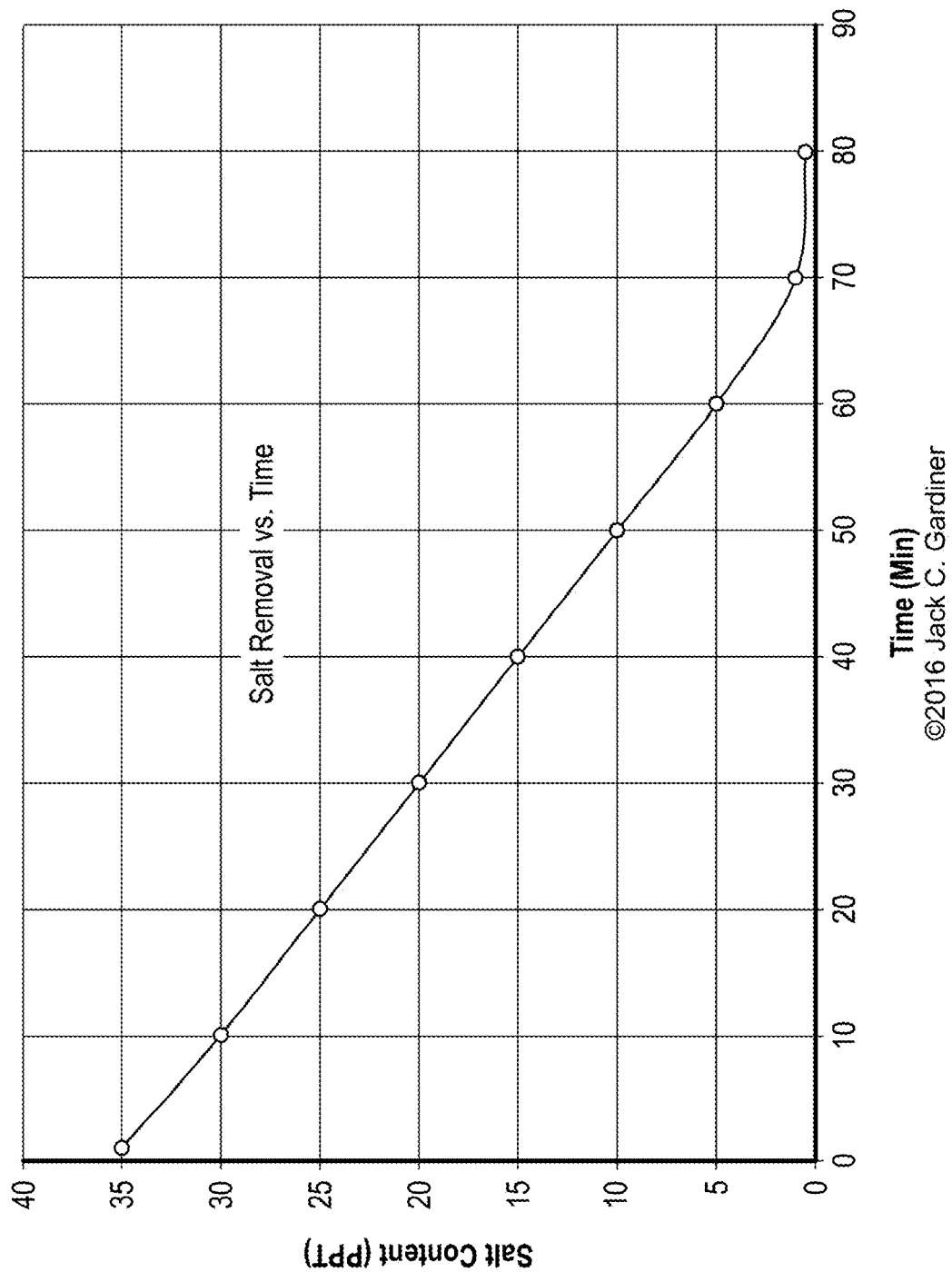
FIG. 14 illustrates a graph of the 'salt' removal, (salinity or conductivity reduction) versus time for a 36" long cell formed from the configuration described in FIG. 9.
Figure 15:
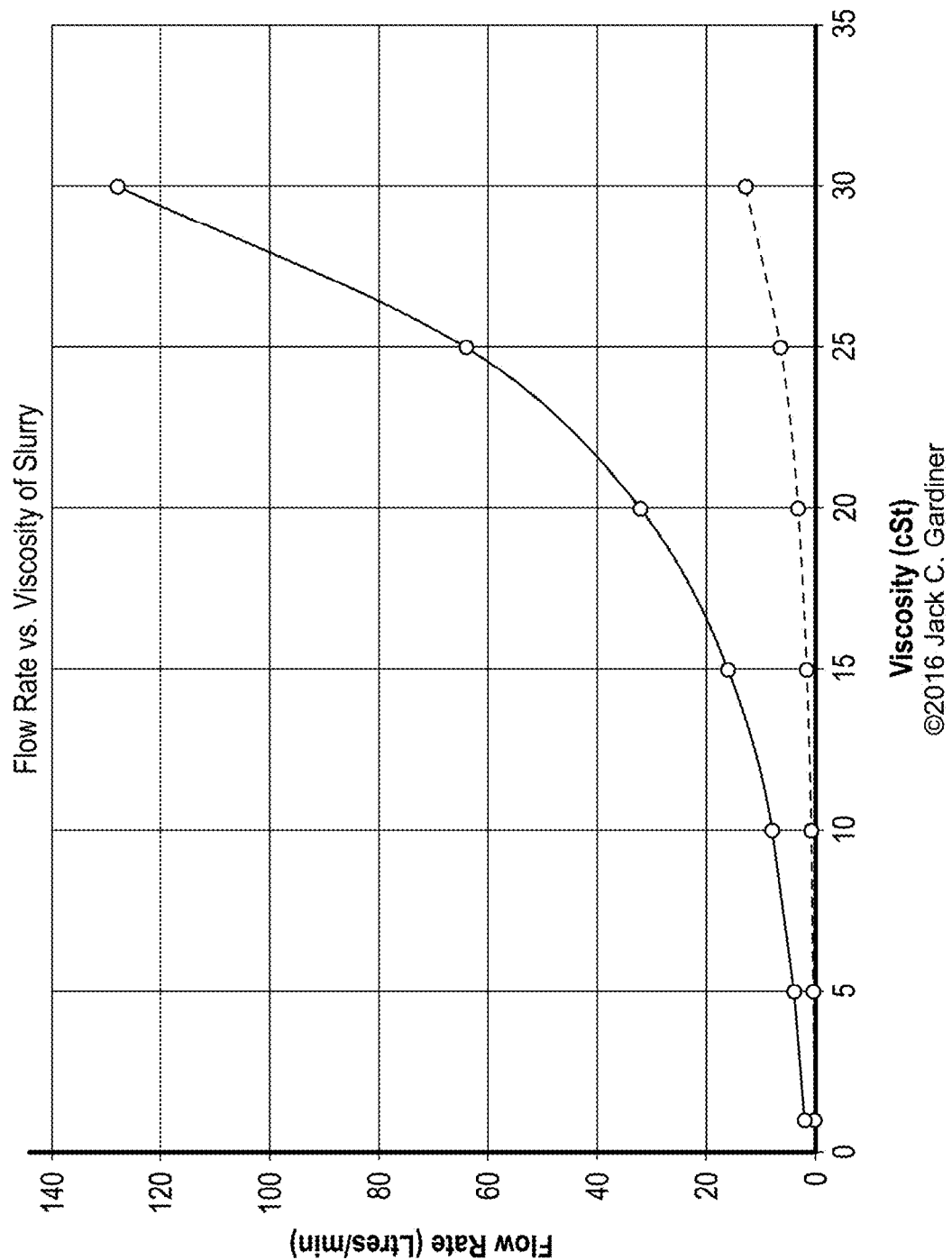
FIG. 15 illustrates the flow rate through the embodiment of FIG. 9 as a function of salt removal.

Referring now to FIG. 14, there is illustrated a graph of the 'salt' removal, (salinity or conductivity reduction) versus time for a 36" long cell formed from the configuration described in FIG. 9. The cell was operated in a recirculation mode. A one gallon volume of saline water of 35 ppt was circulated at a rate of 0.25 gpm. FIG. 15 illustrates the flow rate through the embodiment of FIG. 9 as a function of salt removal.

Figure 16:
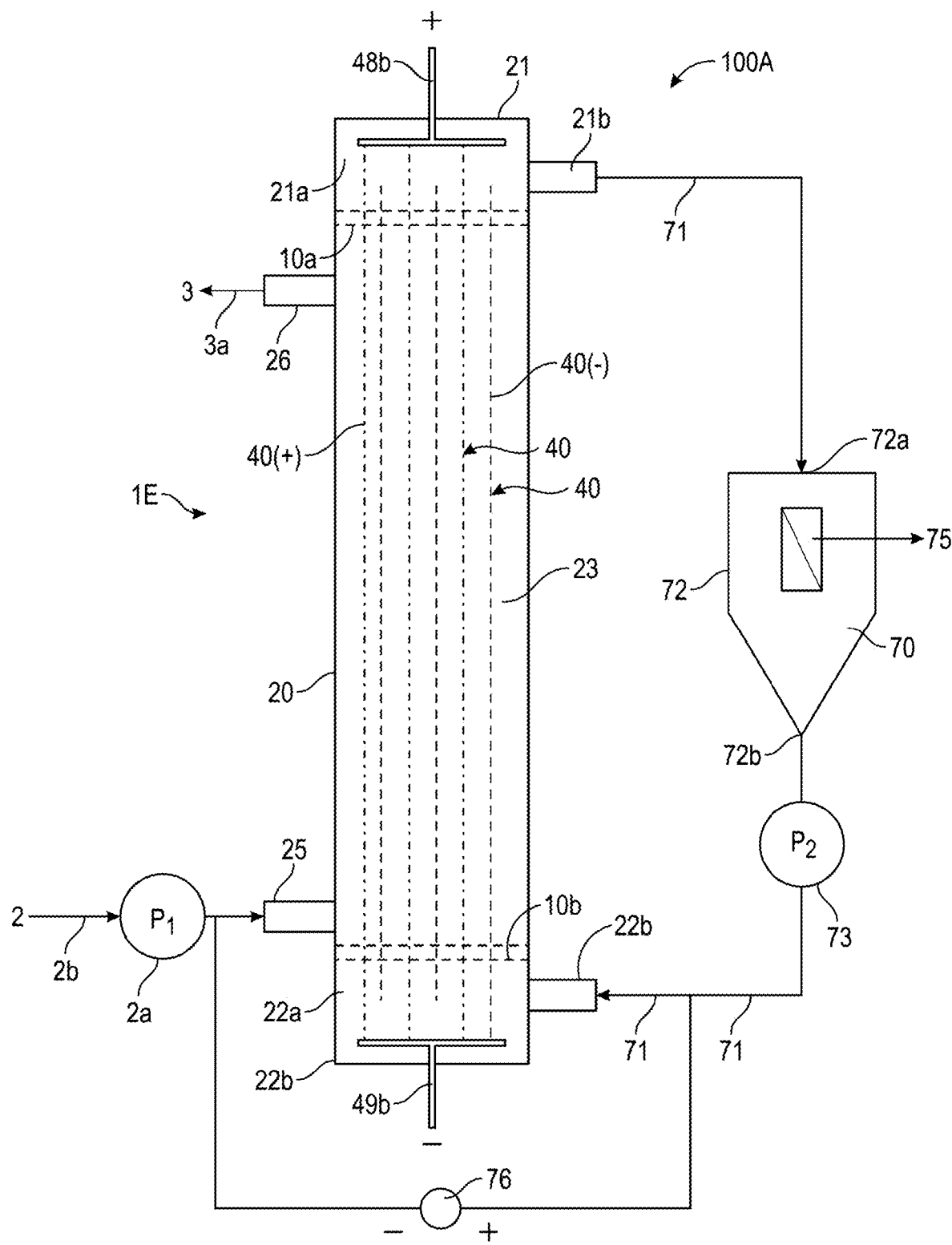
FIG. 16 depicts a schematic view of an FCDI desalination system according to another embodiment of the present disclosure.
Figure 17A:
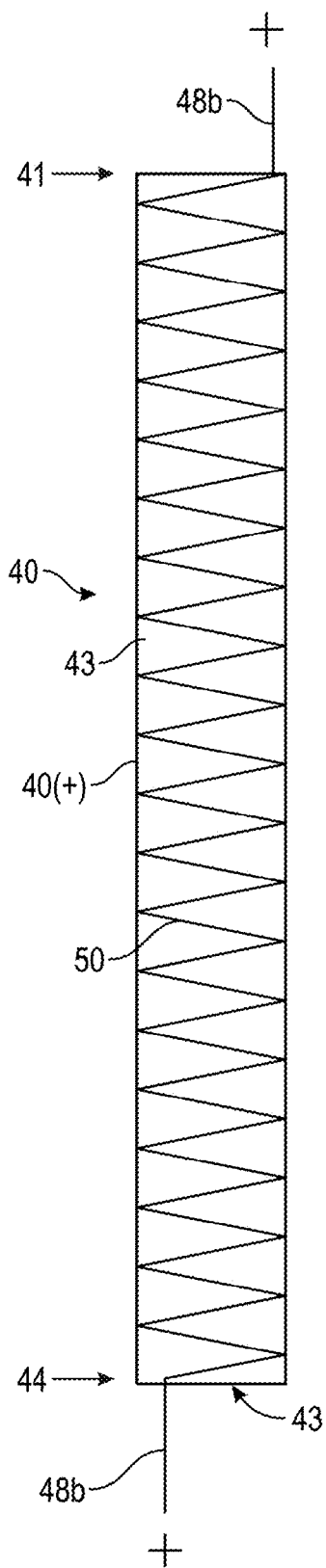
FIG. 17A depicts a cross-sectional view of a tubular membrane with a coiled wire electrode running through its inner tubular space according to another embodiment of the present disclosure.
Figure 17B:
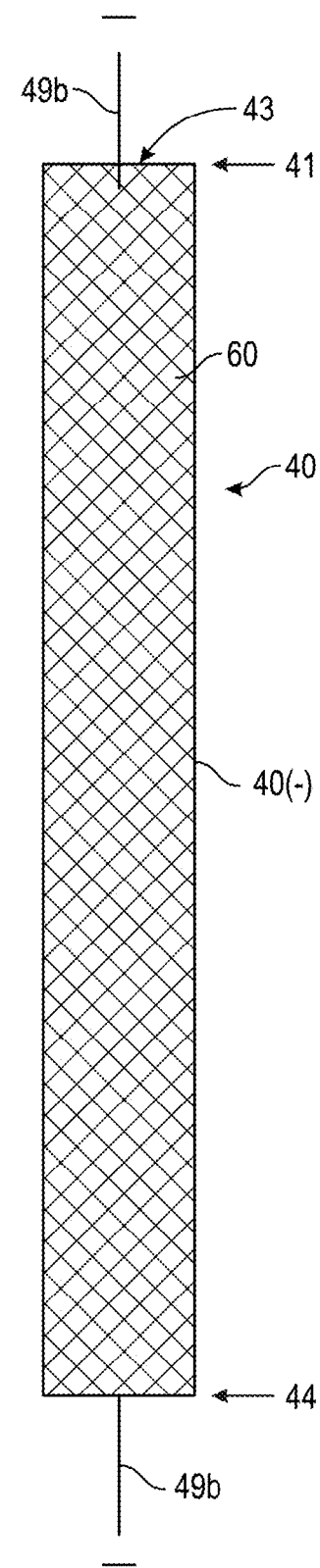
FIG. 17B depicts a cross-sectional view of a tubular membrane with a mesh electrode running through its inner tubular space according to another embodiment of the present disclosure.
Figure 18A:
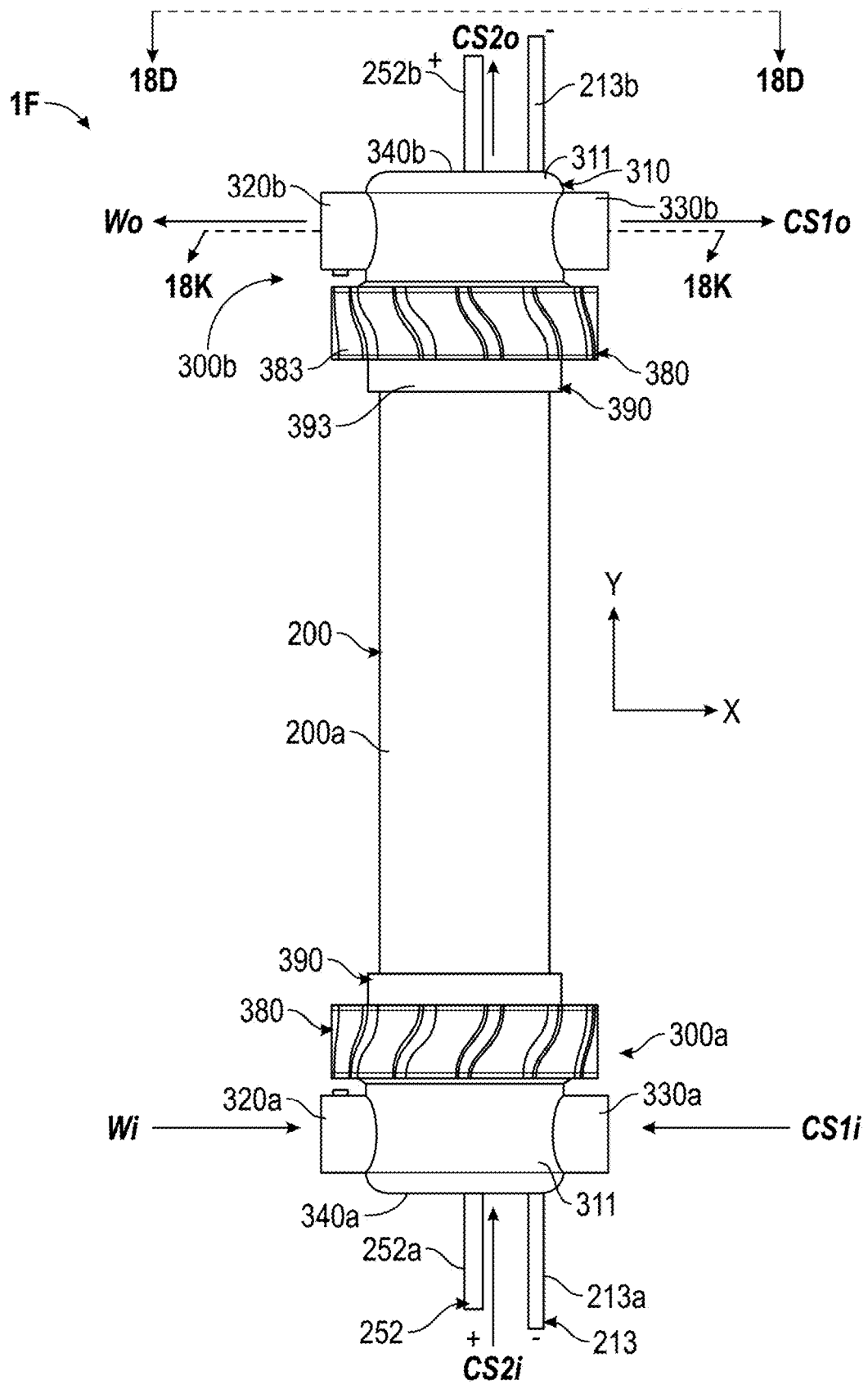
FIG. 18A depicts a front plan view of another FCDI desalination system cell embodiment according to the present disclosure.
Figures 18B, 18C:
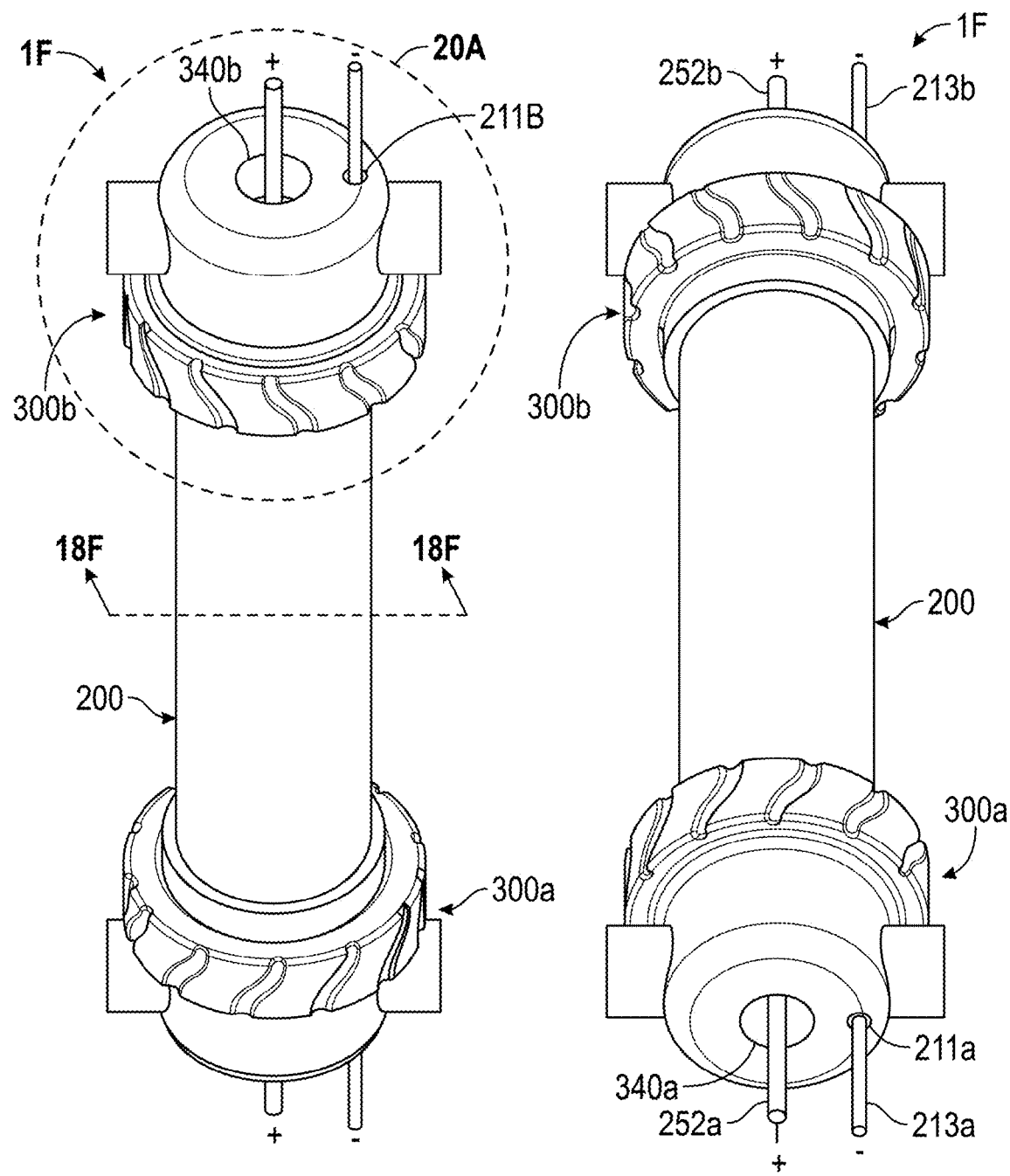
FIG. 18B depicts a top perspective view of the FCDI desalination system cell of FIG. 18A.
FIG. 18C depicts an underside perspective view of the FCDI desalination system cell of FIG. 18A.
Figure 18D:
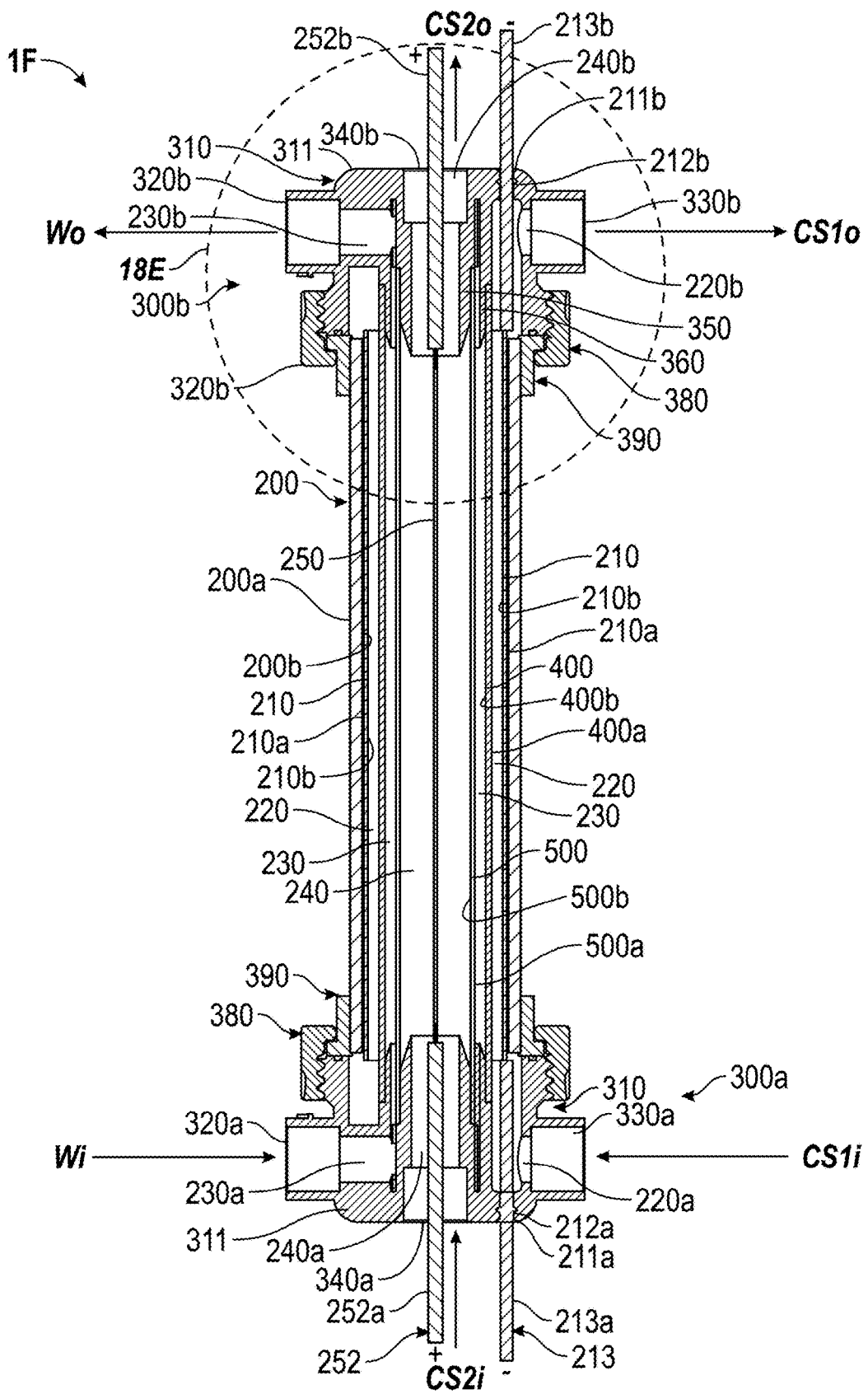
FIG. 18D depicts a cross-sectional view of the FCDI desalination system cell of FIG. 18A taken along lines 18D-18D.
Figure 18E:
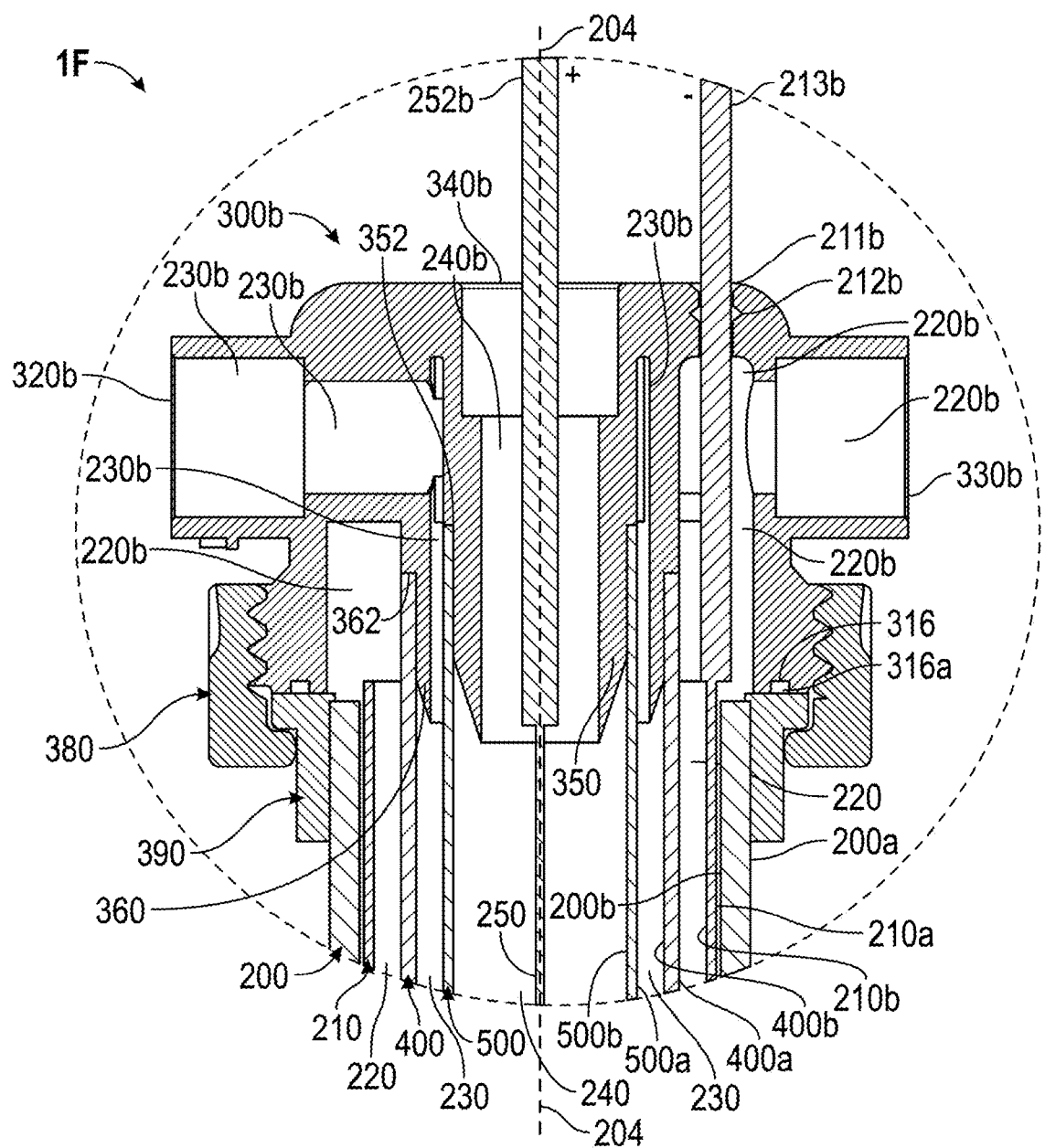
FIG. 18E depicts enlargement section 18E taken from the FCDI desalination system cell of FIG. 18D.
Figure 18F:
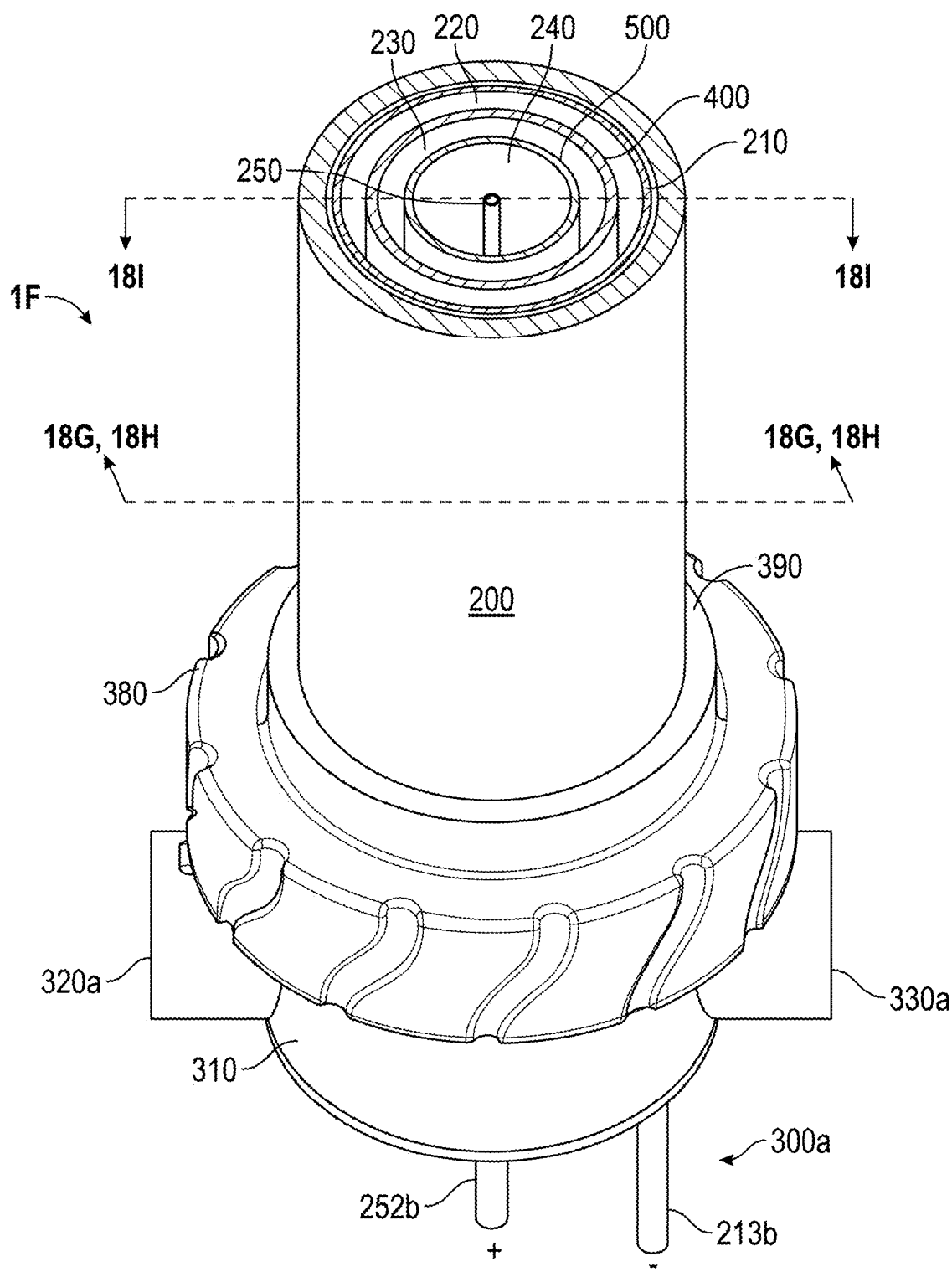
FIG. 18F depicts a cross-sectional view of the FCDI desalination system cell of FIG. 18B taken along lines 18F-18F.
Figure 18G:
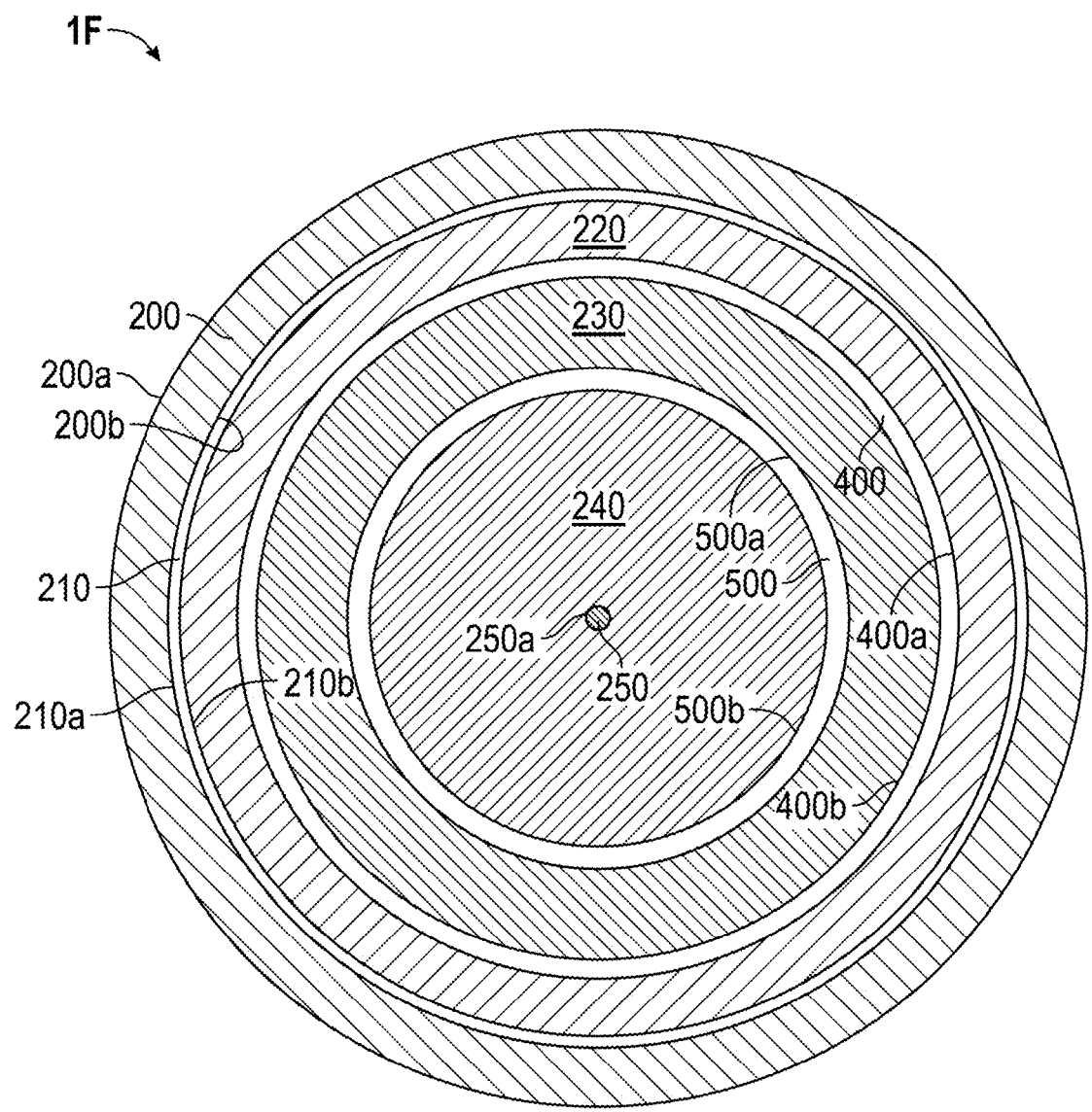
FIG. 18G depicts a cross-sectional view of a segment the FCDI desalination system cell housing of FIG. 18F taken along lines 18G-18G.
Figure 18H:
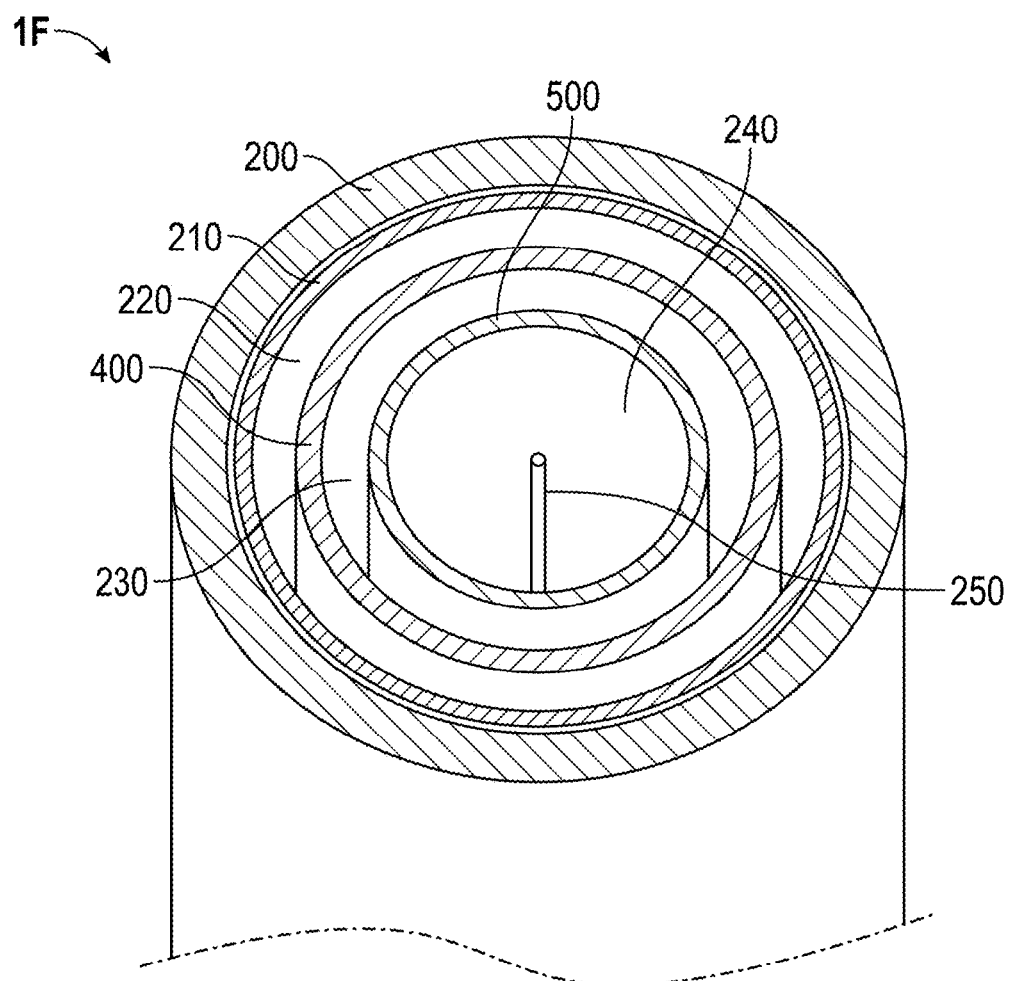
FIG. 18H depicts a cross-sectional view of a segment the FCDI desalination system cell housing of FIG. 18F taken along lines 18H-18H.
Figure 18I:
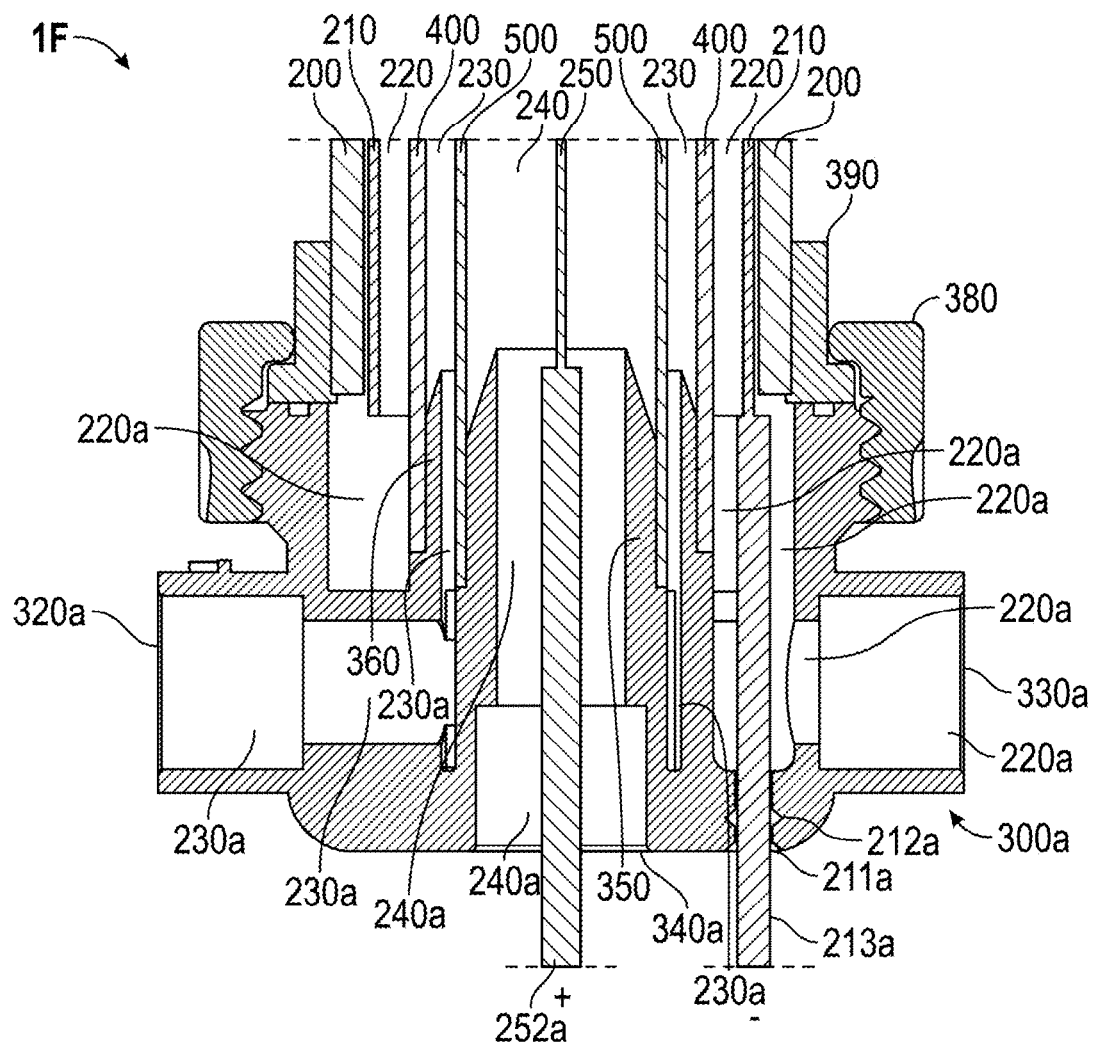
FIG. 18I depicts a cross-sectional view of a segment the FCDI desalination system cell of FIG. 18F taken along lines 18I-18I.
Figure 18J:
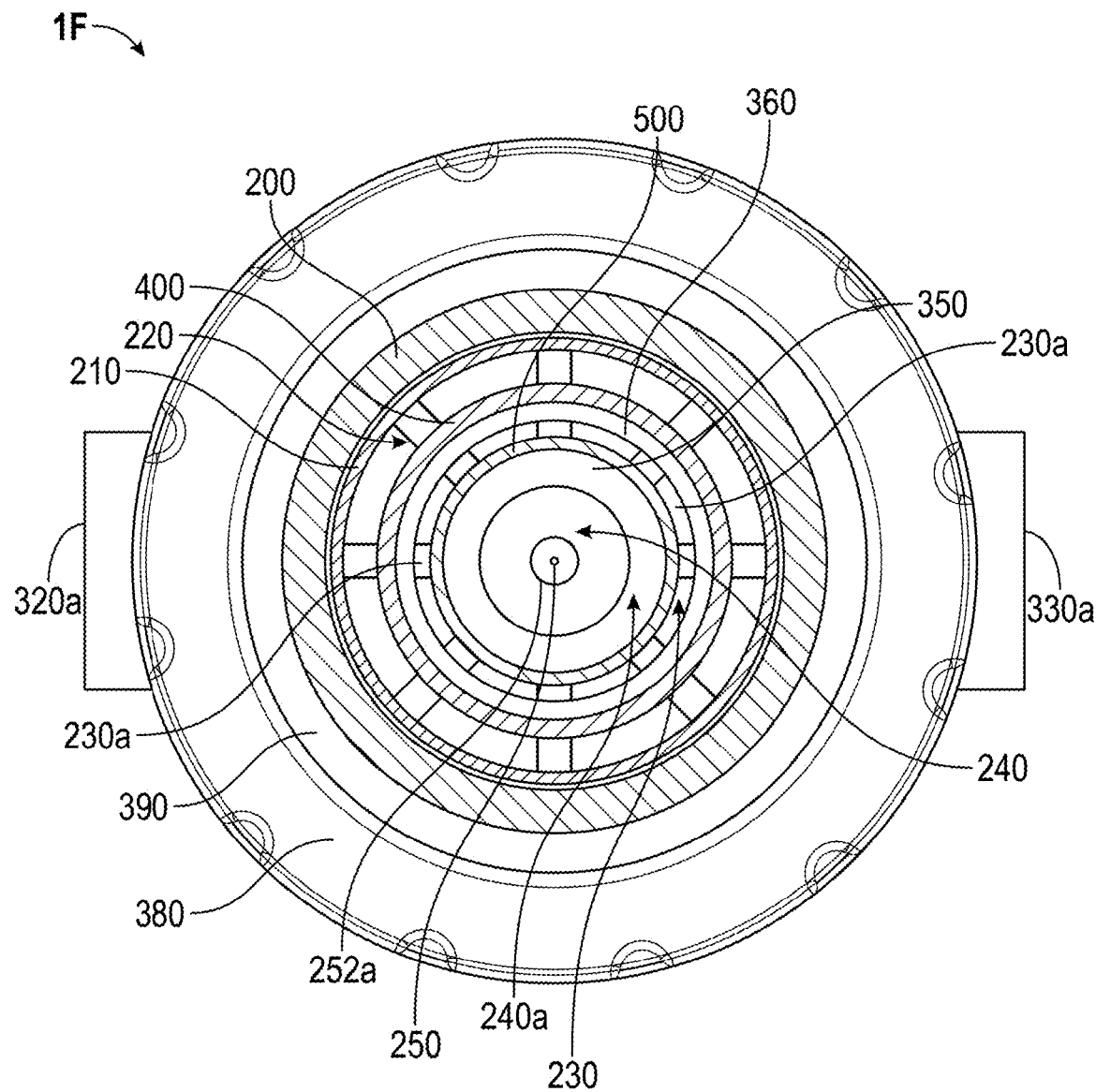
FIG. 18J depicts a top plan view of the FCDI desalination system cell of FIG. 18F.
Figure 18K:
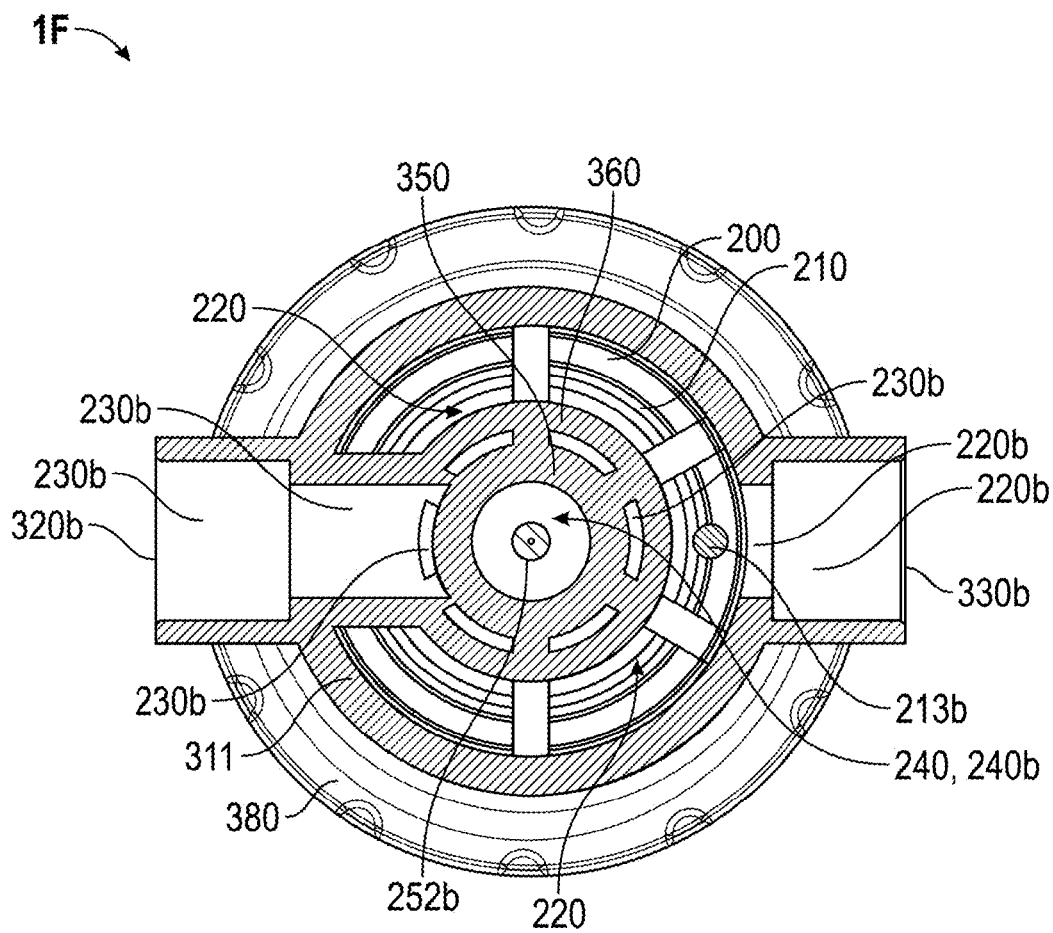
FIG. 18K depicts a cross-sectional view of the FCDI desalination system cell of FIG. 18A taken along lines 18K-18K.
Figure 19A:
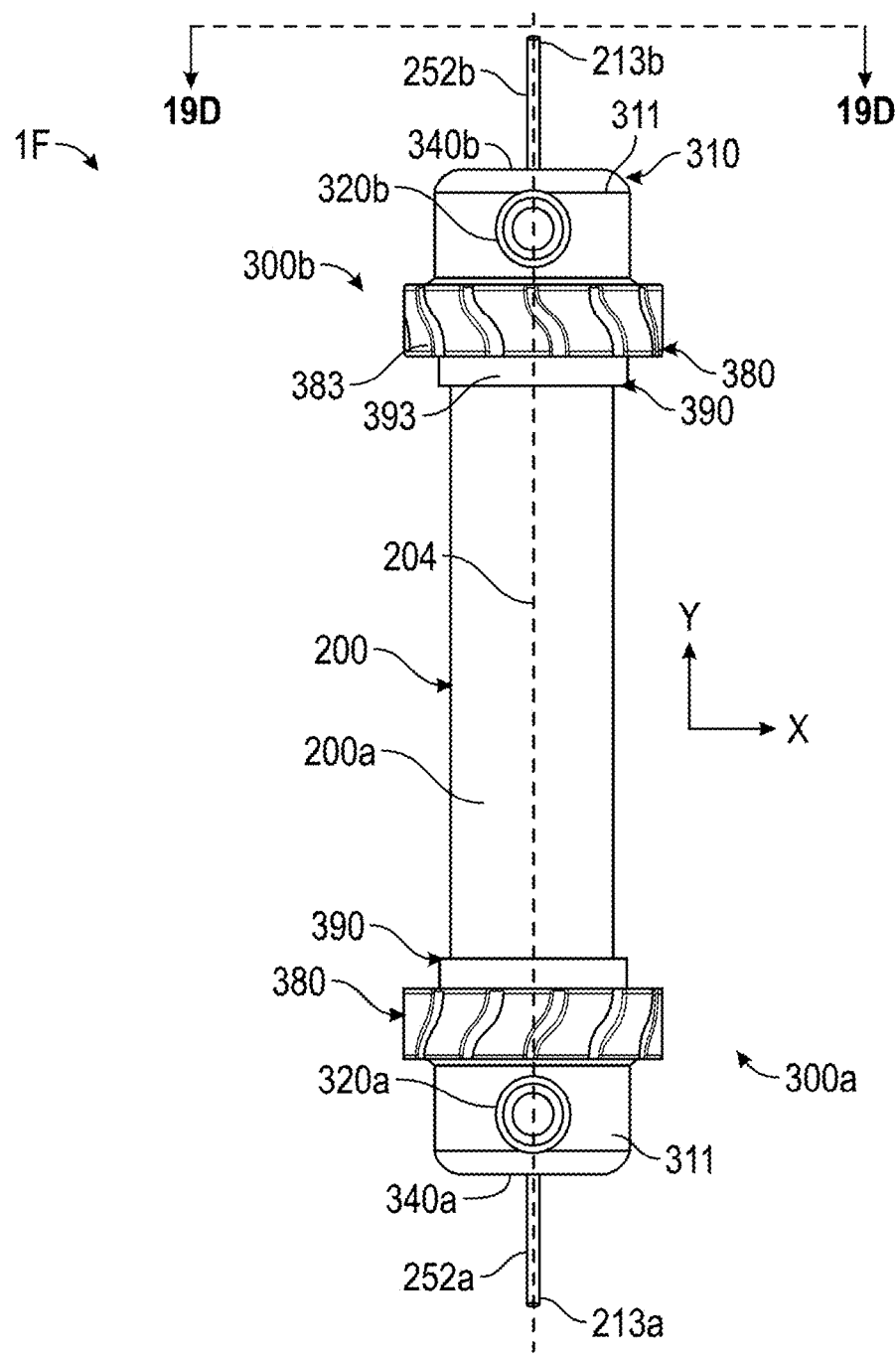
FIG. 19A depicts a left side plan view of the FCDI desalination system cell embodiment of FIG. 18A.
Figure 19B:
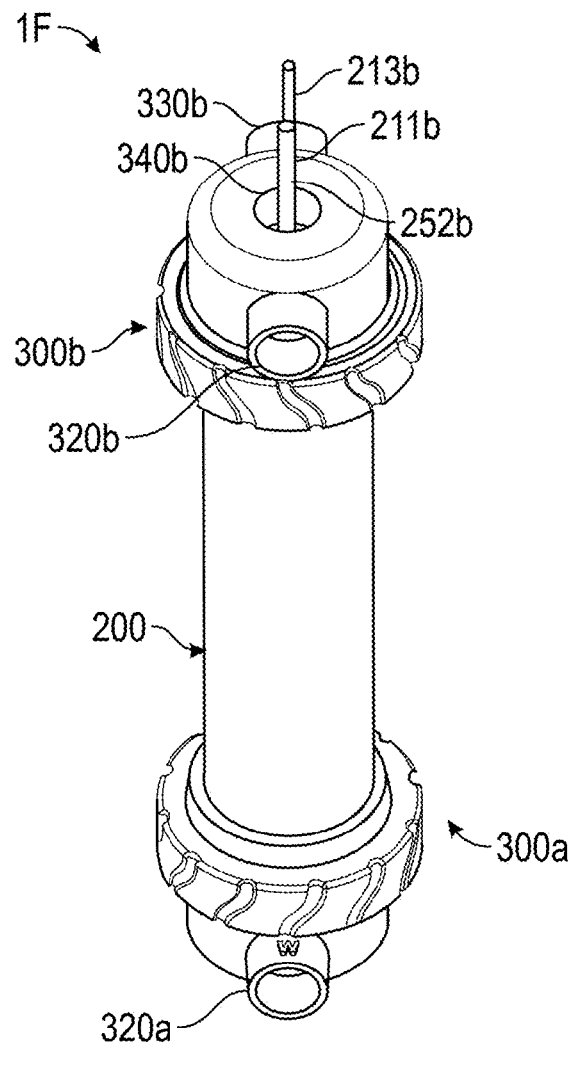
FIG. 19B depicts a top perspective view of the FCDI desalination system cell of FIG. 19A.
Figure 19C:
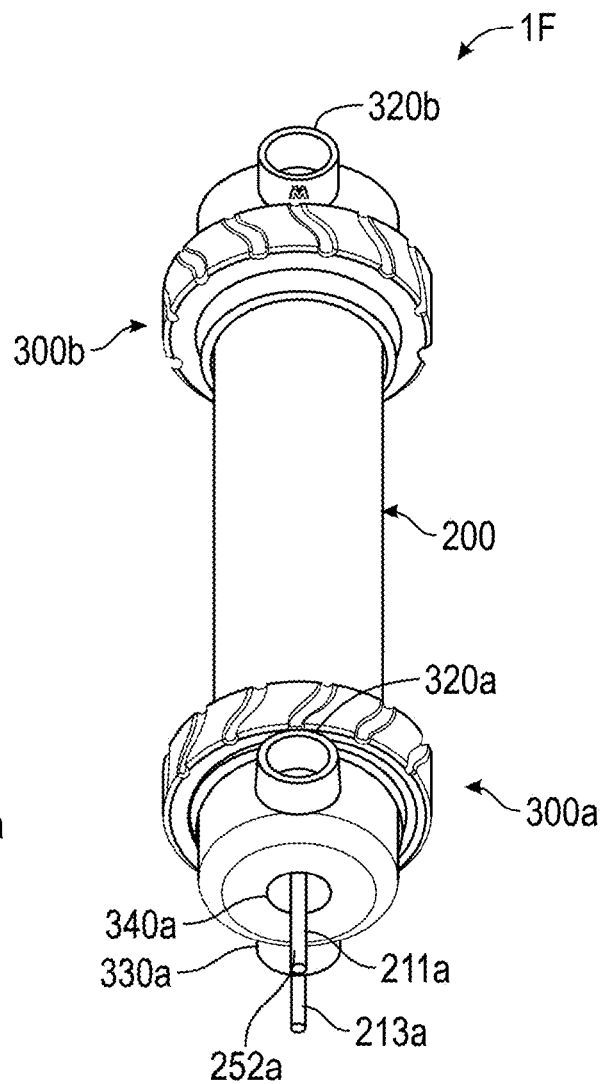
FIG. 19C depicts an underside perspective view of the FCDI desalination system cell of FIG. 19A.
Figure 19D:
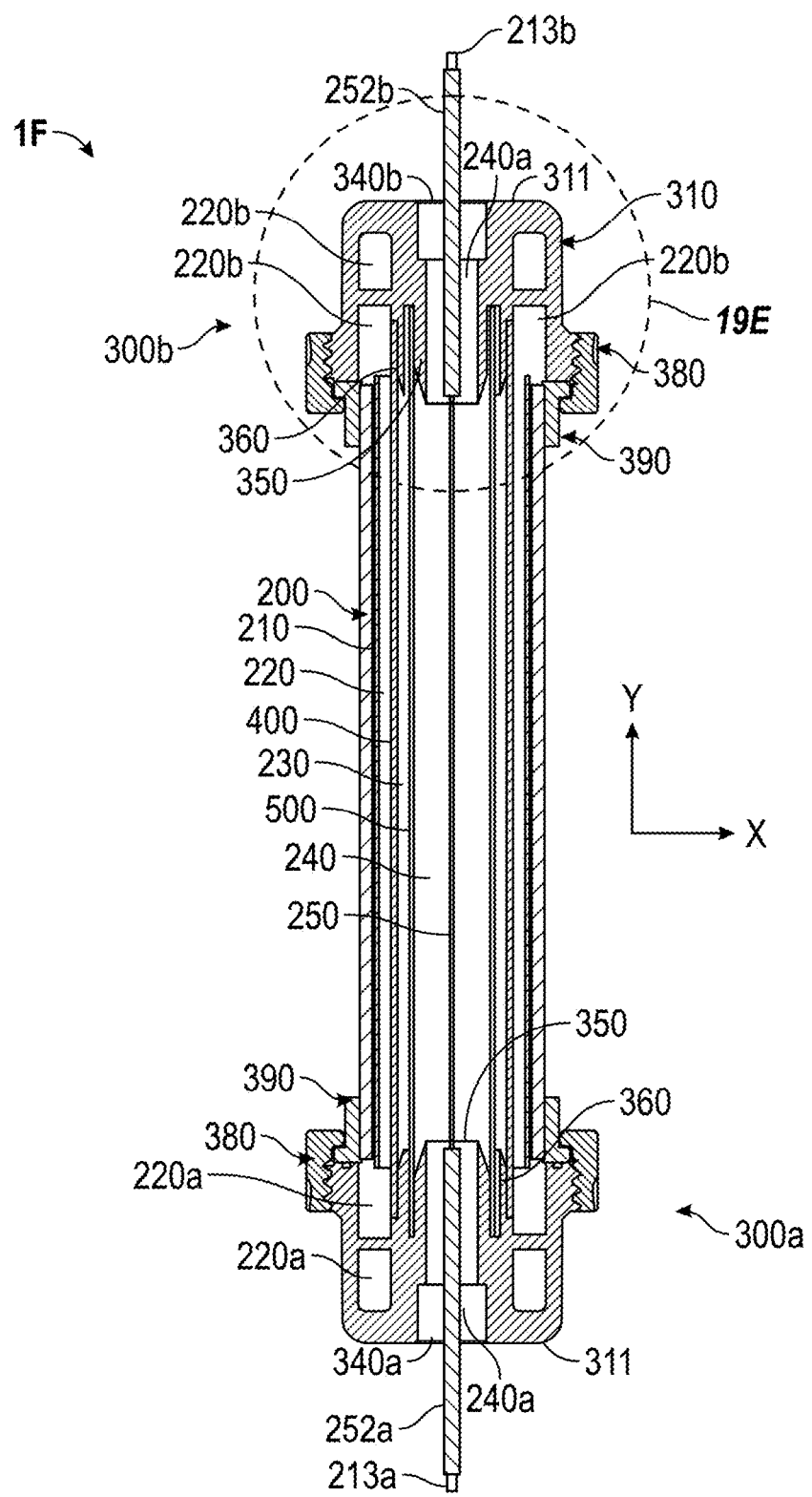
FIG. 19D depicts a cross-sectional view of the FCDI desalination system cell of FIG. 19A taken along lines 19D-19D.
Figure 19E:
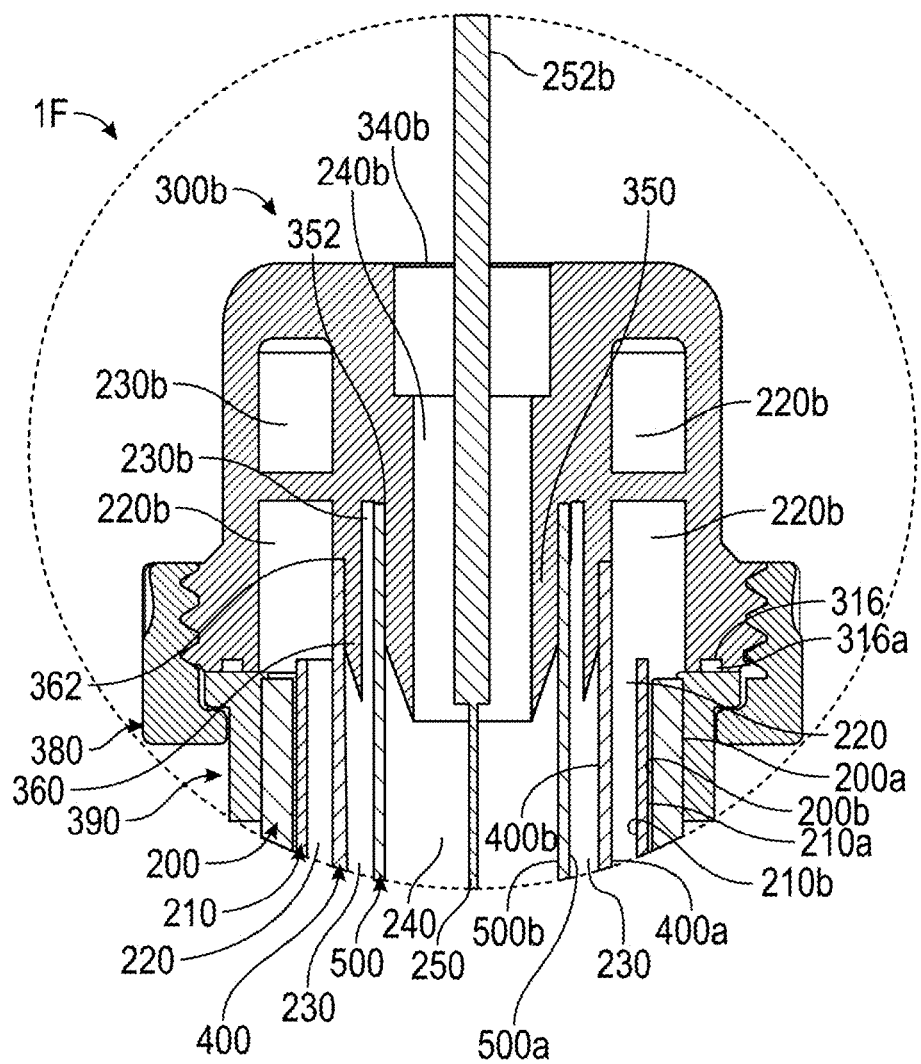
FIG. 19E depicts enlargement section 19E taken from the FCDI desalination system cell of FIG. 19D.
Figure 20A:
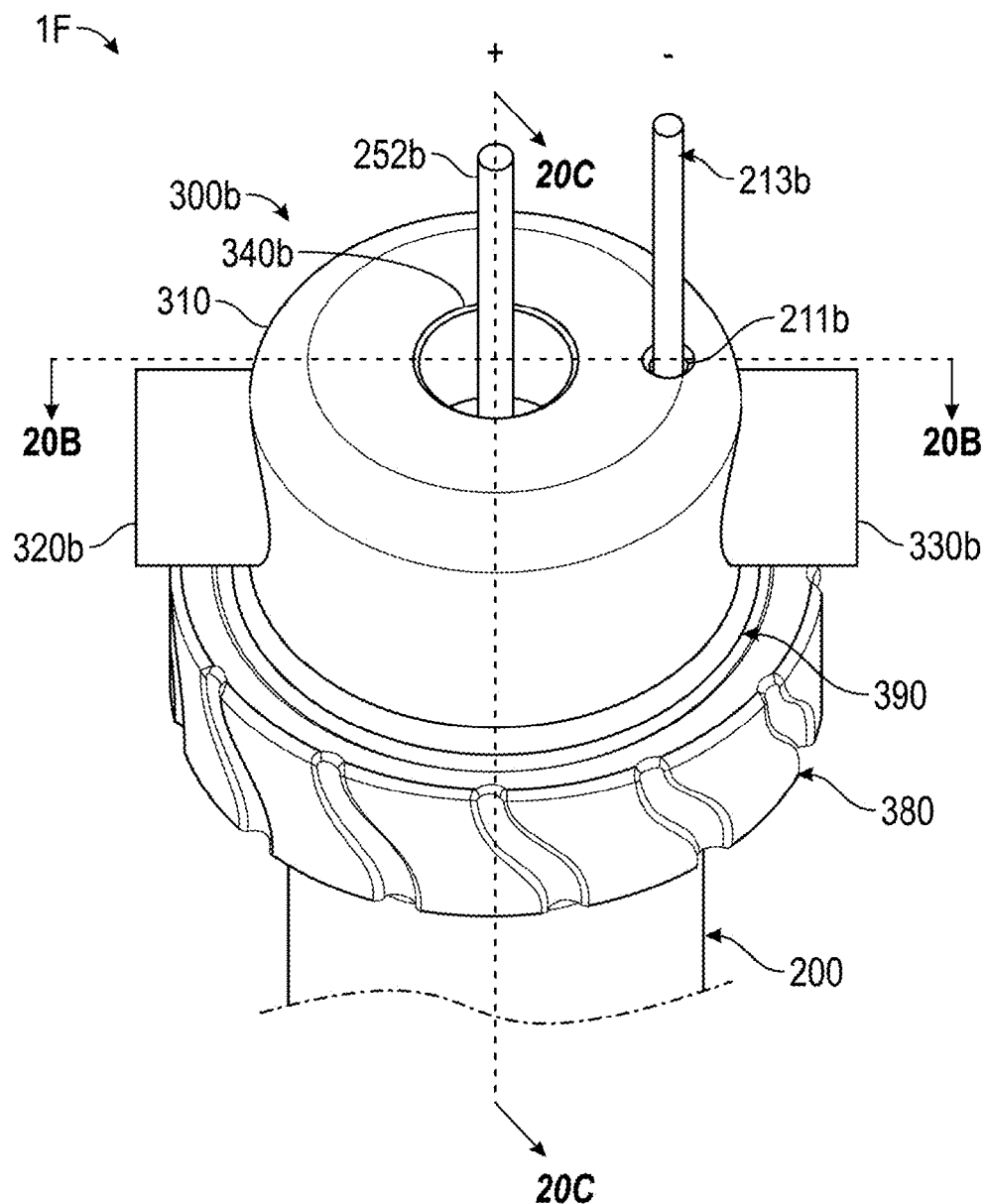
FIG. 20A depicts enlargement section 20A taken from the FCDI desalination system cell of FIG. 18B.
Figure 20B:
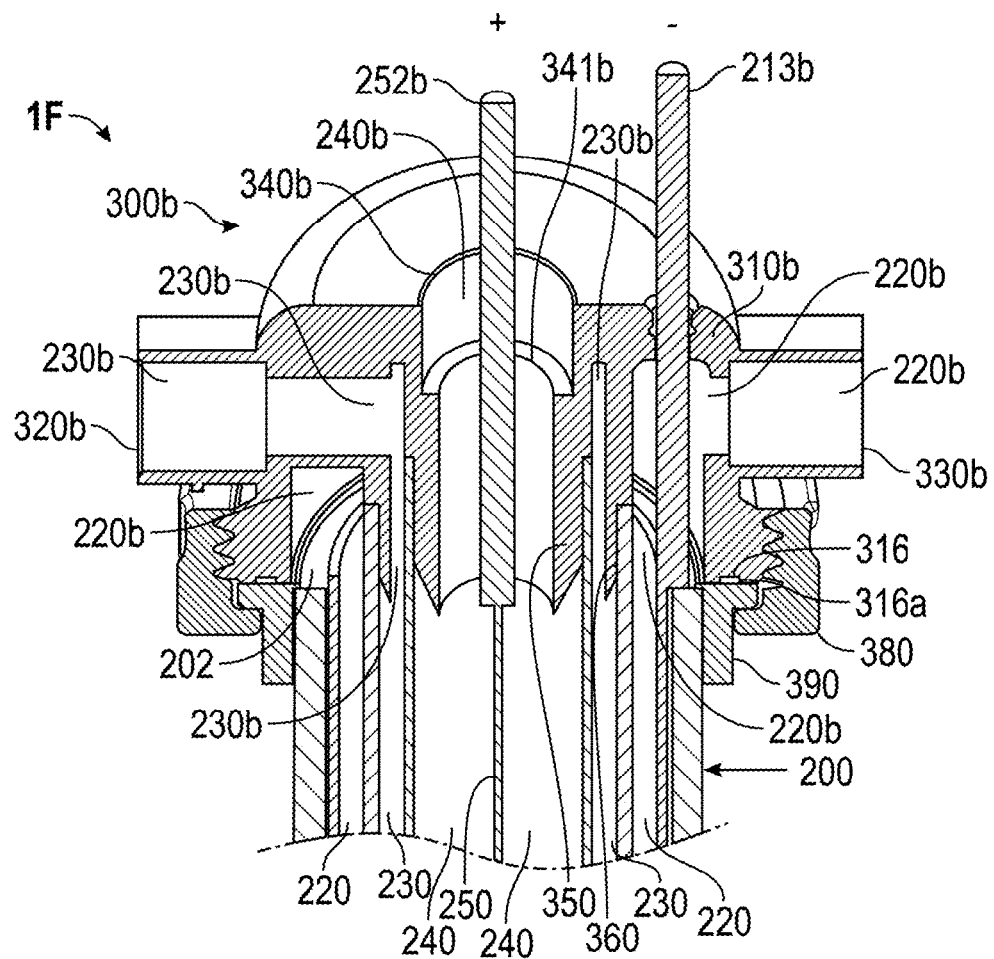
FIG. 20B depicts a cross-sectional view of the FCDI desalination system cell of FIG. 20A taken along lines 20B-20B.
Figure 20C:
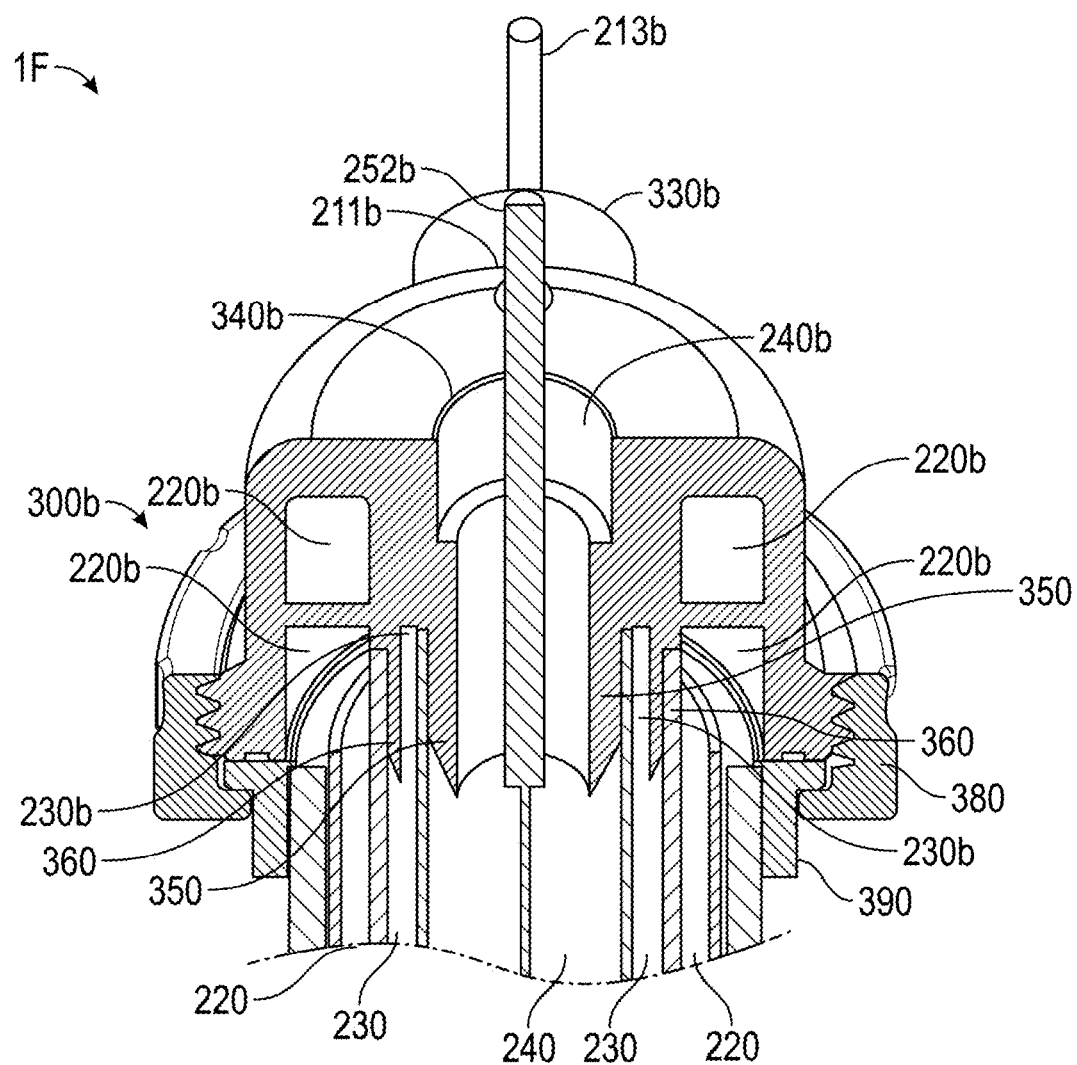
FIG. 20C depicts a cross-sectional view of the FCDI desalination system cell of FIG. 20A taken along lines 20C-20C.
Figure 21A:
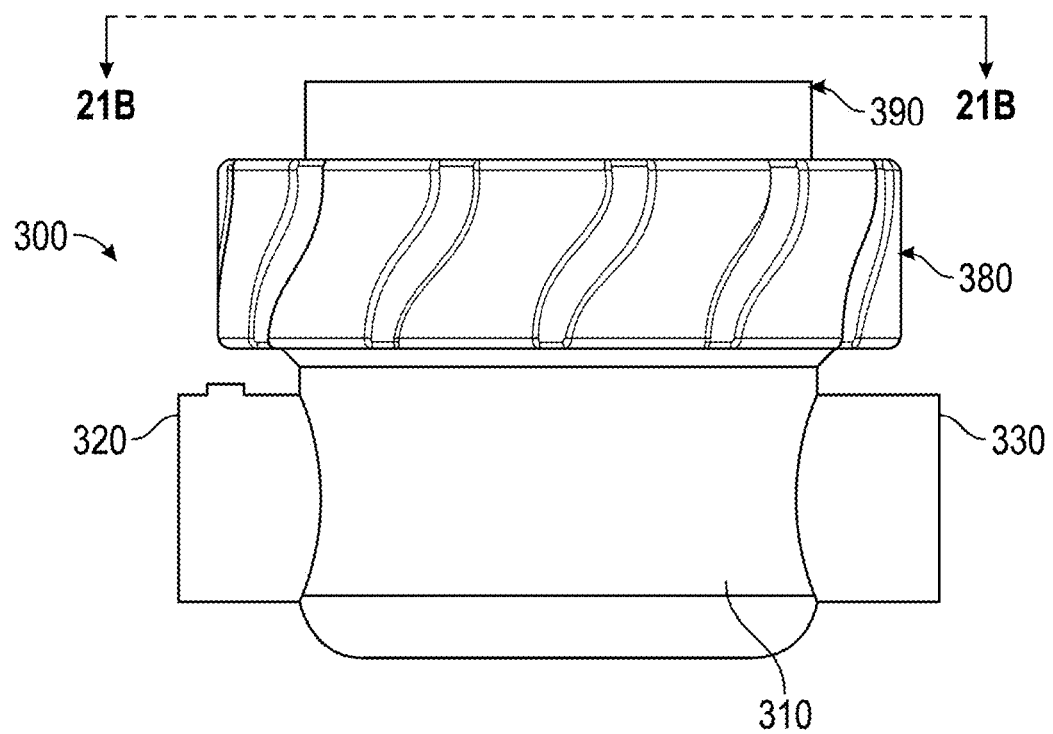
FIG. 21A depicts a front plan view of an exemplary end cap embodiment according to the present disclosure, such as used on the opposed ends of the FCDI desalination system cell of FIG. 18A, shown here without the anodic and cathodic elements.
Figure 21B:
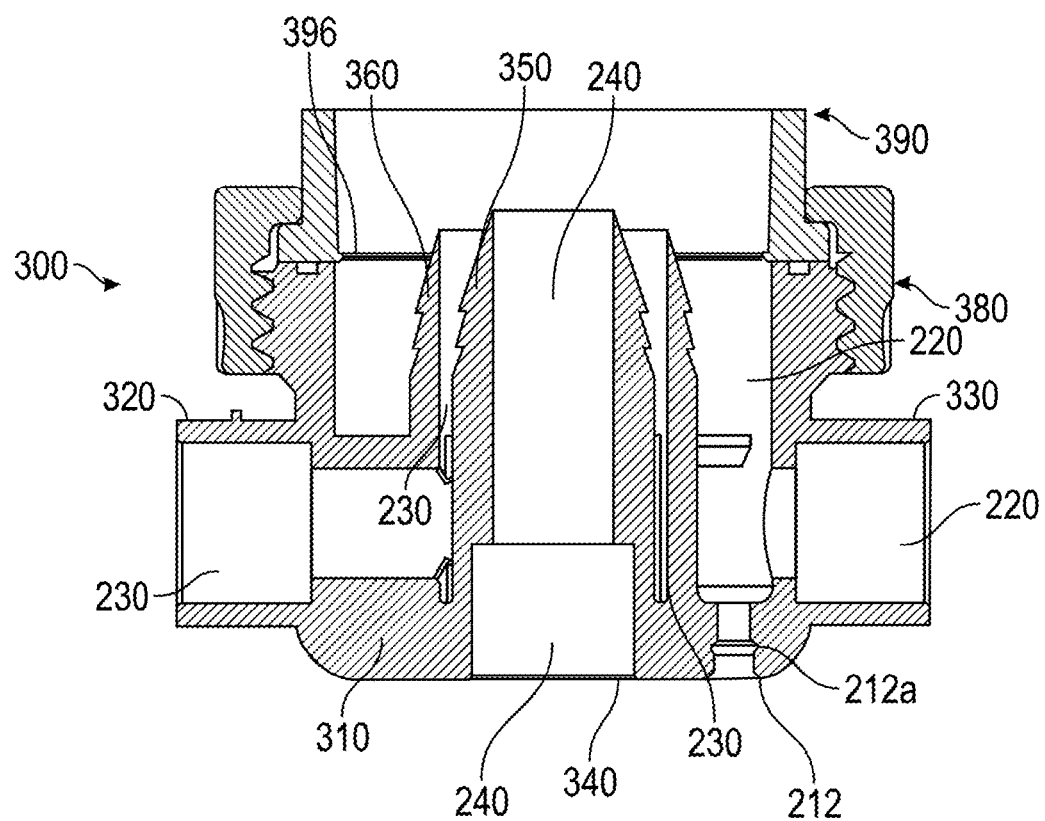
FIG. 21B depicts a cross-sectional view of the FCDI desalination system cell end cap of FIG. 21A taken along lines 21B-21B.
Figure 21C:
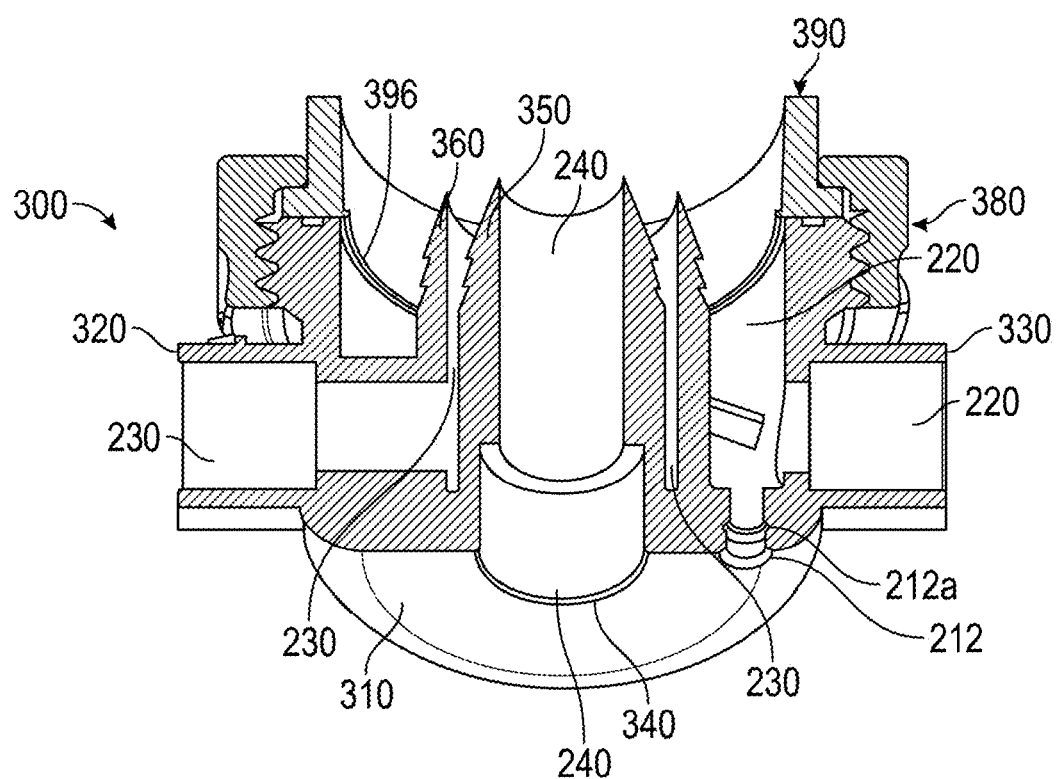
FIG. 21C depicts an underside perspective view of the FCDI desalination system cell end cap of FIG. 21B.
Figure 21D:
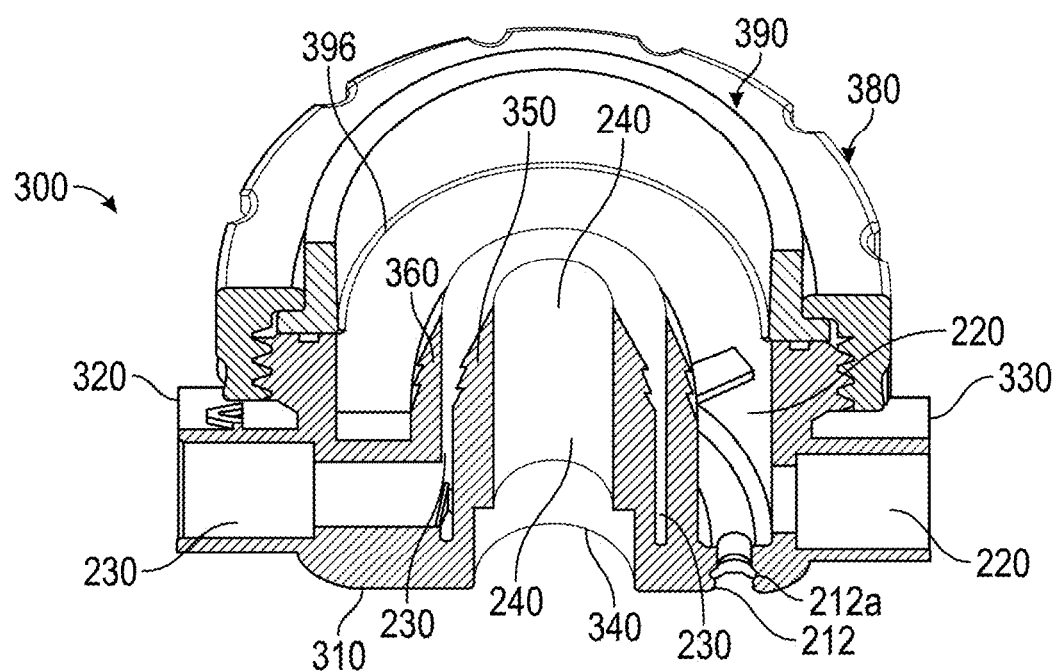
FIG. 21D depicts a top perspective view of the FCDI desalination system cell end cap of FIG. 21B.
Figure 21E:
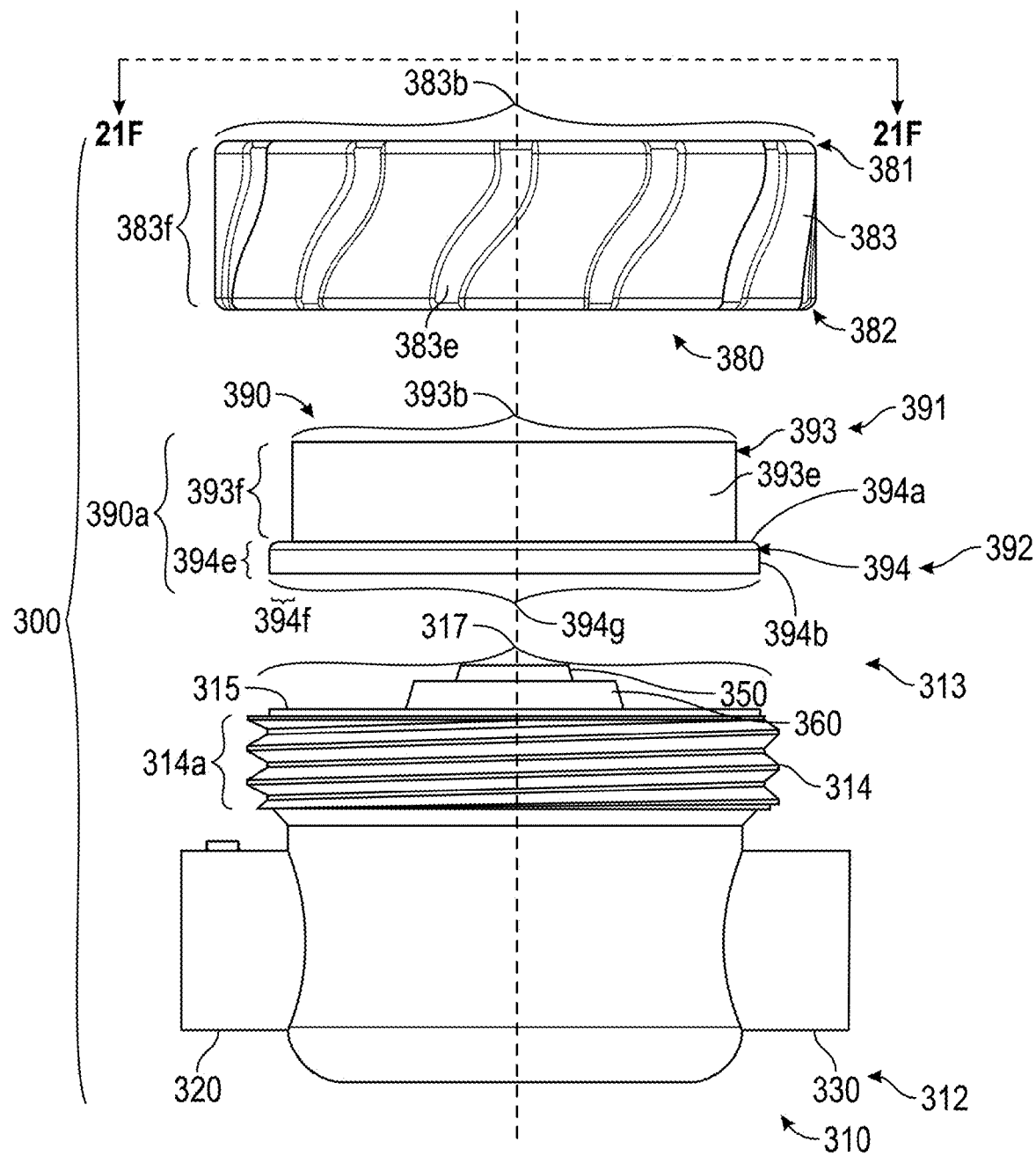
FIG. 21E depicts an exploded view of the FCDI desalination system cell end cap of FIG. 21A.
Figure 21F:
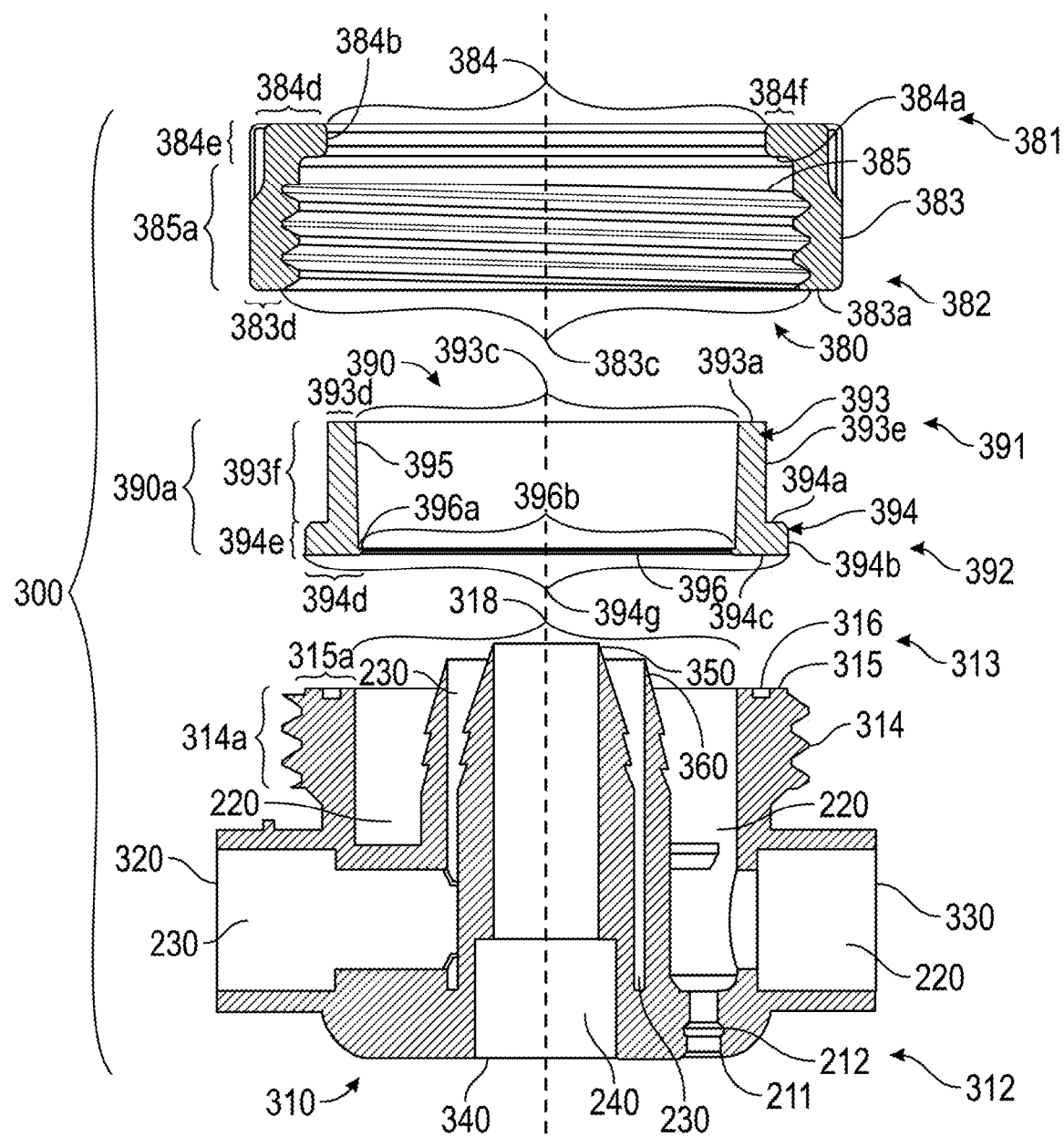
FIG. 21F depicts a cross-sectional view of the FCDI desalination system cell end cap of FIG. 21E taken along lines 21F-21F.
Figure 21G:
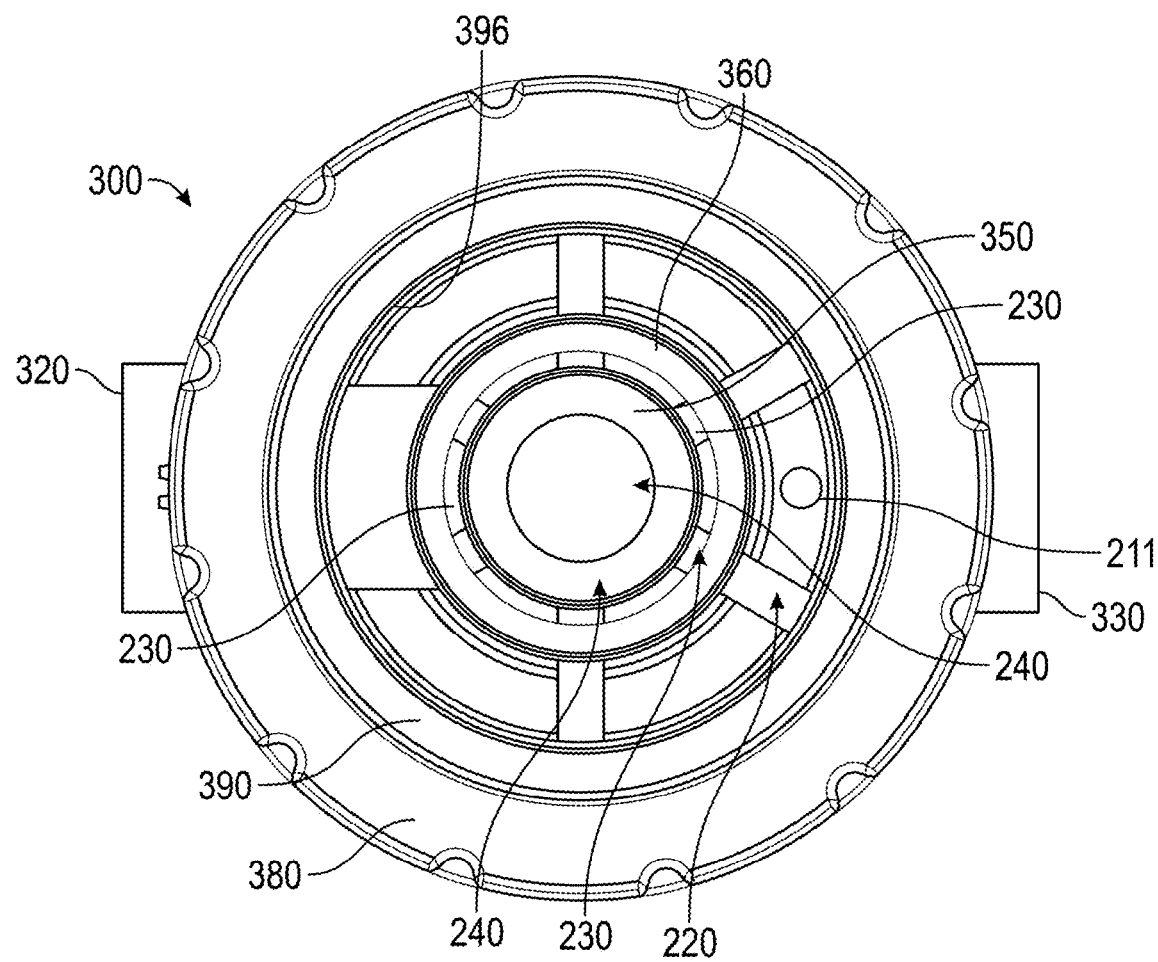
FIG. 21G depicts a top plan view of the FCDI desalination system cell end cap of FIG. 21A.
Figure 22A:
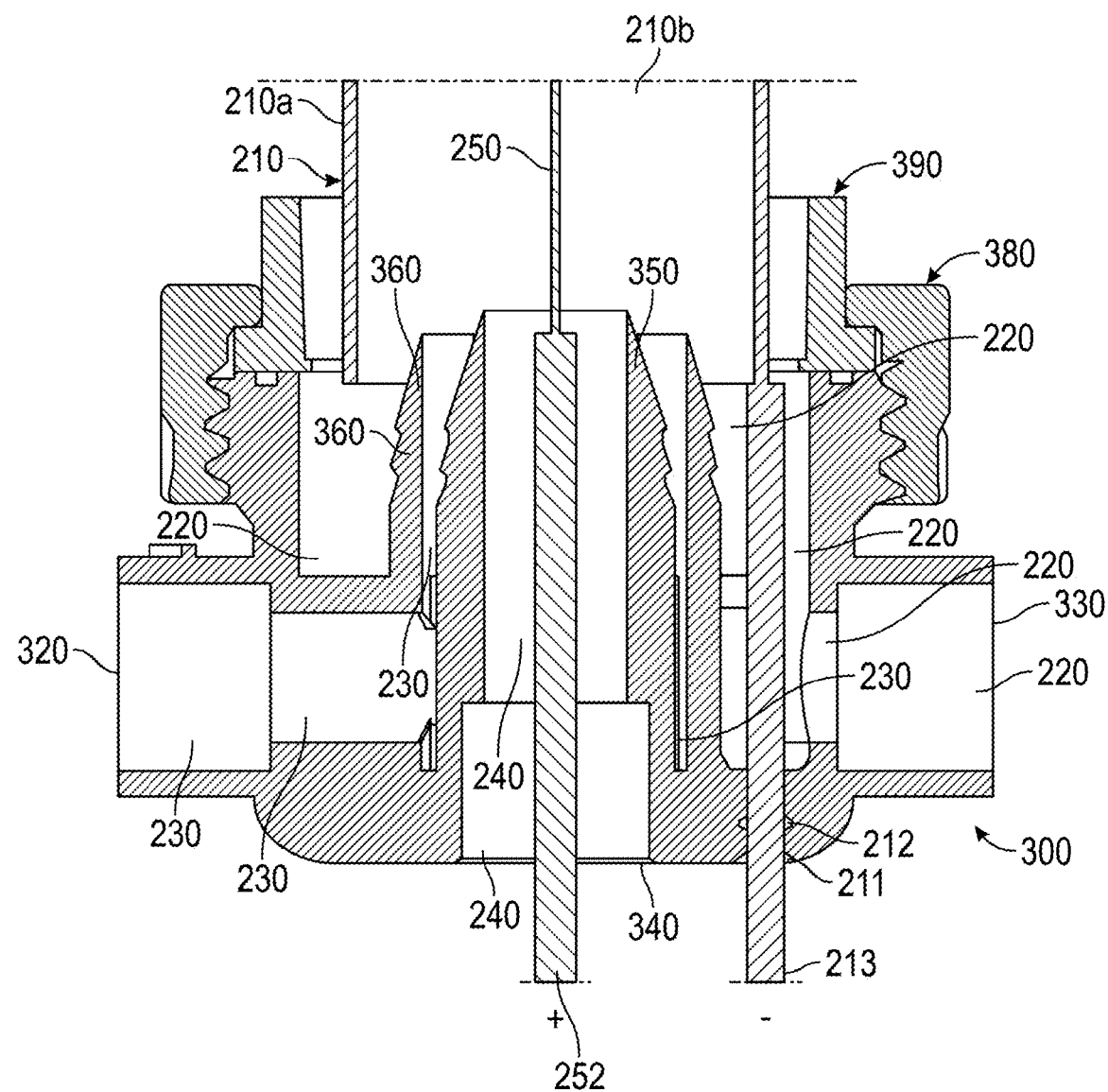
FIG. 22A depicts the FCDI desalination system cell end cap of FIG. 21B with the anodic and cathodic elements installed.
Figure 22B:
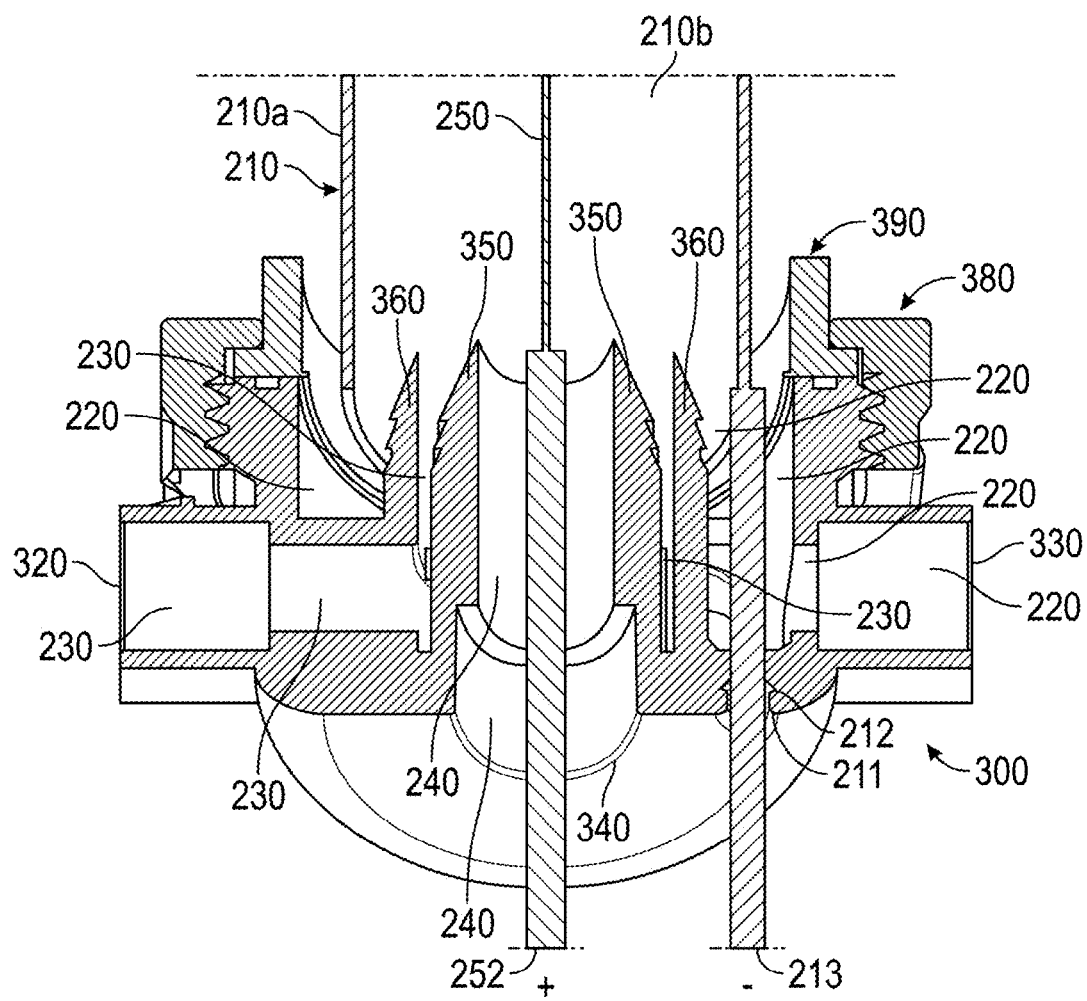
FIG. 22B depicts an underside perspective view of the FCDI desalination system cell end cap of FIG. 22A.
Figure 22C:
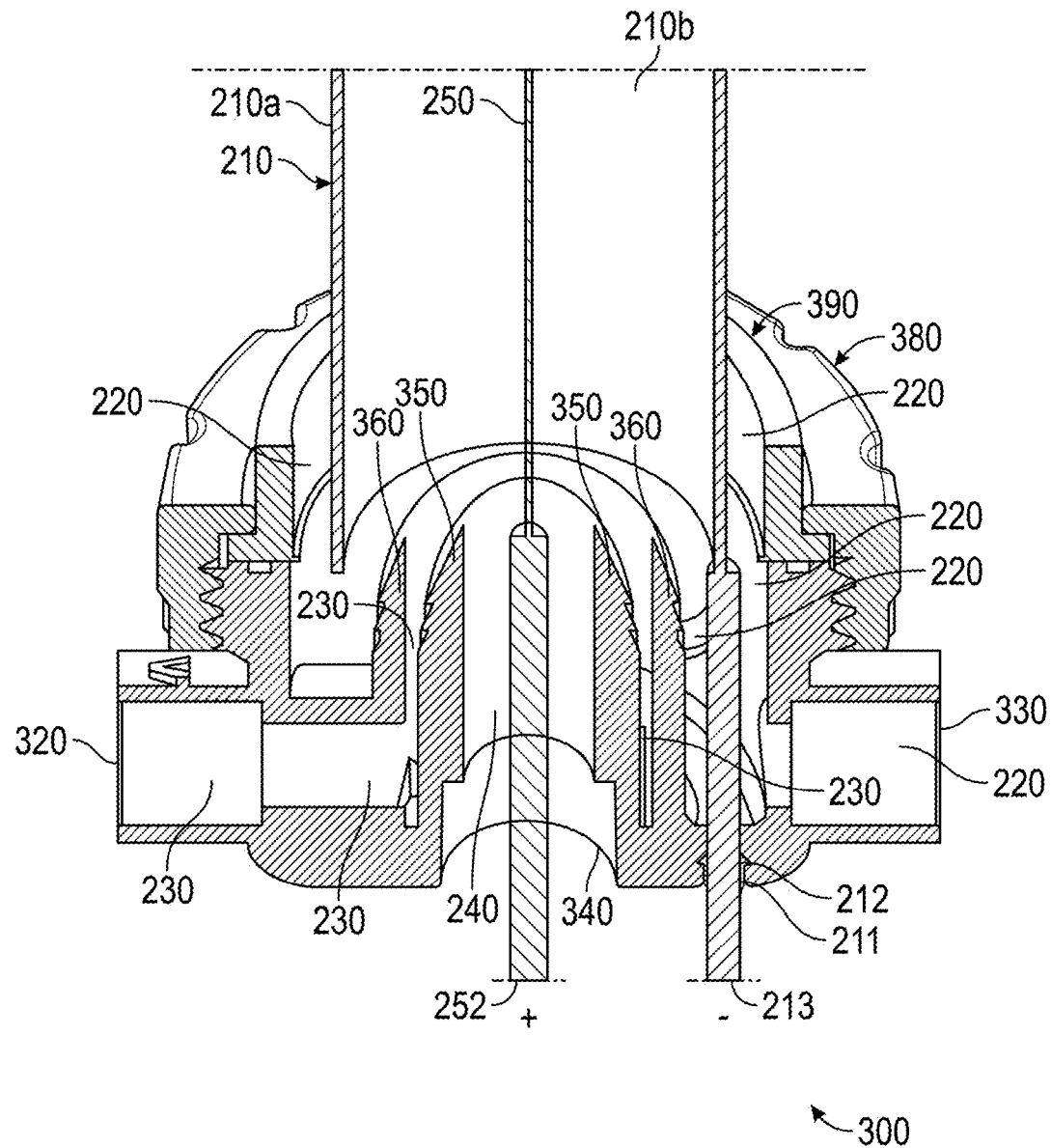
FIG. 22C depicts a top side perspective view of the FCDI desalination system cell end cap of FIG. 22A.
Figure 22D:
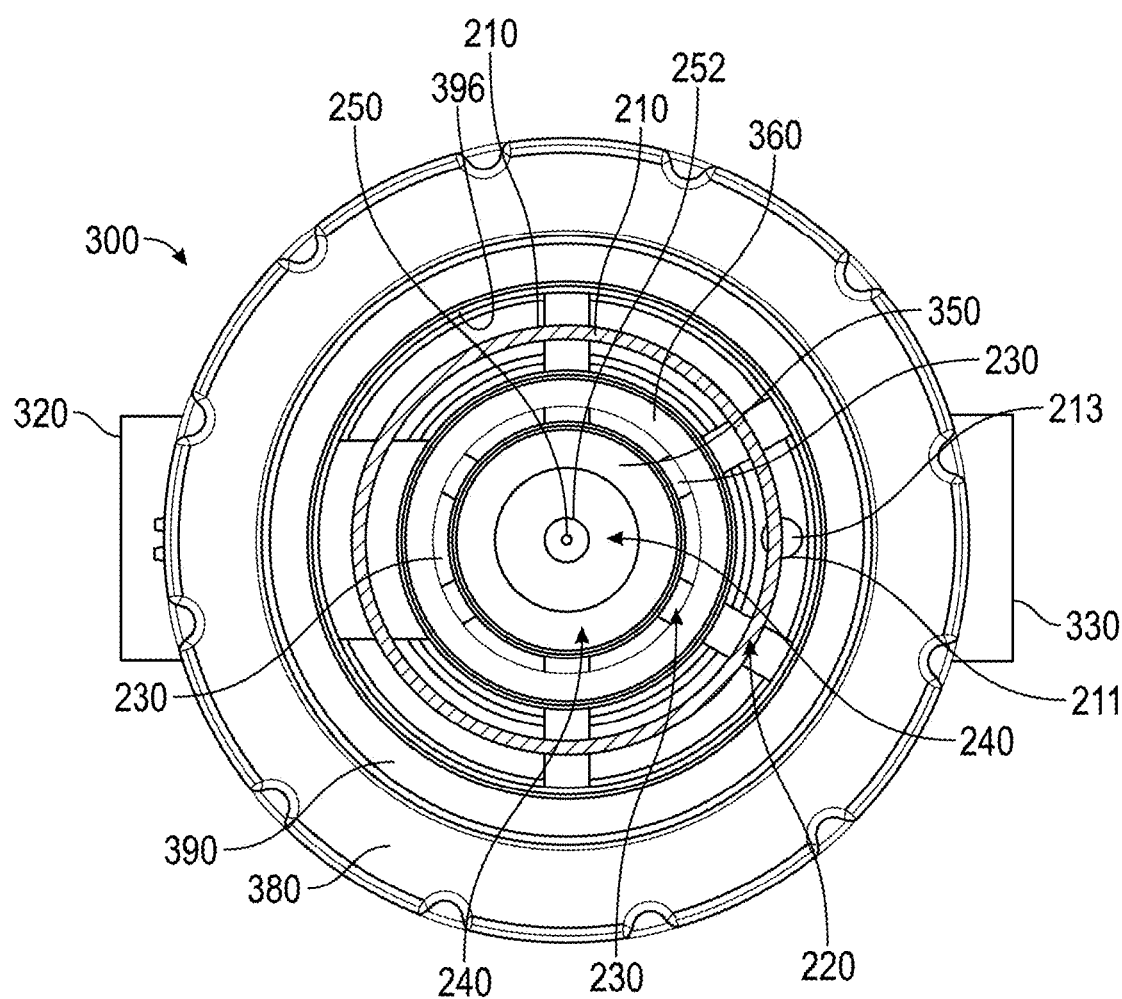
FIG. 22D depicts a top plan view of the FCDI desalination system cell end cap of FIG. 22A.
Figure 23:
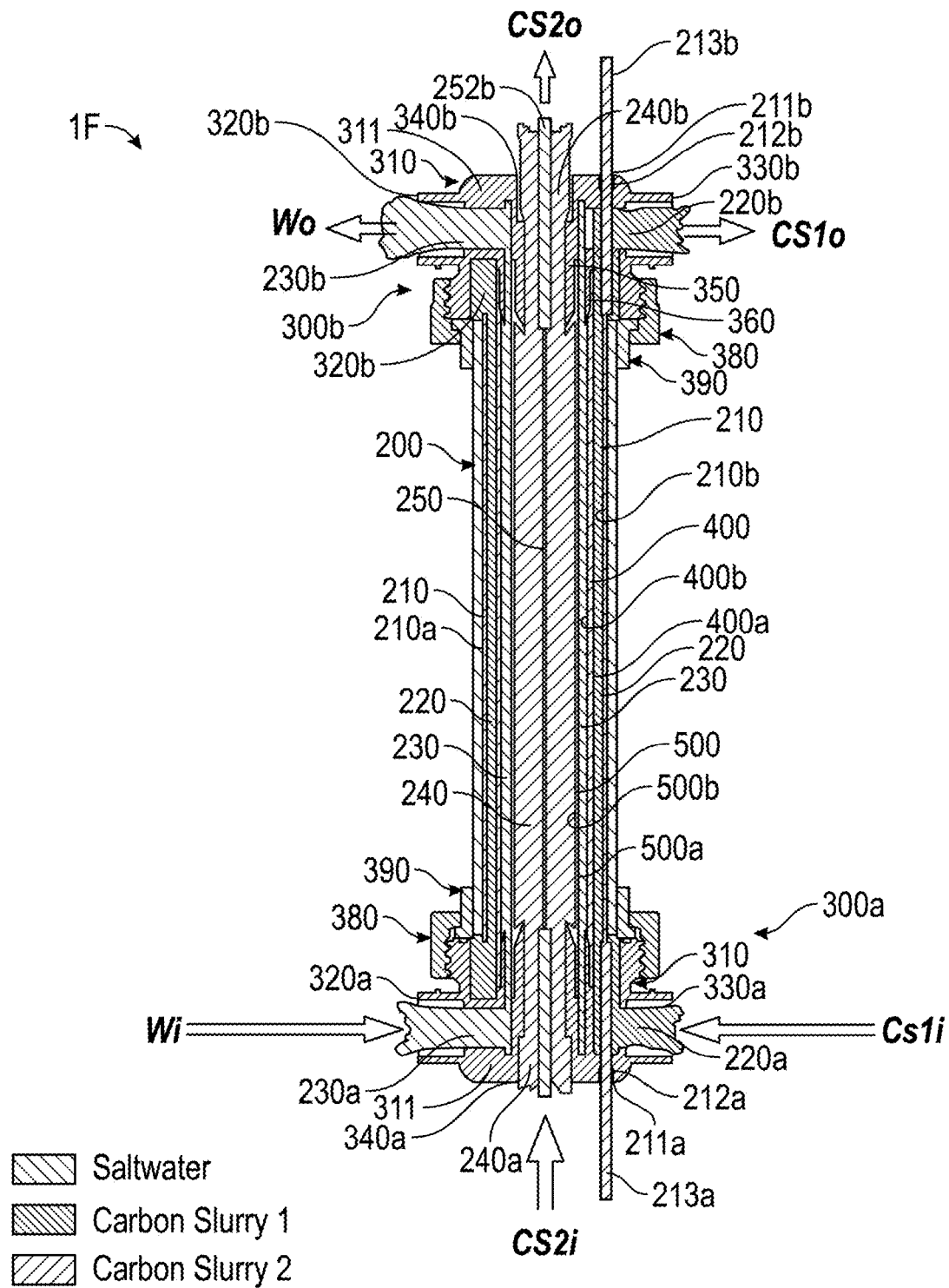
FIG. 23 is view of the FCDI desalination system cell of FIG. 18D illustrating the flow paths of the water and carbon slurry phases passing through the FCDI desalination system cell.
Figure 24:
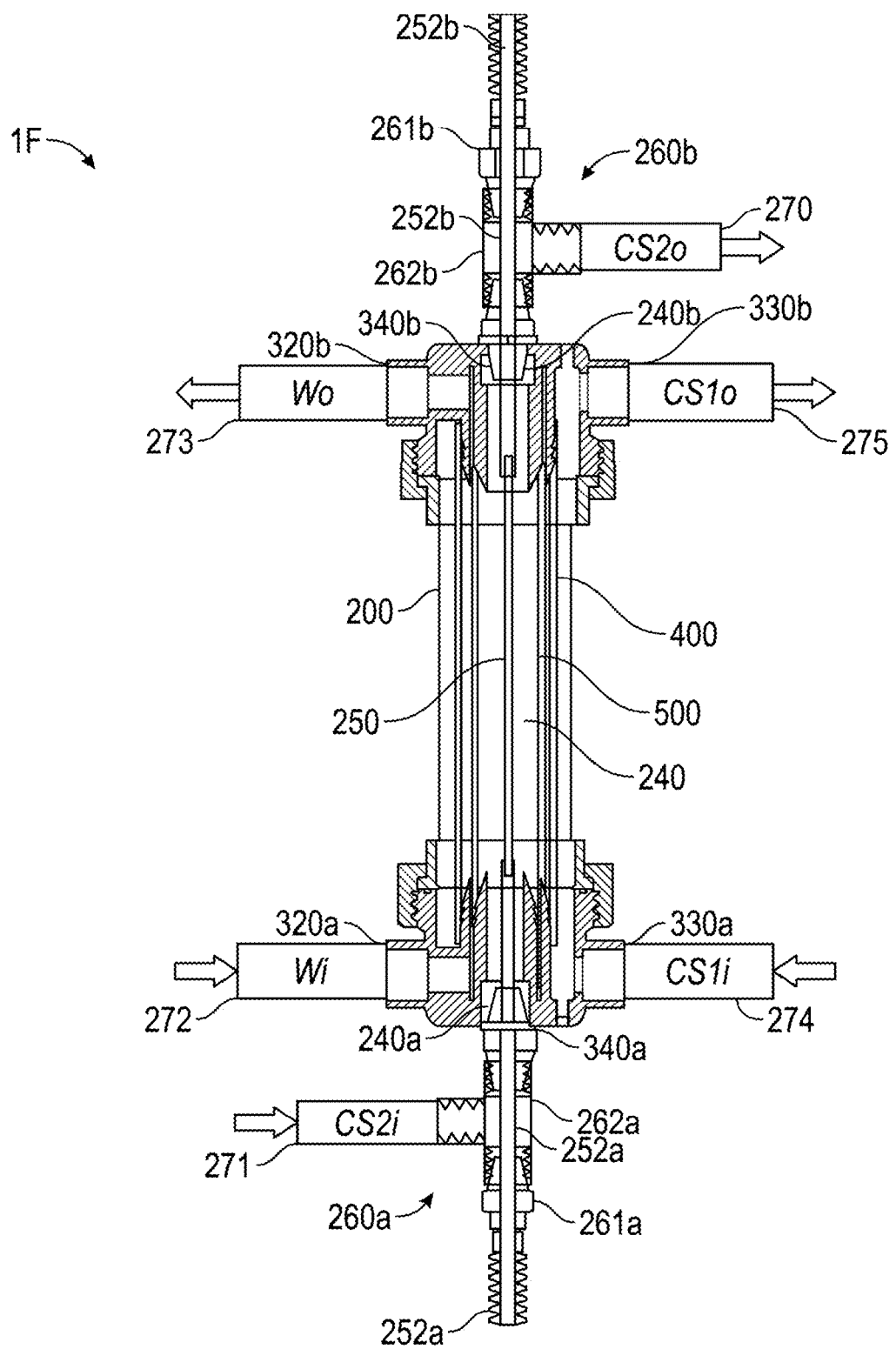
FIG. 24 depicts a cross sectional view similar to that shown in FIG. 18D modified to illustrate suitable flow connections to the FCDI desalination system cell.

Referring now to FIGS. 16, 17A and 17B, there is illustrated a schematic diagram of another exemplary FCDI desalination system 100A similar to that described above in connection with FIG. 5. The system 100A contains one or more FCDI desalination system cells 1E capable of receiving a saline feed water solution 2 through inlet 25. In one embodiment, each cell 1A generally comprises a cylindrical tubular member or housing 20 having an interior chamber 23 sealed via top and bottom end caps 21, 22. The housing upper end cap 21 comprises a sealing member 10a that seals the top end of the cell housing interior space 23, an upper end cap interior space 21a, and an upper end cap port 21b in fluid communication with the interior space 21a. Similarly, the housing lower end cap 22 comprises a sealing member 10b that seals the lower end of the cell housing interior space 23, a lower end cap interior space 22a, and a lower end cap port 22b in fluid communication with the interior space 22a.

Extending through the entire length of the cell interior space 23, and through the respective upper and lower seals 10a, 10b, are one or more, preferably a plurality, of membrane tubes 40. Each membrane tube 40 has an upper end 41, a lower end 44 and an inner tubular membrane space 43. The tubular member upper end 41 opens into fluid communication with the upper end cap interior space 21a and the tubular member lower end 44 opens into fluid communication with the lower end cap interior space 22a. The upper and lower seals 10a, 10b form a watertight seal around the outside of each tubular member 40. Therefore, the upper end cap interior space 21a and lower end cap interior space 22a are in fluid communication via the inner tubular membrane space 43 of each tubular membrane 40, but are otherwise isolated from the cell interior space 23.

Inserted from each end (41, 44) but singularly arranged in each tube are electrodes, such as a coiled electrode 50 as depicted in FIG. 17A or a mesh electrode 60 as depicted in FIG. 17B. These electrodes can be constructed of suitable materials, such as titanium or the like. Much like as illustrated in FIG. 5, approximately one half of the electrodes (50 or 60) are configured to carry a positive charge (e.g., FIG. 17A illustrates a coiled electrode 50 receiving a positive (+) charge from, e.g., a positively charged common electrode 48b to create a positively charged tubular membrane 40(+)) while the other approximately one half of the electrodes are configured to carry a negative charge (e.g., FIG. 17B illustrates a mesh electrode 60 receiving a negative (−) charge from, e.g., a negatively charged common electrode 49b to create a negatively charged tubular membrane 40(−)). Preferably, the electrodes (50 or 60) are arranged such that for the most part each adjacent membrane tube 40 carries a positive electrode and a negative electrode, respectively. In one embodiment, the clusters of positive electrodes (e.g., 48a in FIG. 5) are welded to a common positive electrode 48b located proximate, e.g., the upper end 41 of the membrane tubes 40, and the clusters of negative electrodes (e.g., 49a in FIG. 5) are welded to a common negative electrode 49b located proximate, e.g., the lower end 44 of the membrane tubes 40.

A carbon slurry (electrolyte slurry) 70 is pumped (via slurry pump 73 at a desired pump pressure $P_2$) through conduit 71 into the lower end cap internal space 22a (through inlet port 22b). The carbon slurry 70 then proceeds through the inner tubular membrane space 43 of each tubular membrane 40 and into the upper end cap internal space 21a, and then out of the discharge port 21b. The carbon slurry 70 can then be recirculated back to pump 73 for reuse. In one embodiment, the carbon slurry 70 exiting the cell 1E is directed via conduit 71 into an electrolyte (carbon slurry) reservoir 72 through reservoir inlet 72. If necessary, excess (overflow) saline solution can be separated out of the slurry and discharged through brine overflow conduit 75. The carbon slurry 70 can then exit the reservoir 72 through discharge port 72b and again be directed back into the cell 1E via conduit 71 and pump 73. As will be understood, the surface areas of these electrode embodiments (50, 60) in FIGS. 17A and 17B is higher than with the single wire electrode embodiments 48a, 49a in, e.g., FIG. 4.

As the saline feed solution 2 is pumped (via pump 2a at desired feed pump pressure $P_1$) through conduit 2b into the interior space 23 of the cell 1E, it flows around the outsides of a cluster of spaced-apart membrane tubes 40 located therein, including through the channels 23a created between the tubes 40. The cluster of membrane tubes 40 are preferably closely packed together. The feed solution 2 undergoes desalination and then exits the cell as desalinated fluid 3 through discharge port 26.

In one mode of operation, the fluid pressure $P_1$ of the saline feed solution 2 within the cell internal space 23 is greater than the fluid pressure $P_2$ of the carbon electrolyte slurry 70 within the tubular membrane internal space 43 causing a positive pressure differential (as measured by sensor 76) from the outside of the tubular membrane to the interior space 43 of the tubular membrane.

Example 5

In connection with the teachings above, including in particular FIGS. 9 and 9A and in reference to FIGS. 18A-29 there is also disclosed an FCDI desalination system cell embodiment 1F for use in treating saline feed stock Wi. In this embodiment, the cell 1F comprises two axially concentric tubular membranes 400, 500 positioned around a center chargeable rod or wire element 250, and "packaged" within a cylindrical housing 200 having a desired inside diameter, and a cell housing central axis 204, such as depicted in FIGS. 18A-24. The tubular membranes are coaxially aligned along central axis 204. This cell embodiment 1F further comprises a chargeable sleeve element 210 lining the inside of the housing 200. The lined housing 200 further includes a first, outer membrane element 400 coaxially nested inside the lined housing about axis 204 to create a first, outermost annular space 220 between the chargeable liner interior surface 210b and the outer membrane outer surface 400a. The lined housing 200 further includes a second, inner membrane element 500 coaxially nested inside the outer membrane 400 about axis 204 to create a second annular space 230 between the first outer membrane inner surface 400b and the second inner membrane outer surface 500a. A third annular space 240 is created about axis 204 within the interior of the inner membrane inner surface 500b. As will be understood from the disclosure, the two chargeable elements (210, 250) can be charged with opposite charge sources (one being anodic (+) charged, e.g., 252a, 252b, the other being cathodic (−) charged, e.g., 213a, 213b). The system cell if further comprises identical opposed end caps 300 (300a, 300b) oriented on opposed ends of the housing, each end cap being rotated 180 degrees relative to the other end cap.

As will further be understood from the teachings relative to FIGS. 18A-24 each system cell 1F is designed to create three separate and distinct flow paths through the interior of the system cell. In particular, the column housing (and the above described annular spaces) are separately tied into the opposed end caps to permit three distinct and separate flow paths through the system cell 1f, namely: (A) a flow path for receiving a first carbon slurry (CS1) which enters through inlet port 330a (CS1i) in a first end cap 300a, proceeds through the column in annular space 220 and then exists the opposed end cap 300b through outlet port 330b (CS1o); (B) a flow path for receiving a saline feed water to be treated (Wi) which enters through inlet port 320a (Wi) in end cap 300a, proceeds through the column in annular space 230 and then exists the opposed end cap 300b through outlet port 320b (Wo); and (C) a flow path for receiving a second carbon slurry (CS2) which enters through inlet port 340a (CS2i) in end cap 300a, proceeds through the column in annular space 240 and then exists the opposed end cap 300b through outlet port 340b (CS2o).

The spacing between the two membrane elements 400, 500 shall be minimized to maximize the capacitance, which in turn enhances the ion removal from the saline solution. Typical spacing is ¼ inch but a preferred spacing is ⅛".

With reference to the figures, the two carbon slurry solutions, termed anolyte (negatively charged carbon slurry) (here, CS1) and catholyte (positively charged carbon slurry) (here, CS2), flow on each side of the annular water gap 230 that is formed between the two concentric tubular membranes 400, 500 coaxially aligned with each other.

Also to be noted is the ratio of slurry flow rate and feed water flow rate. A nominal ratio is anywhere between about 50:1 and about as low as 5:1 depending upon the viscosity of the slurry. A preferred rate of 20:1 using a carbon recipe slurry of 30 centistokes.

In this embodiment the outer housing 200 and end caps 300a, 300b may be made from plastic materials. In one embodiment, the chargeable liner 210 and rod/wire 250 may comprise a titanium or coated titanium material. In one embodiment, two tubular ionic membranes of diameters nominally 3.50" (outer membrane 400) and 2.90" (inner membrane 500) respectively. These membrane tubes are available from, e.g., Membranes International Inc. NJ. USA. Coaxial to this concentric array is a solid core graphite or titanium rod/wire 250. Again referencing FIGS. 18A-24, the system cell 1F comprises cell housing 200 having a cell housing exterior surface 200a, a cell housing interior surface 200b, and a cell housing opposed end faces 202. In one embodiment, the cell housing 200 comprises PVC piping. A (titanium) chargeable tubular sleeve 210 lines the cell housing interior surface 200b and comprises a chargeable sleeve exterior surface 210a (facing/abutting against cell housing interior surface 200b; and a chargeable sleeve interior surface 210b. At opposed ends of the chargeable sleeve 210 are attached interface rods 213a, 213b for connecting the desired electrical source to the sleeve (the attachment being achieved via, e.g., welding).

Attached at opposed ends of the housing 200 are opposed, identical end caps 300 (300a, 300b) mounted with one end cap 300a being rotated 180 degrees relative to the other end cap 300b. It will be understood that upper and lower end caps 300a, 300b contain identical structure, but are mounted on the opposed ends of the column (housing 200) oriented 180 degrees so that they are symmetrical with each other about the x-axis.) It will also be understood that element numbering in the end caps is identical for the opposed end caps, but where desirable for the sake of specific reference, like elements in opposed end caps might be labelled with an -a, or -b suffix.

As will be described in more detail below, each end cap further comprises three basic structural components: housing 310 (310a, 310b), compression ring seal flange member 390 (fixedly attachable to ends of housing 200, e.g., with adhesive), and compression ring seal threaded locking ring 380. When the compression ring seal flange members 390 are mounted to opposed ends of the housing, the housing becomes essentially a length of flanged pipe. The threaded locking ring 280 serves to secure the end cap body 310 to the housing 200 via flange 390. In one embodiment, the structural components of the end caps comprise a plastic material and were manufactured using 3D printing. It will also be understood that the housing 200 with its opposed flange members 390 could be fashioned from a unitary material, such as molded or machined plastic, although it is preferred to maintain the ring seal flange members as separate members that are fixedly attachable to the outer surface of the housing 200.

The compressing ring seal flange member 390 (having height 390a) defined by ring seal upper end 391 and ring seal lower end 392. Flange member 390 further comprises a ring seal upper concentric ring member 393 and a ring seal lower concentric outwardly extending lip/flange member 394. Upper concentric ring member 393 further comprises a ring seal upper end face 393a, ring seal upper end outer diameter 393b, ring seal upper end face inner diameter 393c, ring seal upper end face width (as defined by the difference between the inner and outer diameters 393b, 393c), ring seal upper end outer surface 393e (capable of being fixedly attached (adhesively glued) to the outer surface of the housing 200 opposed ends), and ring seal upper end outer surface height 393f.

The ring seal lower concentric outwardly extending lip/flange member 394 further comprises a ring seal lower concentric outwardly extending lip/flange member upper shoulder face 394a, a ring seal lower concentric outwardly extending lip/flange member outer surface 394b, a ring seal lower concentric outwardly extending lip/flange member lower face 394c, a ring seal lower concentric outwardly extending lip/flange member lower face width 394d, a ring seal lower concentric outwardly extending lip/flange member height 394e, a ring seal lower concentric outwardly extending lip/flange shoulder face member width 394f, and a ring seal lower concentric outwardly extending lip/flange shoulder face member outer diameter 394g.

The compression ring seal flange member 390 further comprises a ring seal inner wall surface 395, ring seal lower concentric inwardly extending lip/flange member 396, ring seal lower concentric inwardly extending lip/flange member shoulder face 396a, and ring seal lower concentric inwardly extending lip/flange member inner diameter 396b.

The compression ring seal threaded locking ring 380 comprises: a locking ring outer surface 383, a locking ring upper end 381 and a locking ring lower end 382 defining a locking ring outer surface height 383f. The threaded locking ring 380 further comprises locking ring lower end face 383a, locking ring outer diameter 383b, locking ring lower end inner thread diameter 383c, locking ring lower end face width 383d, locking ring outer surface 383e, locking ring outer surface grips 383e. The threaded locking ring 380 also comprises locking ring upper concentric inwardly extending lip/flange member 384, locking ring upper concentric inwardly extending lip/flange member lower shoulder face 384a, locking ring upper concentric inwardly extending lip/flange member outer surface 384b, locking ring upper concentric inwardly extending lip/flange member upper face 384c, locking ring upper concentric inwardly extending lip/flange member upper face width 384d, locking ring upper concentric inwardly extending lip/flange member height 384e, locking ring upper concentric inwardly extending lip/flange member width 384f, and locking ring upper concentric inwardly extending lip/flange shoulder face member inner diameter 384g. The locking ring 380 further comprises locking ring internal threads 385 having locking ring internal thread depth 385a for engaging mated end cap threads 314 on the end cap housing 310.

Still referencing FIGS. 18A-24, the end cap housing 310 contains all of the inlet/outlet ports for the water and carbon slurry flow paths, as well as the structure for mounting the coaxial membranes 400, 500 to complete the three flow paths (220, 230, 240) passing through the end caps and housing. Each end cap housing 310 comprises an end cap housing outer surface 311, an end cap lower end 312, an end cap upper end 313, an end cap threaded section 314 having height 413a (for engaging the threads 385 on the locking ring 380), an end cap upper end flange face 315 having an end cap upper end flange face width 315a, an end cap upper end flange face grooved channel 316 for receiving a flange O-ring seal 316a (not shown in all figures). The end caps 310 further comprise an end cap upper end outer diameter 317 and an end cap upper end inner diameter 318.

Each end cap 310 comprises inlet and outlet ports for the carbon slurry flow paths and for the saline water flow path. It will be understood that the direction of flow for each flow path can be selected to go from one end of the column 1F to the other, or the reverse thereof. Therefore, the terms inlet/outlet for each flow path are interchangeable. More particularly, end cap 310 comprises water inlet/outlet port 320 (320a, 320b) for directing the water phase Wi (saline feed solution) into and through the system exiting the outlet as treated water Wo. In use, the saline feed solution Wi enters through inlet 320a and then travels through annular channel 230 before exiting through outlet 320b, the flow path being defined by the interior of the end cap 230a, 230b proximate the inlet/outlet 320a, 320b and the annular channel 230, all of which are in segregated fluid communication with each other within the system 1F.

End cap 310 further comprises a first carbon slurry (CS1) inlet/outlet port 330 (330a, 330b) for directing the first carbon slurry (CS1) phase into and through the system exiting the outlet. In use, the first carbon slurry (CS1) enters through inlet 330a and then travels through annular channel 220 before exiting through outlet 330b, the flow path being defined by the interior of the end cap 220a, 220b proximate the inlet/outlet 330a, 330b and the annular channel 220, all of which are in segregated fluid communication with each other within the system 1F.

End cap 310 further comprises a second carbon slurry (CS2) inlet/outlet port 340 (340a, 340b) for directing the second carbon slurry (CS2) phase into and through the system exiting the outlet. This second carbon slurry inlet/outlet 340 is located in the center of the end cap outer surface 311 about axis 204. In use, the second carbon slurry (CS2) enters through inlet 340a and then travels through annular channel 240 (defined by the inner annular area of the inner concentric membrane 500) before exiting through outlet 340b, the flow path being defined by the interior of the end cap 240a, 240b proximate the inlet/outlet 340a, 340b and the annular channel 240, all of which are in segregated fluid communication with each other within the system 1F.

End cap 310 further comprises two tubular barbed fittings 350, 360 coaxially aligned about central axis 204 in the interior of the end cap 310 for receiving the respective coaxial membranes 500, 400. Inner tubular barbed fitting 350 receives the inner membrane 500 and creates a sealed flow path 240 (240, 240a, 240b) through inlet/outlet ports 340 (340a, 340b) and annular channel 240 (for the flow of the second carbon slurry CS2). Inner tubular barbed fitting shoulder 352 provides for abutting an end of the inner membrane 500. The outer tubular barbed fitting 360 receives the outer coaxial membrane 400 and creates a sealed flow path 230 (230, 230a, 230b) through inlet/outlet ports 320 (320a, 320b) and annular channel 230 (for the flow of the water phase Wi, Wo). Outer tubular barbed fitting shoulder 362 provides for abutting an end of the outer membrane 400. With the outer membrane 400 in place, there is also created a sealed flow path 220 (220, 220a, 220b) through inlet/outlet ports 330 (330a, 330b) and annular channel 220 (for the flow of the first carbon slurry CS1).

As noted, an annular flow channel 220 (for first carbon slurry CS1 flow) exists between chargeable sleeve inner surface 210b and outer coaxial membrane exterior surface

400*a*. This flow channel 220 is in fluid communication with flow channel 220*a* (for first carbon slurry flow) within lower end cap and flow channel 220*b* (for first carbon slurry flow) within upper end cap. An annular flow channel 230 (for water flow Wi) exists between outer coaxial membrane interior surface 400*b* and inner coaxial membrane exterior surface 500*a*. This flow channel 230 is in fluid communication with flow channel 230*a* (for water flow) within lower end cap and flow channel 230*b* (for water flow) within upper end cap. An annular flow channel 240 (for second carbon slurry CS2 flow) exists between inner coaxial membrane interior surface 500*b* and chargeable rod/wire 250 exterior surface. This flow channel 240 is in fluid communication with flow channel 240*a* (for second carbon slurry flow) within lower end cap and flow channel 240*b* (for second carbon slurry flow) within upper end cap.

Each end cap 310 is further outfitted with a chargeable sleeve interface port 211 which permits the sealed passage therethrough of an electrode 213 (213*a*, 213*b*) for delivering the desired charge to the chargeable sleeve 210. A chargeable sleeve interface port seal/o-ring 212 (212*a*, 212*b*) is provided to create a liquid tight seal.

Inlet/exit ports 340 (340*a*, 340*b*) are also outfitted with chargeable rod/wire sealed interface port which permits the sealed passage therethrough of an electrode 252 (252*a*, 252*b*) for delivering the desired charge to the chargeable rod/wire 250 while also permitting the ingress or egress of the CS2 flow. In particular, referring to FIG. 24 (chargeable sleeve 210 and rod 213 having been removed for the sake of simplicity), the CS2 inlet and outlet ports 340 (340*a*, 340*b*) are outfitted with a suitable CS2 inlet/outlet connector 260 (260*a*, 260*b*). In this embodiment, each CS2 connector 260 has a suitable sealed connection member 261 (261*a*, 261*b*) that permits the electrode 213 (213*a*, 213*b*) to pass therethrough in sealed fashion along central axis 204. Each CS2 connector 260 also comprises a flow connection member 262 (262*a*, 262*b*) that permits the inflow or outflow of the CS2 flow into connector 260 and into the cell central annular space 240 (240*a*, 240*b*) As will be understood from the disclosure, the cell system 1F employs suitable flow conduit connections 270-275 to attach the flow lines for the water and carbon slurry flows to the cell. These connections are known in the art. In one embodiment, the chargeable rod/wire 250 is titanium or coated titanium.

Fixedly attached (e.g., with adhesives) at opposed ends of the housing 200 are the two opposed compression ring seal flange members 390. In one embodiment, the coaxial membranes 400, 500 are fixedly attached (e.g., with adhesives) over the respective barbed fittings 360, 350. The compression ring 380 is then tightened to draw the end cap 310 into sealed relationship with the housing.

As an example operation of system 1F, the first carbon slurry phase (CS1) can be negatively charged via sheath 210 (negatively charged by electrical source applied to electrode 213) as the CS1 flows through its flow path. The second carbon slurry phase (CS2) can be positively charged via rod/wire 250 (positively charged by electrical source applied to electrode 252) as the CS2 flows through its flow path. As CS1 enters its flow path, it becomes negatively charged and continues to flow through annular spaces 220, 220*a*, 220*b*) as an anolyte (negatively charged) carbon slurry. As CS2 enters its flow path it becomes positively charged and continues to flow through annular spaces 240, 240*a*, 240*b* as a catholyte (positively charged) carbon slurry. The role of the wire electrodes, coil electrodes, mesh electrodes and sheath electrodes described herein is to charge the carbon slurry flows (CS1, CS2). The sheath 210 and rod/wire 250 are connected to a positive or negative power supply as described, and the slurries are in electrical contact therewith. The carbon slurries scavenge the ionic content, (Na+, Cl−, etc.) from W1 saline water by electrostatic attraction through the two ionic membranes 400, 500 (as the water passes through its flow path 230, 230*a*, 230*b*). When the two slurries (CS1, CS2) emerge from the cell 1F, they lose their respective charges, are combined, and the carbon slurry is discharged or recycled. The ionic content is then filtered off as brine if necessary. The combined carbon slurries are recirculated back to the cell.

The new system 1F can be employed as a single cell system (where the cell size and length are adjusted to suit the needs of the desalination operation. Additionally multiple cells can be used in series fashion where, e.g., the Wo exiting the first cell becomes the Wi for the next cell, etc., and where the carbon slurries (CS1, CS2) are either directed to the next cell in the series or directed back to recycle and new CS1, CS2 is delivered to each successive cell.

Referring now to FIGS. 25-29 there are shown a number of exemplary FCDI desalination systems (100B-100F) employing one or more of the FCDI desalination system cell embodiments 1F set out in FIGS. 18A-24.

Figure 25:
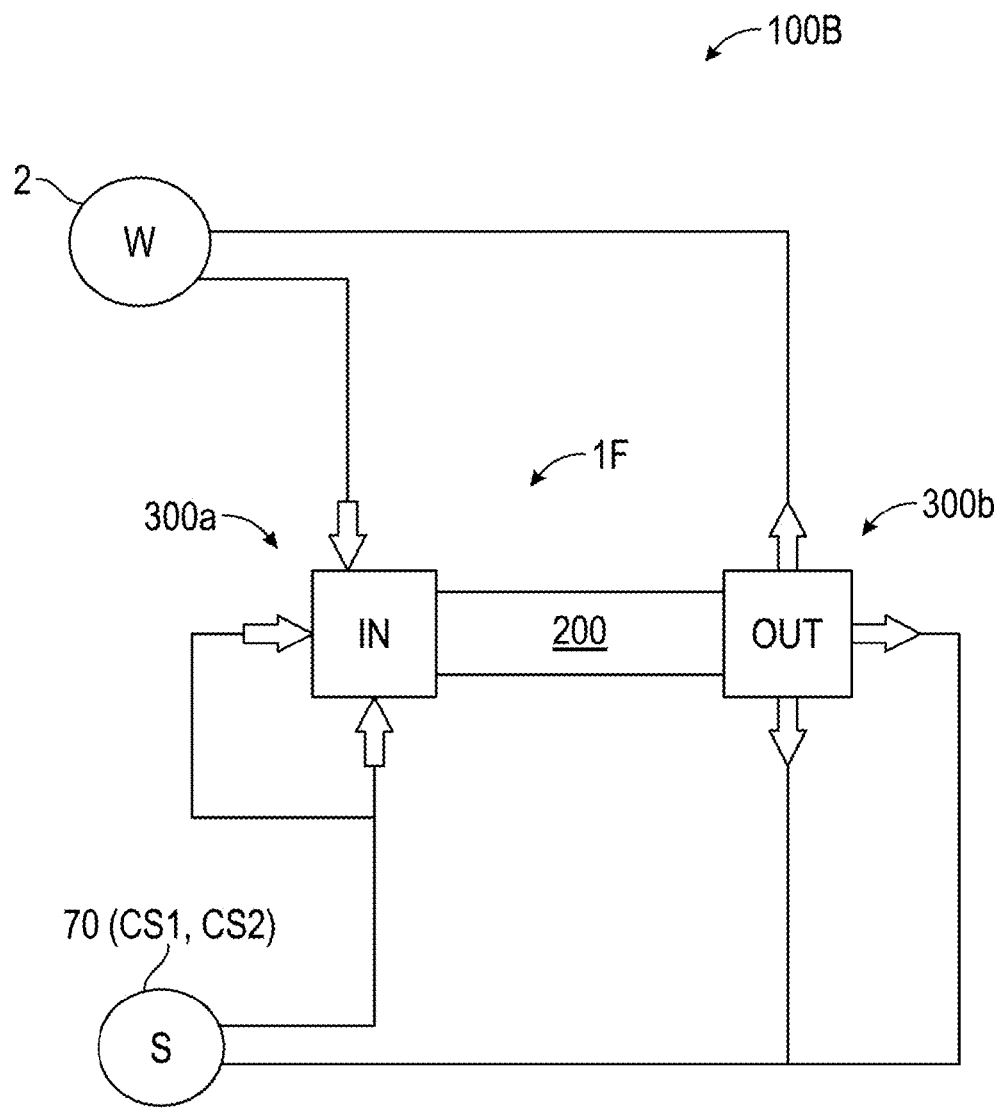
FIGS. 25-29 depict schematic views of exemplary FCDI desalination systems according to embodiments of the present disclosure.

Referring to FIG. 25, FCDI desalination system 100B takes saline feed water 2 from a tank and recirculates it through the cell 1F (into end cap 300*a* and out end cap 300*b*) and back into the feed water 2 tank. As the feed water circulates through the cell 1F, its ions are removed and ultimately, the volume of water 2 in the feed tank is desalinated to the desired level. In this embodiment, the carbon slurry 70 feeds both the CS1 and CS2 inlets in the first end cap 300*a*, and after exiting the outlet ports in the second end cap 300*b*, the carbon slurry 70 is recirculated back to the slurry tank for reuse.

Figure 26:
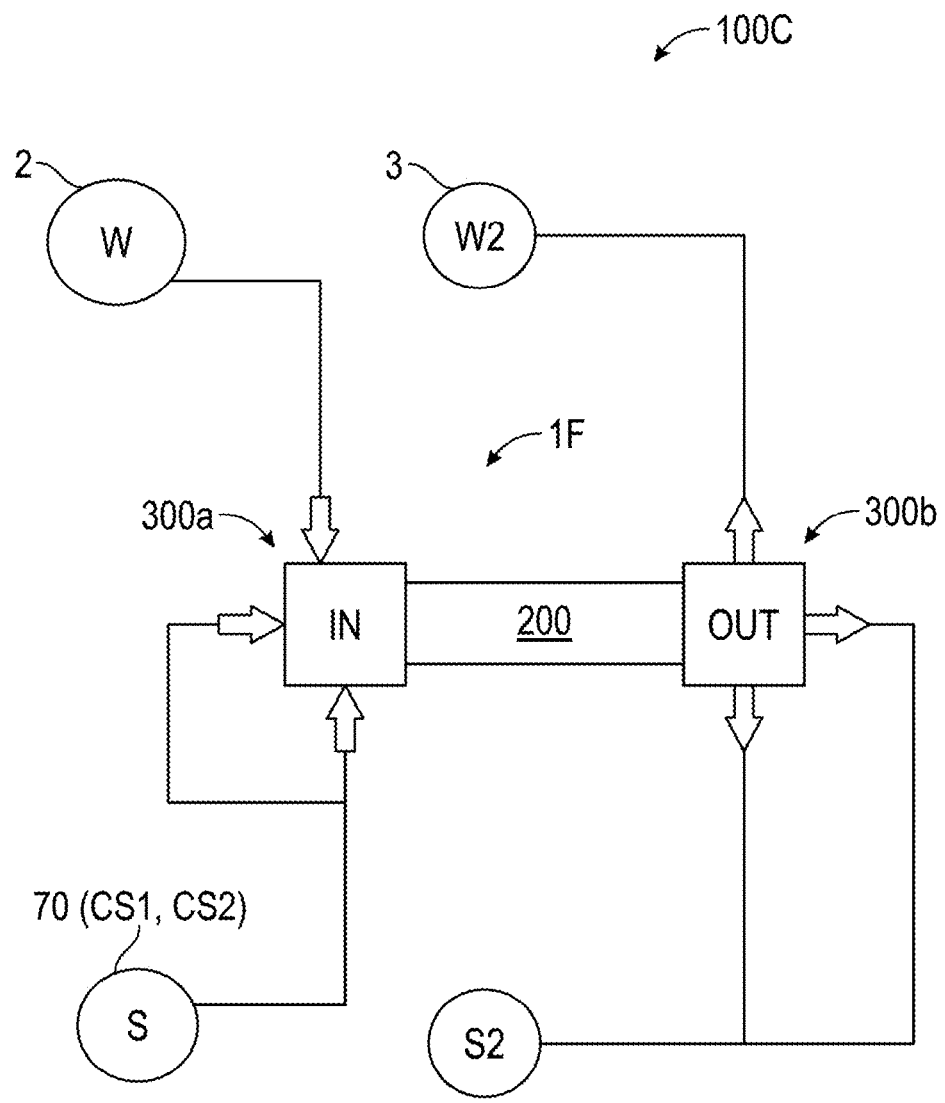

Referring to FIG. 26, FCDI desalination system 100C takes saline feed water 2 from a tank (or other source) and directs it into the cell 1F (via the inlet in the first end cap 300*a*). The desalinated water 3 is then directed out of the cell (via the outlet in the second end cap 300*b*) and to a desired location. As the feed water passes through the cell, its ions are removed and the water is desalinated to a desired level. In this embodiment, the carbon slurry 70 feeds both the CS1 and CS2 inlets in the first end cap 300*a*, and after exiting the outlet ports in the second end cap 300*b*, the carbon slurry 70 is directed to a desired location S2.

Figure 27:
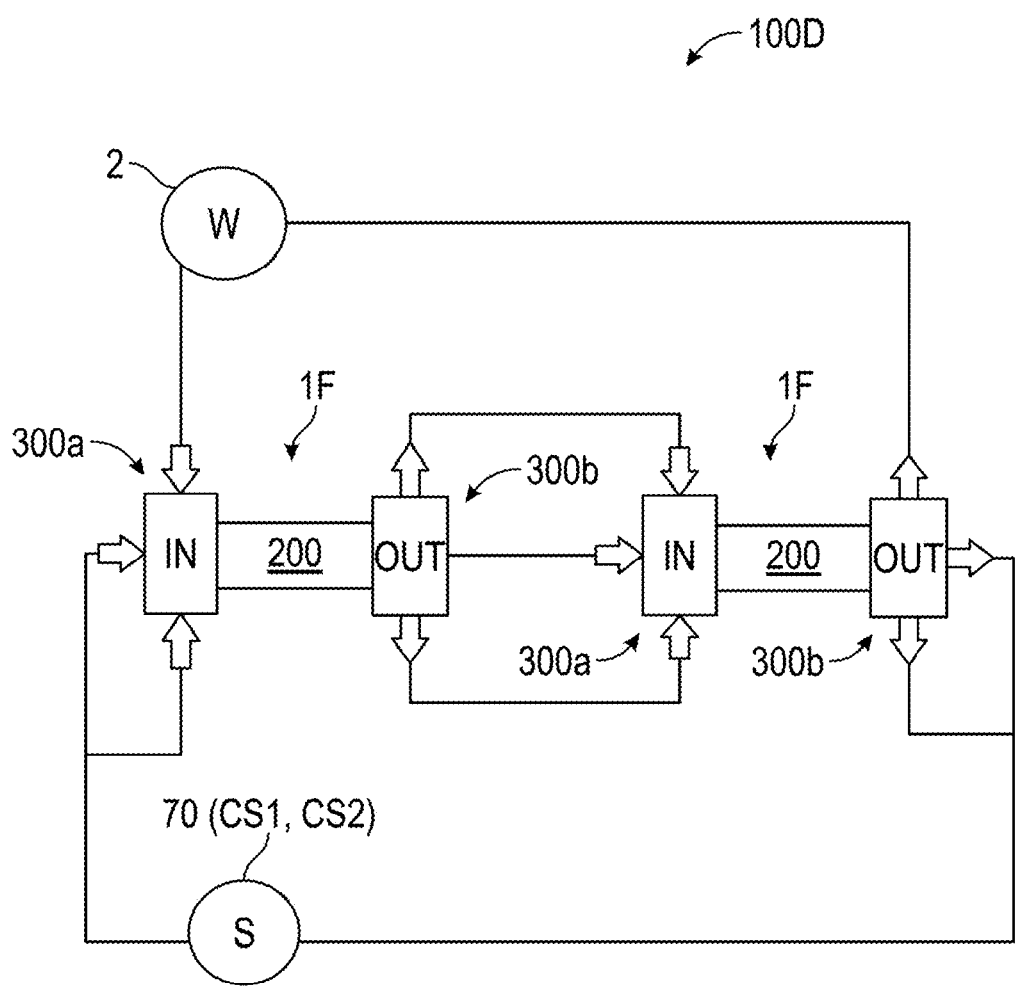

Referring now to FIG. 27, FCDI desalination system 100D utilizes two or more cells 1F connected in series. FCDI desalination system 100D receives saline feed water 2 from a tank and directs it through a first cell 1F (into end cap 300*a* and out end cap 300*b*). The treated water exiting from the first cell becomes the inlet water fed into the second (or further) cell 1F, with the treated water exiting the last cell in the series being directed back into the feed water 2 tank. As the feed water circulates through the series of cells 1F, its ions are removed and ultimately, the volume of water 2 in the feed tank is desalinated to the desired level. In this embodiment, the carbon slurry 70 feeds both the CS1 and CS2 inlets in the first end cap 300*a* of the first cell 1F in the series, and after exiting the outlet ports in the second end cap 300*b* of the first cell, the carbon slurry 70 is directed into the CS1 and CS2 inlet ports of the first end cap 300*a* of the second (or next cell) 1F in the series. After circulating through all of the cells in the series, the CS1 and CS2 flows are recirculated back to the slurry tank for reuse.

Figure 28:
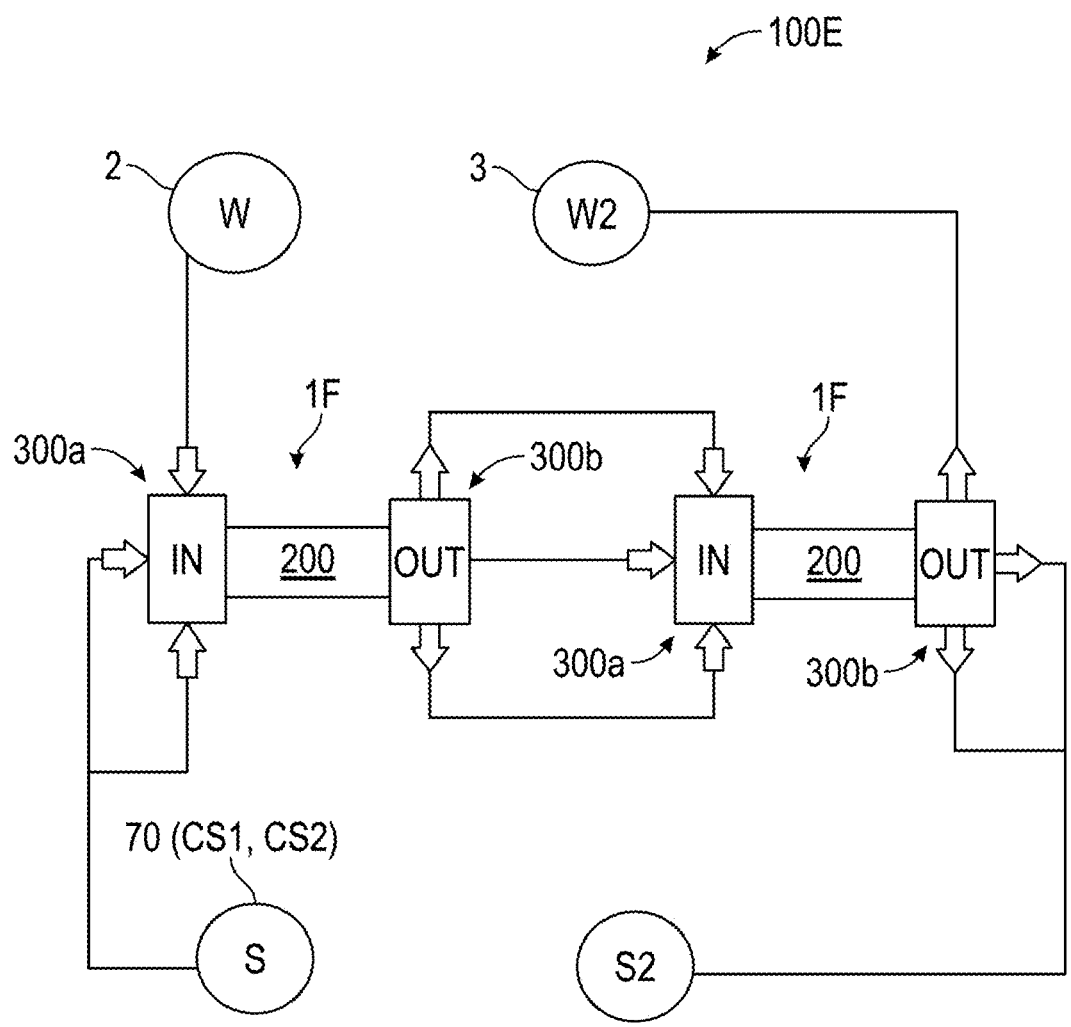

Referring now to FIG. 28 (FCDI desalination system 100E), much like with FIGS. 26 and 27, the inlet feed water 2 passes in series fashion through the two or more cells 1F arranged in series, with the final desalinated water 3 being directed to a desired location W2. In this embodiment, the carbon slurry flows (CS1 and CS2) likewise pass in series fashion through the two or more cells 1F arranged in series, with the final exiting slurry flows (CS1, CS2) being directed to a desired location S2.

Figure 29:
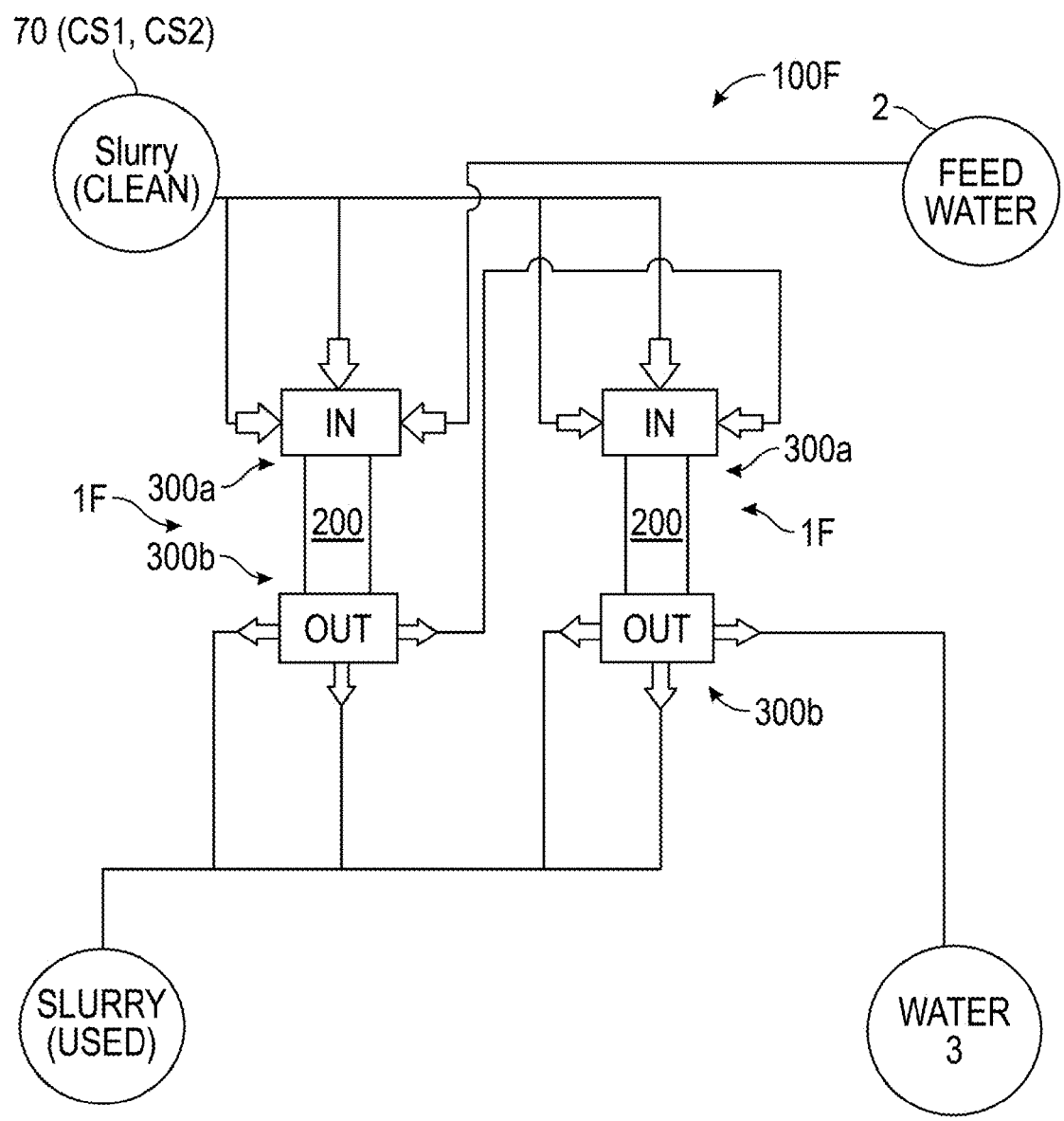

Referring now to FIG. 29 (FCDI desalination system 100F), as will be understood, other flow arrangements can be configured using the cells 1F of the present disclosure. In this embodiment, the feed water 2 to be treated passes in series fashion through the two or more cells 1F arranged in series, with the final desalinated water 3 being directed to a desired location. In this embodiment, each of the cells 1F in the series of cells receives its own source of carbon slurry 70. The used carbon slurry exiting each cell is then directed to a desired location.

As will be understood by those having the benefit of the present disclosure, various FCDI desalination system configurations can exist employing the exemplary FCDI desalination system cell 1F described herein. Also, these systems can employ multiple cells, cells arranged in series or in parallel, and cells of varying sizes and lengths to accommodate the desalination requirements.

REFERENCES

The following represents an exemplary list of U.S Patent references:
U.S. Pat. No. 10,556,812 (Gardiner) entitled "System and Method for Reducing the Dissolved Solids of a Non-Potable Aqueous Flow" (01/11/2020).
U.S. Pat. No. 5,425,858 (Farmer) entitled "Method and Apparatus for Capacitive de Ionization, Electrochemical Purification, and Regeneration of Electrodes" (Jun. 20, 1995).
U.S. Pat. No. 9,061,251 (Hobbs et al.) entitled "Self Sealing Membrane Contactor With PTFE Tubular Membranes" (Jun. 23, 2015).

The following represents an exemplary list of U.S Patent Application Publications:
U.S. Patent Application Pub. No. 2011/0281169 (Zheng et al) entitled "Electrode for Flow Battery" (Nov. 11, 2017).
U.S. Patent Application Pub. No. 20110281169 (Seed et al) entitled "Through-Flow Capacitive Deionization Cell" (Oct. 4, 2012).
U.S. Patent Application Pub. No. 20140027288 (Nyberg et al) entitled "Electrochemical Ion Exchange Treatment of Fluids" (Jan. 30, 2014).
U.S. Patent Application Pub. No. 20160185628 (Servida) entitled "Apparatus for Purifying a Fluid and Method for the Attainment Thereof" (Jun. 30, 2016).
U.S. Patent Application Pub. No. 20120273359 (Suss et al) entitled "Flow-Through Electrode Capacitive Desalination" (Nov. 1, 2012).

The following represents an exemplary list of Foreign Patent Documents:
KOREA INSTITUTE OF ENERGY RESEARCH, KR 10-2015-0002364 (Jan. 7, 2015).
KOREA INSTITUTE OF ENERGY RESEARCH, KR 10-2016-0136266 (Nov. 29, 2015).

The following represents an exemplary list of non-patent literature references:
ANDERSON M A; CUDERO A L; PALMA J; "Capacitive deionization as an electrochemical means of saving energy and delivering clean water. Comparison to present desalination practices: Will it compete?", *Electrochimica Acta*, (Feb. 12, 2010), 55(12), pp. 3845-3856.
BIESHEUVEL P M, "Thermodynamic cycle analysis for capacitive deionization", *Journal of Colloid and Interface Science,* 2009, 332, 258.
BIESHEUVEL P M; ZHAO R; PORADA S, VAN DER WAL A; "Theory of membrane capacitive deionization including the effect of the electrode pore space", *Journal of Colloid and Interface Science* 2011, 361, 239.
CAMPOS, JONATHAN W., MAJID BEIDAGHI; KELSEY B. HATZELL; CHRISTOPHER R. DENNISON; BENJAMIN MUSCI; VOLKER PRESSER; EMIN C. KUMBUR AND YURI GOGOTSI. "Investigation of carbon Materials for use as a flow able electrode in electrochemical flow capacitors." *Electrochimica Acta* 98 (2012); 123-130.
DENNISON, C. R., BEIDAGHI, M., HATZELL, K. B., CAMPOS, J. W., GOGOTSI, Y., KUMBUR, E. C., 2014, "Effects of Flow Cell Design on Charge percolation and storage in the carbon slurry electrodes of electrochemical flow capacitors." *Journal of Power Sources*, Vol. 247, pp. 489-496.
HATZELL, K. B., BEIDAGHI, M., CAMPOS, J. W., DENNISON, C. R., KUMBUR, E. C. AND GOGOTSI, Y., 2013 "A High Performance Pseudo capacitive capacitor: a new concept for rapid energy storage and recovery." *Electrochimica Acta*, Vol 111, pp 888-902.
JEON, SUNG-IL, PARK, HONG-RAN, YEO, JEONG-GU, YANG, SEUNGCHEOL, CHO, CHURL HEE, HAN, MOON HEE AND KIM, DONG KOOK, "Desalination via a new membrane capacitive deionization process utilizing flow-electrodes", *Energy Environ. Sci.,* 2013, 6, 1471-1475.
KIM, S. J, KO, S. H., KANG, K. H., HAN, J., "Direct seawater desalination by ion concentration polarization", *Nature Nanotechnology* 2010, 5, 297-302.
KIM, Y. J.; CHOI, J. H.; "Improvement of desalination efficiency in capacitive deionization using a carbon electrode coated with an ion-exchange polymer", *Water Research* 2010, 4(3) 990-996.
KONDRAT, S., PRESSER, V., PEREZ, C. R., GOGOTSI, Y., KORNYSHEV, A. A., "Effect of pore size and its dispersity on the energy storage in nanoporous supercapacitors", *Energy and Environmental Science*, (March 2012) 5(4), pp. 6474-6479.
LEONARD K. C.; GENTHE J R; SANFILIPPO J L; ZELTNER W A; ANDERSON M A; "Synthesis and Characterization of Asymmetric Electrochemical Capacitive Deionization Materials Using Nanoporous Silicon Dioxide and Magnesium Doped Aluminum Oxide." *Electrochimica Acta* Vol. 54, Issue 22, pp. 5286-5291 (2009).
LEE J H; BAE W S; CHOI J H; "Electrode reactions and adsorption/desorption performance related to the applied potential in a capacitive deionization process", *Desalination* 258 (Apr. 10, 2010), pp. 159-163.
LEE J B; PARK K K, EUM H M; LEE C W; "Desalination of a thermal power plant wastewater by membrane capacitive deionization", Desalination, 196 (Aug. 28, 2006), pp. 125-134.
LI, H.; GAO, Y.; PAN, L., ZHANG, Y., CHEN, Y.; SUN, Z., "Electrosorptive desalination by carbon nanotubes and nanofibres electrodes and ion-exchange membranes" *Water Research* (Oct. 2, 2008), 42, 4923-4928

LI H; ZOU L D; PAN L K; SUN Z; "Novel graphene-like electrodes for capacitive deionization", *Environmental Science and Technology*, (Oct. 21, 2010), 44(22), pp. 8692-8697.

LI H; ZOU L; "Ion-exchange membrane capacitive deionization: A new strategy for brackish water desalination", Desalination (May 14, 2011), 275(1-3), 62-66

PASTA M; WESSELLS C D; CUI Y; LA MANTIA F; "A desalination battery", *Nano Letters*, (Jan. 23, 2012), 12, 839-843.

PORADA, S., BORCHARDT, L., OSCHATZ, M., BRYJAK, M., ATCHISON, J. S., KEESMAN, K. J., KASKEL, S., BIESHEUVEL, P. M., AND PRESSER, V., "Direct prediction of the desalination performance of porous carbon electrodes for capacitive deionization", *Energy Environ. Sci.*, (Aug. 14, 2013), 6, 3700-3712.

PORADA, S., ZHAO, R., VAN DER WAL, A., PRESSER, V., AND BIESHEUVEL, "Review on the science and Technology of Water Desalination by Capacitive Deionization [OPEN ACCESS]". *Progress in Materials Science,* 2013, 58: 1388-1442.

PRESSER, VOLKER, CHRISTOPHER R DENNISON, JONATHAN CAMPOS, KEVIN W. KNEHR, EMIN C. KUMBUR, AND YURI GOGOTSI, "*The Electrochemical Flow Capacitor: A new Concept for rapid energy storage and recovery*." Advanced Energy Materials, (May 23, 2012), 2(7), pp. 895-902.

ROMMERRSKIRCHEN, A.; GENDEL, Y.; and WESSLING, M., "*Single Module Flow-Electrode Capacitive de ionization for Continuous Water de Salination*", Electrochemistry Communications (Jul. 29, 2015), 60, pp. 34-37.

SIMON P; GOGOTSI Y; "Materials for electrochemical capacitors", Nature Materials (2008), 7(11), 845-854.

SUSS, M. E., PORADA, S., SUN, X., BIESHEUVEL, P. M., YOON, J., PRESSER, V., "Water De Salination via Capacitive de Ionization: what is it and what can we expect from it?" *Energy and Environmental Science.* 2015, 8, 2296.

UNDA J E Z; RODUNER E; "Reversible transient hydrogen storage in a fuel cell—supercapacitor hybrid device", *Phys. Chem. Chem. Phys.* (2012), 14, pp. 3816-3824.

WEINSTEIN, LAWRENCE, AND RANJAN DASH, *Capacitive Deionization: Challenges and Opportunities. Desalination & Water Reuse*, November-December 2013, pp. 34-27.

YANG, SEUNGCHEOL, CHOI, JIYEON, YEO, JEONG-GU, JEON, SUNG-IL, PARK, HONG-RAN AND KIM, DONG KOOK, "Flow-electrode capacitive deionization using an aqueous electrolyte with a high salt concentration." *Environ Sci Technol.* 2016 Jun. 7; 50(11):5892-9.

YANG, SEUNGCHEOL, JEON, SUNG-IL, KIM, HANKI, CHOI, JIYEON, YEO, JEONG-GU, PARK, HONG-RAN, AND KIM, DONG KOOK, "Stack design and operation for scaling up the capacity of flow-electrode capacitive deionization technology." *ACS Sustainable Chemistry and Engineering,* 2016, 4 (8), pp 4174-4180.

YUAN, L., YANG, X., LIANG, P., WANG, L., HUANG, Z. H., WEI, J., HUANG, X. 2012. "Capacitive deionization coupled with microbial fuel cells to desalinate low concentration salt water. *Bioresource Technology,* 110, 735-8.

ZHAO, R; BIESHEUVEL P M; MIEDEMA H; BRUNNING H; VAN DER WAL A; "Charge efficiency: A functional tool to probe the double-layer structure inside of porous electrodes and application in the modeling of capacitive deionization", *The Journal of Physical Chemistry* Letters 2010, 1, 205.

ZOU, L., LI, L., SONG, H., MORRIS, G., "Using mesoporous carbon electrodes for brackish water desalination." *Water Research* 2008 April; 42(8-9):2340-8.

HATZELL, K. B.; HATZELL, M. C.; COOK, K. M.; BOOTA, M.; HOUSE, G. M.; MCBRIDE, A.; KUMBUR, E. C.; and GOGOTSI, Y., "Effect of Oxidation of Carbon Material on Suspension Electrodes for Flow Electrode Capacitive Deionization", Environ. Sci. Technol., (Jan. 29, 2015), 49(5), pp. 3040-3047.

LAWRENCE LIVERMORE NATIONAL LABORATORY, "Flow-Through Electrode Capacitive Desalinization", ipo.llnl.gov/technologies/fte_cd, October 2014, https://ipo.llnl.gov/technologies/energy., 2 pages.

All references referred to herein are incorporated herein by reference as providing teachings known within the prior art. While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

I claim:

1. A flow-electrode capacitive deionization (FCDI) desalination cell comprising:
   a. a tubular housing oriented about a central axis and having an upper end, a lower end, an inner surface, an outer surface, an interior space and an inside diameter;
   b. an outer tubular membrane extending about the central axis between the tubular housing upper end and the tubular housing lower end, the outer tubular membrane having an upper end, a lower end, an outer surface, an inner surface and an inside diameter, and an outside diameter smaller than the tubular housing inside diameter;
   c. an inner tubular membrane extending about the central axis between the tubular housing upper end and the tubular housing lower end, the inner tubular membrane having an upper end, a lower end, an outer surface, an inner surface, an inside diameter, and an outside diameter smaller than the outer tubular membrane inside diameter, the inner tubular membrane being coaxially aligned along the central axis within the outer tubular membrane;

d. a chargeable sleeve lining the inner surface of the tubular housing, the chargeable sleeve having upper and lower ends, an inner surface, and is capable of receiving a positive or negative polarity;
e. a chargeable wire extending down the central axis through the tubular housing member, the chargeable wire having an upper end and a lower end, and is capable of receiving a positive or negative polarity opposite to the polarity of the chargeable sleeve;
f. a first annular space between the outer tubular member outer surface and the chargeable sleeve inner surface for receiving a first carbon slurry;
g. a second annular space between the outer tubular membrane inner surface and the inner tubular membrane outer surface for receiving a feed solution to be treated;
h. a third annular space between the inside diameter of the inner tubular membrane for receiving a second carbon slurry;
i. a tubular lower end cap attached to the tubular housing lower end and comprising
   i. a cylindrical side wall having a left side and a right side,
   ii. an end face,
   iii. a right side inlet port extending outwardly from the right side wall of the lower end cap for receiving a first carbon slurry flow, the right side inlet port creating a separate first carbon slurry flow channel within the tubular lower end cap,
   iv. a left side inlet port extending outwardly from the left side wall of the lower end cap for receiving the feed solution to be treated, the left side inlet port creating a separate feed solution flow channel within the tubular lower end cap,
   v. a lower inlet port extending outwardly from the lower end cap end face about the central axis for receiving a second carbon slurry flow, the lower inlet port creating a separate second carbon slurry flow channel within the tubular lower end cap,
   vi. a chargeable wire lower electrode connected to the chargeable wire lower end and extending along the central axis through the lower second carbon slurry inlet port in sealed fashion,
   vii. an inner tubular barbed fitting extending inwardly along the central axis from the lower second carbon slurry inlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the lower end of the inner tubular membrane about the central axis,
   viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane,
   ix. a lower chargeable sleeve interface port for receiving a lower chargeable sleeve electrode therethrough in sealed fashion, the lower chargeable sleeve electrode being attachable to the lower end of the chargeable sleeve;
j. a tubular upper end cap attached to the tubular housing upper end and comprising
   i. a cylindrical side wall having a left side and a right side,
   ii. an end face,
   iii. a right side outlet port extending outwardly from the right side wall of the lower end cap for discharging the first carbon slurry flow, the right side outlet port creating a separate first carbon slurry flow channel within the tubular upper end cap,
   iv. a left side outlet port extending outwardly from the left side wall of the upper end cap for discharging a treated solution, the left side outlet port creating a separate treated solution flow channel within the tubular upper end cap,
   v. an upper outlet port extending outwardly from the upper end cap end face about the central axis for discharging the second carbon slurry flow, the upper outlet port creating a separate second carbon slurry flow channel within the tubular upper end cap,
   vi. a chargeable wire upper electrode connected to the chargeable wire upper end and extending along the central axis through the upper second carbon slurry outlet port in sealed fashion,
   vii. an inner tubular barbed fitting extending inwardly along the central axis from the upper second carbon slurry outlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the upper end of the inner tubular membrane about the central axis,
   viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane,
   ix. an upper chargeable sleeve interface port for receiving an upper chargeable sleeve electrode therethrough in sealed fashion, the upper chargeable sleeve electrode being attachable to the upper end of the chargeable sleeve;
k. a first carbon slurry flow path comprising the lower right side inlet port, the separate first carbon slurry flow channel within the lower end cap, the first annular space, the separate first carbon slurry flow channel within the upper end cap, and the upper right side outlet port;
l. a feed solution flow path comprising the lower left side inlet port, the separate feed solution flow channel within the lower end cap, the second annular space, the separate treated solution channel within the upper end cap, and the upper left side outlet port; and
m. a second carbon slurry flow path comprising the lower inlet port on the lower end cap, the separate annular second carbon slurry flow channel within the lower end cap, the third annular space, the separate annular second carbon slurry flow channel within the upper end cap, and the upper inlet port on the upper end cap.

2. The flow-electrode capacitive deionization (FCDI) desalination cell of claim 1 wherein the chargeable sleeve, the upper and lower chargeable sleeve electrodes, the chargeable wire and the upper and lower chargeable wire electrodes comprise titanium.

3. The flow-electrode capacitive deionization (FCDI) desalination cell of claim 2 wherein the titanium is a coated titanium.

4. The FCDI desalination cell of claim 1 wherein the tubular membranes are selected from the group consisting of ultra-fine (UF) filter tubes, cellulose ester membranes, tubular ionic membranes, porous and compressible PTFE and/or fluorocopolymers.

5. A flow-electrode capacitive deionization (FCDI) desalination system comprising:
   A. an FCDI desalination cell comprising
      a. a tubular housing oriented about a central axis and having an upper end, a lower end, an inner surface, an outer surface, an interior space and an inside diameter;
      b. an outer tubular membrane extending about the central axis between the tubular housing upper end and the tubular housing lower end, the outer tubular membrane having an upper end, a lower end, an outer surface, an inner surface and an inside diameter, and an outside diameter smaller than the tubular housing inside diameter;
      c. an inner tubular membrane extending about the central axis between the tubular housing upper end and the tubular housing lower end, the inner tubular membrane having an upper end, a lower end, an outer surface, an inner surface, an inside diameter, and an outside diameter smaller than the outer tubular membrane inside diameter, the inner tubular membrane being coaxially aligned along the central axis within the outer tubular membrane;
      d. a chargeable sleeve lining the inner surface of the tubular housing, the chargeable sleeve having upper and lower ends, an inner surface, and is capable of receiving a positive or negative polarity;
      e. a chargeable wire extending down the central axis through the tubular housing member, the chargeable wire having an upper end and a lower end, and is capable of receiving a positive or negative polarity opposite to the polarity of the chargeable sleeve;
      f. a first annular space between the outer tubular member outer surface and the chargeable sleeve inner surface for receiving a first carbon slurry;
      g. a second annular space between the outer tubular membrane inner surface and the inner tubular membrane outer surface for receiving a feed solution to be treated;
      h. a third annular space between the inside diameter of the inner tubular membrane for receiving a second carbon slurry;
      i. a tubular lower end cap attached to the tubular housing lower end and comprising
         i. a cylindrical side wall having a left side and a right side,
         ii. an end face,
         iii. a right side inlet port extending outwardly from the right side wall of the lower end cap for receiving a first carbon slurry flow, the right side inlet port creating a separate first carbon slurry flow channel within the tubular lower end cap,
         iv. a left side inlet port extending outwardly from the left side wall of the lower end cap for receiving the feed solution to be treated, the left side inlet port creating a separate feed solution flow channel within the tubular lower end cap,
         v. a lower inlet port extending outwardly from the lower end cap end face about the central axis for receiving a second carbon slurry flow, the lower inlet port creating a separate second carbon slurry flow channel within the tubular lower end cap,
         vi. a chargeable wire lower electrode connected to the chargeable wire lower end and extending along the central axis through the lower second carbon slurry inlet port in sealed fashion,
         vii. an inner tubular barbed fitting extending inwardly along the central axis from the lower second carbon slurry inlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the lower end of the inner tubular membrane about the central axis,
         viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane,
         ix. a lower chargeable sleeve interface port for receiving a lower chargeable sleeve electrode therethrough in sealed fashion, the lower chargeable sleeve electrode being attachable to the lower end of the chargeable sleeve;
      j. a tubular upper end cap attached to the tubular housing upper end and comprising
         i. a cylindrical side wall having a left side and a right side,
         ii. an end face,
         iii. a right side outlet port extending outwardly from the right side wall of the lower end cap for discharging the first carbon slurry flow, the right side outlet port creating a separate first carbon slurry flow channel within the tubular upper end cap,
         iv. a left side outlet port extending outwardly from the left side wall of the upper end cap for discharging a treated solution, the left side outlet port creating a separate treated solution flow channel within the tubular upper end cap,
         v. an upper outlet port extending outwardly from the upper end cap end face about the central axis for discharging the second carbon slurry flow, the upper outlet port creating a separate second carbon slurry flow channel within the tubular upper end cap,
         vi. a chargeable wire upper electrode connected to the chargeable wire upper end and extending along the central axis through the upper second carbon slurry outlet port in sealed fashion, vii. an inner tubular barbed fitting extending inwardly along the central axis from the upper second carbon slurry outlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the upper end of the inner tubular membrane about the central axis, viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane, ix. an upper chargeable sleeve interface port for receiving an upper chargeable sleeve electrode therethrough in sealed fashion, the upper chargeable sleeve electrode being attachable to the upper end of the chargeable sleeve;

k. a first carbon slurry flow path comprising the lower right side inlet port, the separate first carbon slurry flow channel within the lower end cap, the first annular space, the separate first carbon slurry flow channel within the upper end cap, and the upper right side outlet port;

l. a feed solution flow path comprising the lower left side inlet port, the separate feed solution flow channel within the lower end cap, the second annular space, the separate treated solution channel within the upper end cap, and the upper left side outlet port;

m. a second carbon slurry flow path comprising the lower inlet port on the lower end cap, the separate annular second carbon slurry flow channel within the lower end cap, the third annular space, the separate annular second carbon slurry flow channel within the upper end cap, and the upper inlet port on the upper end cap;

B. a first motive force for introducing the feed solution, to be desalinated, through the feed solution inlet port and into the cell, at a first pressure P1, and for urging the feed solution to move through the feed solution flow path while contacting the outer surface of the inner tubular membrane and the inner surface of the outer tubular membrane before exiting the cell through the treated solution outlet port;

C. a source of the first carbon slurry;

D. a second motive force for introducing the first carbon slurry into the first carbon slurry flow path, at a second pressure P2; and E. a third motive force for introducing the second carbon slurry into the second carbon slurry flow path, at a third pressure P3.

6. The flow-electrode capacitive deionization (FCDI) desalination cell of claim 5 wherein the chargeable sleeve, the upper and lower chargeable sleeve electrodes, the chargeable wire and the upper and lower chargeable wire electrodes comprise titanium.

7. The flow-electrode capacitive deionization (FCDI) desalination cell of claim 6 wherein the titanium is a coated titanium.

8. The FCDI desalination cell of claim 5 wherein the plurality of tubular membranes are selected from the group consisting of ultra-fine (UF) filter tubes, cellulose ester membranes, tubular ionic membranes, porous and compressible PTFE and/or fluorocopolymers.

9. A method of flow-electrode capacitive deionization (FCDI) desalination of brine or brackish feed water solution comprising the steps of:

A. introducing the brine or brackish feed water solution into an FCDI desalination cell, the cell comprising a. a tubular housing oriented about a central axis and having an upper end, a lower end, an inner surface, an outer surface, an interior space and an inside diameter;

b. an outer tubular membrane extending about the central axis between the tubular housing upper end and the tubular housing lower end, the outer tubular membrane having an upper end, a lower end, an outer surface, an inner surface and an inside diameter, and an outside diameter smaller than the tubular housing inside diameter;

c. an inner tubular membrane extending about the central axis between the tubular housing upper end and the tubular housing lower end, the inner tubular membrane having an upper end, a lower end, an outer surface, an inner surface, an inside diameter, and an outside diameter smaller than the outer tubular membrane inside diameter, the inner tubular membrane being coaxially aligned along the central axis within the outer tubular membrane;

d. a chargeable sleeve lining the inner surface of the tubular housing, the chargeable sleeve having upper and lower ends, an inner surface, and is capable of receiving a positive or negative polarity;

e. a chargeable wire extending down the central axis through the tubular housing member, the chargeable wire having an upper end and a lower end, and is capable of receiving a positive or negative polarity opposite to the polarity of the chargeable sleeve;

f. a first annular space between the outer tubular member outer surface and the chargeable sleeve inner surface for receiving a first carbon slurry;

g. a second annular space between the outer tubular membrane inner surface and the inner tubular membrane outer surface for receiving a feed solution to be treated;

h. a third annular space between the inside diameter of the inner tubular membrane for receiving a second carbon slurry;

i. a tubular lower end cap attached to the tubular housing lower end and comprising i. a cylindrical side wall having a left side and a right side, ii. an end face, iii. a right side inlet port extending outwardly from the right side wall of the lower end cap for receiving a first carbon slurry flow, the right side inlet port creating a separate first carbon slurry flow channel within the tubular lower end cap, iv. a left side inlet port extending outwardly from the left side wall of the lower end cap for receiving the feed solution to be treated, the left side inlet port creating a separate feed solution flow channel within the tubular lower end cap, v. a lower inlet port extending outwardly from the lower end cap end face about the central axis for receiving a second carbon slurry flow, the lower inlet port creating a separate second carbon slurry flow channel within the tubular lower end cap,
vi. a chargeable wire lower electrode connected to the chargeable wire lower end and extending along the central axis through the lower second carbon slurry inlet port in sealed fashion,
vii. an inner tubular barbed fitting extending inwardly along the central axis from the lower second carbon slurry inlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the lower end of the inner tubular membrane about the central axis,
viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane,
ix. a lower chargeable sleeve interface port for receiving a lower chargeable sleeve electrode therethrough in sealed fashion, the lower chargeable sleeve electrode being attachable to the lower end of the chargeable sleeve;
j. a tubular upper end cap attached to the tubular housing upper end and comprising
i. a cylindrical side wall having a left side and a right side,
ii. an end face,
iii. a right side outlet port extending outwardly from the right side wall of the lower end cap for discharging the first carbon slurry flow, the right side outlet port creating a separate first carbon slurry flow channel within the tubular upper end cap,
iv. a left side outlet port extending outwardly from the left side wall of the upper end cap for discharging a treated solution, the left side outlet port creating a separate treated solution flow channel within the tubular upper end cap,
v. an upper outlet port extending outwardly from the upper end cap end face about the central axis for discharging the second carbon slurry flow, the upper outlet port creating a separate second carbon slurry flow channel within the tubular upper end cap,
vi. a chargeable wire upper electrode connected to the chargeable wire upper end and extending along the central axis through the upper second carbon slurry outlet port in sealed fashion,
vii. an inner tubular barbed fitting extending inwardly along the central axis from the upper second carbon slurry outlet port, the inner tubular barbed fitting having an outer surface, an inner surface defining a first bore space, a top end connected to the second carbon slurry inlet port, a lower end, and a plurality of barbs on the outer surface proximate the lower end, the inner tubular barbed fitting capable of receiving and securing the upper end of the inner tubular membrane about the central axis,
viii. an outer tubular barbed fitting extending coaxially inwardly along the central axis outside of the inner tubular barbed fitting, the outer tubular barbed fitting having an outer surface, an inner surface defining a second bore space, a lower end, and a plurality of barbs on the outer surface proximate the lower end, the outer tubular barbed fitting capable of receiving and securing the outer tubular membrane about the central axis in coaxial relationship with the inner tubular membrane,
ix. an upper chargeable sleeve interface port for receiving an upper chargeable sleeve electrode therethrough in sealed fashion, the upper chargeable sleeve electrode being attachable to the upper end of the chargeable sleeve;
k. a first carbon slurry flow path comprising the lower right side inlet port, the separate first carbon slurry flow channel within the lower end cap, the first annular space, the separate first carbon slurry flow channel within the upper end cap, and the upper right side outlet port;
l. a feed solution flow path comprising the lower left side inlet port, the separate feed solution flow channel within the lower end cap, the second annular space, the separate treated solution channel within the upper end cap, and the upper left side outlet port;
m. a second carbon slurry flow path comprising the lower inlet port on the lower end cap, the separate annular second carbon slurry flow channel within the lower end cap, the third annular space, the separate annular second carbon slurry flow channel within the upper end cap, and the upper inlet port on the upper end cap;
B. pressurizing the feed water solution to a first pressure P1 and introducing it to the feed solution flow path;
C. applying a positive polarity to the upper and lower chargeable wire electrodes;
D. applying a negative polarity to upper and lower chargeable sleeve electrodes;
E. introducing the first carbon slurry into the first carbon slurry flow path at a second pressure P2;
F. introducing the second carbon slurry into the second carbon slurry flow path at a third pressure P3; and
G. directing the treated solution out the treated solution outlet port to a desired location.
10. The method of claim 9 further comprising the steps of adjusting the first, second and third pressures so that P1>P2 and P1>P3.

* * * * *